US010765114B2

(12) United States Patent
Eckelbarger et al.

(10) Patent No.: US 10,765,114 B2
(45) Date of Patent: *Sep. 8, 2020

(54) 4-AMINO-6-(PYRIDYL AND 2-SUBSTITUTEDPHENYL)-PICOLINATES AND 6-AMINO-2-(PYRIDYL AND 2-SUBSTITUTEDPHENYL)-PYRIMIDINE-4-CARBOXYLATES AND THEIR USE AS HERBICIDES

(71) Applicant: Dow AgroSciences LLC, Indianapolis, IN (US)

(72) Inventors: Joseph D. Eckelbarger, Carmel, IN (US); Jeffrey B. Epp, Noblesville, IN (US); Lindsey G. Fischer, Indianapolis, IN (US); Natalie C. Giampietro, Carmel, IN (US); Jeremy Kister, Carmel, IN (US); Jeffrey Petkus, Indianapolis, IN (US); Joshua Roth, Carmel, IN (US); Norbert M. Satchivi, Carmel, IN (US); Paul R. Schmitzer, Indianapolis, IN (US); Thomas L. Siddall, Zionsville, IN (US); Carla N. Yerkes, Crawfordsville, IN (US)

(73) Assignee: Dow AgroSciences LLC, Indianapolis, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/209,675

(22) Filed: Mar. 13, 2014

(65) Prior Publication Data
US 2014/0274703 A1     Sep. 18, 2014

Related U.S. Application Data

(60) Provisional application No. 61/791,892, filed on Mar. 15, 2013.

(51) Int. Cl.
*A01N 43/54* (2006.01)
*A01N 43/40* (2006.01)

(52) U.S. Cl.
CPC ............. *A01N 43/54* (2013.01); *A01N 43/40* (2013.01)

(58) Field of Classification Search
None
See application file for complete search history.

(56) References Cited

U.S. PATENT DOCUMENTS

| | | | | |
|---|---|---|---|---|
| 6,784,137 B2* | 8/2004 | Balko et al. | | 504/244 |
| 7,314,849 B2* | 1/2008 | Balko | | A01N 43/40 |
| | | | | 504/244 |
| 7,498,468 B2* | 3/2009 | Balko | | A01N 43/40 |
| | | | | 568/1 |
| 7,786,044 B2* | 8/2010 | Epp | | C07D 213/79 |
| | | | | 504/260 |
| 8,536,331 B2* | 9/2013 | Eckelbarger | | C07D 213/81 |
| | | | | 544/329 |
| 8,609,855 B2* | 12/2013 | Whiteker | | C07D 213/803 |
| | | | | 546/310 |
| 8,658,568 B2* | 2/2014 | Eckelbarger | | A01N 55/00 |
| | | | | 504/193 |
| 8,658,791 B2* | 2/2014 | Epp | | C07D 213/79 |
| | | | | 544/255 |
| 8,754,229 B2* | 6/2014 | Epp | | A01N 43/40 |
| | | | | 546/290 |
| 8,883,688 B2* | 11/2014 | Yerkes | | C07D 213/79 |
| | | | | 504/260 |
| 8,912,120 B2* | 12/2014 | Yerkes | | A01N 43/40 |
| | | | | 504/100 |
| 9,096,526 B2* | 8/2015 | Johnson | | C07C 251/12 |
| 9,113,629 B2* | 8/2015 | Eckelbarger | | C07D 239/42 |
| 9,854,801 B2* | 1/2018 | Mann | | A01N 27/00 |
| 2003/0114311 A1* | 6/2003 | Balko | | A01N 43/40 |
| | | | | 504/235 |
| 2007/0179060 A1 | 8/2007 | Balko et al. | | |
| 2009/0062125 A1 | 3/2009 | Epp et al. | | |
| 2012/0190551 A1 | 7/2012 | Yerkes et al. | | |
| 2014/0274696 A1* | 9/2014 | Eckelbarger et al. | | 504/103 |
| 2017/0354148 A1* | 12/2017 | Degenhardt | | A01N 43/04 |

FOREIGN PATENT DOCUMENTS

| | | |
|---|---|---|
| WO | 03011853 A1 | 2/2003 |
| WO | 2005063721 A1 | 7/2005 |
| WO | 2007082098 A2 | 7/2007 |
| WO | 2009029735 A1 | 3/2009 |
| WO | 2009138712 A2 | 11/2009 |
| WO | 2010125332 A1 | 11/2010 |

OTHER PUBLICATIONS

Supplementary Partial European Search Report issued for related Application No. 14768802.2 dated Oct. 27, 2016. 6 pages.
Extended European Search Report issued for related Application No. 14768802.2 dated Jan. 30, 2017. 11 pages.

* cited by examiner

*Primary Examiner* — Erin E Hirt
(74) *Attorney, Agent, or Firm* — Meunier Carlin & Curfman, LLC

(57) ABSTRACT

4-amino-6-(pyridyl and 2-substitutedphenyl)-picolinic acids and their derivatives; 6-amino-2-(pyridyl and 2-substitutedphenyl)-pyrimidine-4-carboxylates and their derivatives; and methods of using the same as herbicides.

14 Claims, No Drawings

4-AMINO-6-(PYRIDYL AND 2-SUBSTITUTEDPHENYL)-PICOLINATES AND 6-AMINO-2-(PYRIDYL AND 2-SUBSTITUTEDPHENYL)-PYRIMIDINE-4-CARBOXYLATES AND THEIR USE AS HERBICIDES

CROSS REFERENCE TO RELATED APPLICATIONS

This application claims the benefit of U.S. Provisional Patent Application Ser. No. 61/791,892 filed Mar. 15, 2013, the entirety of which is incorporated herein by reference.

BACKGROUND

The occurrence of undesirable vegetation, e.g., weeds, is a constant problem facing framers in crops, pasture, and other settings. Weeds compete with crops and negatively impact crop yield. The use of chemical herbicides is an important tool in controlling undesirable vegetation.

There remains a need for new chemical herbicides that offer a broader spectrum of weed control, selectivity, minimal crop damage, storage stability, ease of handling, higher activity against weeds, and/or a means to address herbicide-tolerance that develops with respect to herbicides currently in use.

SUMMARY

Provided herein are compounds of Formula (I):

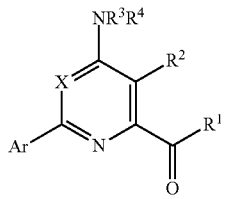

(I)

wherein

X is N or CY, wherein Y is hydrogen, halogen, $C_1$-$C_3$ alkyl, $C_1$-$C_3$ haloalkyl, $C_1$-$C_3$ alkoxy, $C_1$-$C_3$ haloalkoxy, $C_1$-$C_3$ alkylthio, or $C_1$-$C_3$ haloalkylthio;

$R^1$ is $OR^{1'}$ or $NR^{1''}R^{2''}$, wherein $R^{1'}$ is H, $C_1$-$C_8$ alkyl, or $C_7$-$C_{10}$ arylalkyl, and $R^{1''}$ and $R^{2''}$ are independently hydrogen, $C_1$-$C_{12}$ alkyl, $C_3$-$C_{12}$ alkenyl, or $C_3$-$C_{12}$ alkynyl;

$R^2$ is halogen, $C_1$-$C_4$ alkyl, $C_1$-$C_4$ haloalkyl, $C_2$-$C_4$ alkenyl, $C_2$-$C_4$ haloalkenyl, $C_2$-$C_4$ alkynyl, $C_2$-$C_4$ haloalkynyl, $C_1$-$C_4$ alkoxy, $C_1$-$C_4$ haloalkoxy, $C_1$-$C_4$ alkylthio, $C_1$-$C_4$ haloalkylthio, amino, $C_1$-$C_4$ alkylamino, $C_2$-$C_4$ haloalkylamino, formyl, ($C_1$-$C_3$ alkyl)carbonyl, ($C_1$-$C_3$ haloalkyl)carbonyl, cyano, or a group of the formula —$CR^{17}$=$CR^{18}$—$SiR^{19}R^{20}R^{21}$, wherein $R^{17}$ is hydrogen, F, or Cl; $R^{18}$ is hydrogen, F, Cl, $C_1$-$C_4$ alkyl, or $C_1$-$C_4$ haloalkyl; and $R^{19}$, $R^{20}$, and $R^{21}$ are independently $C_1$-$C_{10}$ alkyl, $C_3$-$C_6$ cycloalkyl, $C_1$-$C_{10}$ haloalkyl, $C_3$-$C_6$ halocycloalkyl, phenyl, substituted phenyl, $C_1$-$C_{10}$ alkoxy, or OH;

$R^3$ and $R^4$ are independently hydrogen, $C_1$-$C_6$ alkyl, $C_1$-$C_6$ haloalkyl, $C_3$-$C_6$ alkenyl, $C_3$-$C_6$ haloalkenyl, $C_3$-$C_6$ alkynyl, $C_3$-$C_6$ haloalkynyl, hydroxy, $C_1$-$C_6$ alkoxy, $C_1$-$C_6$ haloalkoxy, formyl, ($C_1$-$C_3$ alkyl)carbonyl, ($C_1$-$C_3$ haloalkyl)carbonyl, ($C_1$-$C_6$ alkoxy)carbonyl, ($C_1$-$C_6$ alkyl)carbamyl, ($C_1$-$C_6$ alkyl)sulfonyl, tri($C_1$-$C_6$ alkyl)silyl, di($C_1$-$C_6$ alkyl)phosphonyl, or $R^3$ and $R^4$ taken together with the nitrogen atom to which they are attached form a 5- or 6-membered saturated ring, or $R^3$ and $R^4$ taken together represent =$CR^{3'}R^{4'}$, wherein $R^{3'}$ and $R^{4'}$ are independently hydrogen, $C_1$-$C_6$ alkyl, $C_3$-$C_6$ alkenyl, $C_3$-$C_6$ alkynyl, $C_1$-$C_6$ alkoxy or $C_1$-$C_6$ alkylamino, or, $R^{3'}$ and $R^{4'}$ taken together with the carbon atom to which they are attached form a 5- or 6-membered saturated ring;

Ar is selected from the group consisting of Ar1, Ar2, Ar3, Ar4, Ar5, and Ar6

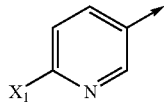

Ar1

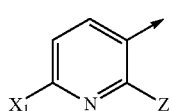

Ar2

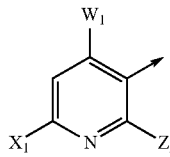

Ar3

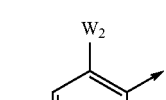

Ar4

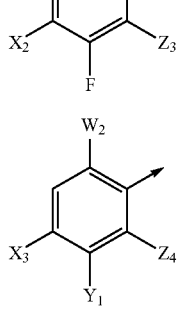

Ar5

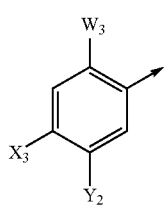

Ar6 wherein $W_1$ is halogen, $C_1$-$C_4$ alkyl, $C_1$-$C_4$ haloalkyl, $C_2$-$C_4$ alkenyl, $C_2$-$C_4$ haloalkenyl, $C_2$-$C_4$ alkynyl, $C_2$-$C_4$ haloalkynyl, $C_1$-$C_4$ alkoxy, $C_1$-$C_4$ haloalkoxy, $C_1$-$C_4$ alkylthio, $C_1$-$C_4$ haloalkylthio, amino, $C_1$-$C_4$ alkylamino, or $C_1$-$C_4$ haloalkylamino;

$W_2$ is hydrogen or F;

$W_3$ is Cl, Br, I, $C_1$-$C_4$ alkyl, $C_1$-$C_4$ haloalkyl, $C_2$-$C_4$ alkenyl, $C_2$-$C_4$ haloalkenyl, $C_2$-$C_4$ alkynyl, $C_2$-$C_4$ haloalkynyl, $C_1$-$C_4$ alkoxy, $C_1$-$C_4$ haloalkoxy, $C_1$-$C_4$ alkylthio, or $C_1$-$C_4$ haloalkylthio;

$X_1$ is hydrogen, F, Cl, Br, I, $C_1$-$C_4$ alkyl, $C_1$-$C_4$ haloalkyl, cyclopropyl, halocyclopropyl, $C_1$-$C_4$ alkoxy, or $C_1$-$C_4$ haloalkoxy;

$X_2$ is hydrogen, F, Cl, Br, I, $C_1$-$C_4$ alkyl, $C_1$-$C_4$ haloalkyl, cyclopropyl, halocyclopropyl, $C_2$-$C_4$ alkenyl, $C_2$-$C_4$ haloalkenyl, $C_2$-$C_4$ alkynyl, $C_2$-$C_4$ haloalkynyl, $C_1$-$C_4$ alkoxy, $C_1$-$C_4$ haloalkoxy, CN, $CONH_2$, $CO_2H$, or $NO_2$;

$X_3$ is F, Cl, Br, I, $C_1$-$C_4$ alkyl, $C_1$-$C_4$ haloalkyl, cyclopropyl, halocyclopropyl, $C_2$-$C_4$ alkenyl, $C_2$-$C_4$ haloalkenyl, $C_2$-$C_4$ alkynyl, $C_2$-$C_4$ haloalkynyl, $C_1$-$C_4$ alkoxy, $C_1$-$C_4$ haloalkoxy, CN, $CONH_2$, $CO_2H$, or $NO_2$;

$Y_1$ is halogen, $C_1$-$C_4$ alkyl, $C_1$-$C_4$ haloalkyl, $C_2$-$C_4$ alkenyl, $C_2$-$C_4$ haloalkenyl, $C_2$-$C_4$ alkynyl, $C_2$-$C_4$ haloalkynyl, $C_1$-$C_4$ alkoxy, $C_1$-$C_4$ haloalkoxy, $C_1$-$C_4$ alkylthio, $C_1$-$C_4$ haloalkylthio, amino, $C_1$-$C_4$ alkylamino, $C_1$-$C_4$ haloalkylamino, ($C_1$-$C_6$ alkoxy)-substituted $C_1$-$C_6$ alkyl, CN, or $NO_2$;

$Y_2$ is hydrogen, halogen, $C_1$-$C_4$ alkyl, $C_1$-$C_4$ haloalkyl, $C_2$-$C_4$ alkenyl, $C_2$-$C_4$ haloalkenyl, $C_2$-$C_4$ alkynyl, $C_2$-$C_4$ haloalkynyl, $C_1$-$C_4$ alkoxy, $C_1$-$C_4$ haloalkoxy, $C_1$-$C_4$ alkylthio, $C_1$-$C_4$ haloalkylthio, amino, $C_1$-$C_4$ alkylamino, $C_1$-$C_4$ haloalkylamino, ($C_1$-$C_6$ alkoxy)-substituted $C_1$-$C_6$ alkyl, CN, or $NO_2$;

$Z_1$ is halogen, $C_1$-$C_4$ alkyl, $C_1$-$C_4$ haloalkyl, cyclopropyl, $C_2$-$C_4$ alkenyl, $C_2$-$C_4$ haloalkenyl, $C_2$-$C_4$ alkynyl, $C_2$-$C_4$ haloalkynyl, $C_1$-$C_4$ alkoxy, $C_1$-$C_4$ haloalkoxy, $C_1$-$C_4$ alkylthio, $C_1$-$C_4$ haloalkylthio, amino, $C_1$-$C_4$ alkylamino, or $C_1$-$C_4$ haloalkylamino;

$Z_2$ is hydrogen, halogen, $C_1$-$C_4$ alkyl, $C_1$-$C_4$ haloalkyl, cyclopropyl, $C_2$-$C_4$ alkenyl, $C_2$-$C_4$ haloalkenyl, $C_2$-$C_4$ alkynyl, $C_2$-$C_4$ haloalkynyl, $C_1$-$C_4$ alkoxy, $C_1$-$C_4$ haloalkoxy, $C_1$-$C_4$ alkylthio, $C_1$-$C_4$ haloalkylthio, amino, $C_1$-$C_4$ alkylamino, or $C_1$-$C_4$ haloalkylamino;

$Z_3$ is Cl, Br, I, $C_1$-$C_4$ alkyl, $C_1$-$C_4$ haloalkyl, cyclopropyl, $C_2$-$C_4$ alkenyl, $C_2$-$C_4$ haloalkenyl, $C_2$-$C_4$ alkynyl, $C_2$-$C_4$ haloalkynyl, $C_1$-$C_4$ alkoxy, $C_1$-$C_4$ haloalkoxy, $C_1$-$C_4$ alkylthio, or $C_1$-$C_4$ haloalkylthio;

$Z_4$ is $C_1$-$C_4$ alkyl, $C_1$-$C_4$ haloalkyl, cyclopropyl, $C_2$-$C_4$ alkenyl, $C_2$-$C_4$ haloalkenyl, $C_2$-$C_4$ alkynyl, $C_2$-$C_4$ haloalkynyl, $C_1$-$C_4$ alkoxy, $C_1$-$C_4$ haloalkoxy, $C_1$-$C_4$ alkylthio, or $C_1$-$C_4$ haloalkylthio; and wherein when Ar is:

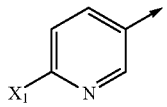

a)

then X is N, CH, CF, CCl, or $CCH_3$;
with the provisos that:
i) $X_1$ is not hydrogen, F, Cl, or $OCH_3$ when $R_2$ is Cl or vinyl and X is N;
ii) $X_1$ is not hydrogen, Cl or $OCH_3$ when $R_2$ is Cl and X is CH;
iii) $X_1$ is not Cl when $R_2$ is Cl and X is CF; and
iv) $X_1$ is not $CF_3$, cyclopropyl, or $OCH_3$ when $R_2$ is $OCH_3$ and X is CF;

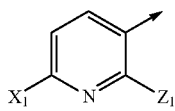

b)

then X is N, CH, or CF;
with the proviso that $X_1$ is not hydrogen, $CH_3$, or $OCH_3$ when $R_2$ is Cl and X is N;

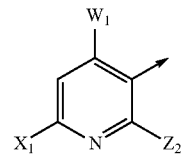

c)

then X is N, CH, or CF;

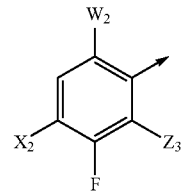

d)

then X is N, CH, or CF;

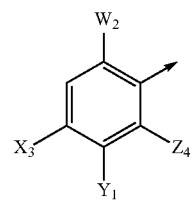

e)

then X is N, CH, or CF; and

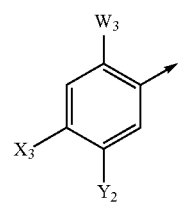

f)

then X is N, CH, or CF;
with the proviso that $W_3$ is not Cl, $CH_3$, $CF_3$ or $OCH_3$ when $Y_2$ is hydrogen;

or an N-oxide or agriculturally acceptable salt thereof.

Also provided are methods of controlling undesirable vegetation comprising (a) contacting the undesirable vegetation or area adjacent to the undesirable vegetation or (b) pre-emergently contacting soil or water a herbicidally effective amount of at least one compound of Formula (I) or agriculturally acceptable derivative thereof.

As used herein, herbicide and herbicidal active ingredient mean a compound that controls undesirable vegetation when applied in an appropriate amount.

As used herein, control of or controlling undesirable vegetation means killing or preventing the vegetation, or causing some other adversely modifying effect to the vegetation e.g., deviations from natural growth or development, regulation, desiccation, retardation, and the like.

As used herein, a herbicidally effective or vegetation controlling amount is an amount of herbicidal active ingredient the application of which controls the relevant undesirable vegetation.

As used herein, applying a herbicide or herbicidal composition means delivering it directly to the targeted vegetation or to the locus thereof or to the area where control of undesired vegetation is desired. Methods of application include, but are not limited to pre-emergently contacting soil or water, post-emergently contacting the undesirable vegetation or area adjacent to the undesirable vegetation.

As used herein, plants and vegetation include, but are not limited to, dormant seeds, germinant seeds, emerging seedlings, plants emerging from vegetative propagules, immature vegetation, and established vegetation.

As used herein, agriculturally acceptable salts and esters refer to salts and esters that exhibit herbicidal activity, or that are or can be converted in plants, water, or soil to the referenced herbicide. Exemplary agriculturally acceptable esters are those that are or can by hydrolyzed, oxidized, metabolized, or otherwise converted, e.g., in plants, water, or soil, to the corresponding carboxylic acid which, depending on the pH, may be in the dissociated or undissociated form.

Suitable salts include those derived from alkali or alkaline earth metals and those derived from ammonia and amines. Preferred cations include sodium, potassium, magnesium, and aminium cations of the formula:

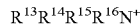

wherein $R^{13}$, $R^{14}$, $R^{15}$ and $R^{16}$ each, independently represents hydrogen or $C_1$-$C_{12}$ alkyl, $C_3$-$C_{12}$ alkenyl or $C_3$-$C_{12}$ alkynyl, each of which is optionally substituted by one or more hydroxy, $C_1$-$C_4$ alkoxy, $C_1$-$C_4$ alkylthio or phenyl groups, provided that $R^{13}$, $R^{14}$, $R^{15}$ and $R^{16}$ are sterically compatible. Additionally, any two $R^3$, $R^{14}$, $R^{15}$ and $R^{16}$ together may represent an aliphatic difunctional moiety containing one to twelve carbon atoms and up to two oxygen or sulfur atoms. Salts of the compounds of Formula I can be prepared by treatment of compounds of Formula I with a metal hydroxide, such as sodium hydroxide, with an amine, such as ammonia, trimethylamine, diethanolamine, 2-methylthiopropylamine, bisallylamine, 2-butoxyethylamine, morpholine, cyclododecylamine, or benzylamine or with a tetraalkylammonium hydroxide, such as tetramethylammonium hydroxide or choline hydroxide. Amine salts are often preferred forms of the compounds of Formula I because they are water-soluble and lend themselves to the preparation of desirable aqueous based herbicidal compositions.

Compounds of the formula (I) include N-oxides. Pyridine N-oxides can be obtained by oxidation of the corresponding pyridines. Suitable oxidation methods are described, for example, in Houben-Weyl, Methoden der organischen Chemie [Methods in organic chemistry], expanded and subsequent volumes to the 4th edition, volume E 7b, p. 565 f.

As used herein "acyl" refers to formyl, ($C_1$-$C_3$ alkyl) carbonyl, and ($C_1$-$C_3$ haloalkyl)carbonyl.

As used herein, "alkyl" refers to saturated, straight-chained or branched saturated hydrocarbon moieties. Unless otherwise specified, $C_1$-$C_{10}$ alkyl groups are intended. Examples include methyl, ethyl, propyl, 1-methyl-ethyl, butyl, 1-methyl-propyl, 2-methyl-propyl, 1,1-dimethyl-ethyl, pentyl, 1-methyl-butyl, 2-methyl-butyl, 3-methyl-butyl, 2,2-dimethyl-propyl, 1-ethyl-propyl, hexyl, 1,1-dimethyl-propyl, 1,2-dimethyl-propyl, 1-methyl-pentyl, 2-methyl-pentyl, 3-methyl-pentyl, 4-methyl-pentyl, 1,1-dimethyl-butyl, 1,2-dimethyl-butyl, 1,3-dimethyl-butyl, 2,2-dimethyl-butyl, 2,3-dimethyl-butyl, 3,3-dimethyl-butyl, 1-ethyl-butyl, 2-ethyl-butyl, 1,1,2-trimethyl-propyl, 1,2,2-trimethyl-propyl, 1-ethyl-1-methyl-propyl, and 1-ethyl-2-methyl-propyl.

As used herein, "haloalkyl" refers to straight-chained or branched alkyl groups, where in these groups the hydrogen atoms may partially or entirely be substituted with halogen atoms. Unless otherwise specified, $C_1$-$C_8$ groups are intended. Examples include chloromethyl, bromomethyl, dichloromethyl, trichloromethyl, fluoromethyl, difluoromethyl, trifluoromethyl, chlorofluoromethyl, dichlorofluoromethyl, chlorodifluoromethyl, 1-chloroethyl, 1-bromoethyl, 1-fluoroethyl, 2-fluoroethyl, 2,2-difluoroethyl, 2,2,2-trifluoroethyl, 2-chloro-2-fluoroethyl, 2-chloro-2-difluoroethyl, 2,2-dichloro-2-fluoroethyl, 2,2,2-trichloroethyl, pentafluoroethyl, and 1,1,1-trifluoroprop-2-yl.

As used herein, "alkenyl" refers to unsaturated, straight-chained, or branched hydrocarbon moieties containing a double bond. Unless otherwise specified, $C_2$-$C_8$ alkenyl are intended. Alkenyl groups may contain more than one unsaturated bond. Examples include ethenyl, 1-propenyl, 2-propenyl, 1-methylethenyl, 1-butenyl, 2-butenyl, 3-butenyl, 1-methyl-1-propenyl, 2-methyl-1-propenyl, 1-methyl-2-propenyl, 2-methyl-2-propenyl, 1-pentenyl, 2-pentenyl, 3-pentenyl, 4-pentenyl, 1-methyl-1-butenyl, 2-methyl-1-butenyl, 3-methyl-1-butenyl, 1-methyl-2-butenyl, 2-methyl-2-butenyl, 3-methyl-2-butenyl, 1-methyl-3-butenyl, 2-methyl-3-butenyl, 3-methyl-3-butenyl, 1,1-dimethyl-2-propenyl, 1,2-dimethyl-1-propenyl, 1,2-dimethyl-2-propenyl, 1-ethyl-1-propenyl, 1-ethyl-2-propenyl, 1-hexenyl, 2-hexenyl, 3-hexenyl, 4-hexenyl, 5-hexenyl, 1-methyl-1-pentenyl, 2-methyl-1-pentenyl, 3-methyl-1-pentenyl, 4-methyl-1-pentenyl, 1-methyl-2-pentenyl, 2-methyl-2-pentenyl, 3-methyl-2-pentenyl, 4-methyl-2-pentenyl, 1-methyl-3-pentenyl, 2-methyl-3-pentenyl, 3-methyl-3-pentenyl, 4-methyl-3-pentenyl, 1-methyl-4-pentenyl, 2-methyl-4-pentenyl, 3-methyl-4-pentenyl, 4-methyl-4-pentenyl, 1,1-dimethyl-2-butenyl, 1,1-dimethyl-3-butenyl, 1,2-dimethyl-1-butenyl, 1,2-dimethyl-2-butenyl, 1,2-dimethyl-3-butenyl, 1,3-dimethyl-1-butenyl, 1,3-dimethyl-2-butenyl, 1,3-dimethyl-3-butenyl, 2,2-dimethyl-3-butenyl, 2,3-dimethyl-1-butenyl, 2,3-dimethyl-2-butenyl, 2,3-dimethyl-3-butenyl, 3,3-dimethyl-1-butenyl, 3,3-dimethyl-2-butenyl, 1-ethyl-1-butenyl, 1-ethyl-2-butenyl, 1-ethyl-3-butenyl, 2-ethyl-1-butenyl, 2-ethyl-2-butenyl, 2-ethyl-3-butenyl, 1,1,2-trimethyl-2-propenyl, 1-ethyl-1-methyl-2-propenyl, 1-ethyl-2-methyl-1-propenyl, and 1-ethyl-2-methyl-2-propenyl.

As used herein, "alkynyl" represents straight-chained or branched hydrocarbon moieties containing a triple bond. Unless otherwise specified, $C_2$-$C_8$ alkynyl groups are intended. Alkynyl groups may contain more than one unsaturated bond. Examples include $C_2$-$C_6$ alkynyl, such as ethynyl, 1-propynyl, 2-propynyl (or propargyl), 1-butynyl, 2-butynyl, 3-butynyl, 1-methyl-2-propynyl, 1-pentynyl, 2-pentynyl, 3-pentynyl, 4-pentynyl, 3-methyl-1-butynyl, 1-methyl-2-butynyl, 1-methyl-3-butinyul, 2-methyl-3-butynyl, 1,1-dimethyl-2-propynyl, 1-ethyl-2-propynyl, 1-hexynyl, 2-hexynyl, 3-hexynyl, 4-hexynyl, 5-hexynyl, 3-methyl-1-pentynyl, 4-methyl-1-pentynyl, 1-methyl-2-pentynyl, 4-methyl-2-pentynyl, 1-methyl-3-pentynyl, 2-methyl-3-pentynyl, 1-methyl-4-pentynyl, 2-methyl-4-pentynyl, 3-methyl-4-pentynyl, 1,1-dimethyl-2-butynyl, 1,1-dimethyl-3-butynyl, 1,2-dimethyl-3-butynyl, 2,2-dimethyl-3-butynyl, 3,3-dimethyl-1-butynyl, 1-ethyl-2-butynyl, 1-ethyl-3-butynyl, 2-ethyl-3-butynyl, and 1-ethyl-1-methyl-2-propynyl.

As used herein, "alkoxy" refers to a group of the formula R—O—, where R is alkyl as defined above. Unless otherwise specified, alkoxy groups wherein R is a $C_1$-$C_8$ alkyl group are intended. Examples include methoxy, ethoxy, propoxy, 1-methyl-ethoxy, butoxy, 1-methyl-propoxy, 2-methyl-propoxy, 1,1-dimethyl-ethoxy, pentoxy, 1-methyl-butyloxy, 2-methyl-butoxy, 3-methyl-butoxy, 2,2-di-methyl-propoxy, 1-ethyl-propoxy, hexoxy, 1,1-dimethyl-propoxy, 1,2-dimethyl-propoxy, 1-methyl-pentoxy, 2-methyl-pentoxy, 3-methyl-pentoxy, 4-methyl-penoxy, 1,1-dimethyl-butoxy, 1,2-dimethyl-butoxy, 1,3-dimethyl-butoxy, 2,2-dimethyl-butoxy, 2,3-dimethyl-butoxy, 3,3-dimethyl-butoxy, 1-ethyl-butoxy, 2-ethylbutoxy, 1,1,2-trimethyl-propoxy, 1,2,2-trimethyl-propoxy, 1-ethyl-1-methyl-propoxy, and 1-ethyl-2-methyl-propoxy.

As used herein, "haloalkoxy" refers to a group of the formula R—O—, where R is haloalkyl as defined above. Unless otherwise specified, haloalkoxy groups wherein R is a $C_1$-$C_8$ alkyl group are intended. Examples include chloromethoxy, bromomethoxy, dichloromethoxy, trichloromethoxy, fluoromethoxy, difluoromethoxy, trifluoromethoxy, chlorofluoromethoxy, dichlorofluoromethoxy, chlorodifluoromethoxy, 1-chloroethoxy, 1-bromoethoxy, 1-fluoroethoxy, 2-fluoroethoxy, 2,2-difluoroethoxy, 2,2,2-trifluoroethoxy, 2-chloro-2-fluoroethoxy, 2-chloro, 2-difluoroethoxy, 2,2-dichloro-2-fluoroethoxy, 2,2,2-trichloroethoxy, pentafluoroethoxy, and 1,1,1-trifluoroprop-2-oxy.

As used herein, "alkylthio" refers to a group of the formula R—S— where R is alkyl as defined above. Unless otherwise specified, alkylthio groups wherein R is a $C_1$-$C_8$ alkyl group are intended. Examples include methylthio, ethylthio, propylthio, 1-methylethylthio, butylthio, 1-methyl-propylthio, 2-methylpropylthio, 1,1-dimethylethylthio, pentylthio, 1-methylbutylthio, 2-methylbutylthio, 3-methylbutylthio, 2,2-dio-methylpropylthio, 1-ethylpropylthio, hexylthio, 1,1-dimethyl propylthio, 1,2-dimethyl propylthio, 1-methylpentylthio, 2-methylpentylthio, 3-methylpentylthio, 4-methyl-pentylthio, 1,1-dimethyl butylthio, 1,2-dimethyl-butylthio, 1,3-dimethyl-butylthio, 2,2-dimethyl butylthio, 2,3-dimethyl butylthio, 3,3-dimethylbutylthio, 1-ethylbutylthio, 2-ethylbutylthio, 1,1,2-trimethyl propylthio, 1,2,2-trimethyl propylthio, 1-ethyl-1-methyl propylthio, and 1-ethyl-2-methylpropylthio.

As used herein, "haloalkylthio" refers to an alkylthio group as defined above wherein the carbon atoms are partially or entirely substituted with halogen atoms. Unless otherwise specified, haloalkylthio groups wherein R is a $C_1$-$C_8$ alkyl group are intended. Examples include chloromethylthio, bromomethylthio, dichloromethylthio, trichloromethylthio, fluoromethylthio, difluoromethylthio, trifluoromethylthio, chlorofluoromethylthio, dichlorofluoromethylthio, chlorodifluoromethylthio, 1-chloroethylthio, 1-bromoethylthio, 1-fluoroethylthio, 2-fluoroethylthio, 2,2-difluoroethylthio, 2,2,2-trifluoroethylthio, 2-chloro-2-fluoroethylthio, 2-chloro-2-difluoroethylthio, 2,2-dichloro-2-fluoroethylthio, 2,2,2-trichloroethylthio, pentafluoroethylthio, and 1,1,1-trifluoroprop-2-ylthio.

As used herein, "aryl", as well as derivative terms such as "aryloxy", refers to a phenyl, indanyl or naphthyl group with phenyl being preferred. The term "heteroaryl", as well as derivative terms such as "heteroaryloxy", refers to a 5- or 6-membered aromatic ring containing one or more heteroatoms, e.g., N, O or S; these heteroaromatic rings may be fused to other aromatic systems. The aryl or heteroaryl substituents may be unsubstituted or substituted with one or more substituents selected from halogen, hydroxy, nitro, cyano, formyl, $C_1$-$C_6$ alkyl, $C_2$-$C_6$ alkenyl, $C_2$-$C_6$ alkynyl, $C_1$-$C_6$ alkoxy, $C_1$-$C_6$ haloalkyl, $C_1$-$C_6$ haloalkoxy, $C_1$-$C_6$ acyl, $C_1$-$C_6$ alkylthio, $C_1$-$C_6$ alkylsulfinyl, $C_1$-$C_6$ alkylsulfonyl, ($C_1$-$C_6$ alkoxy)carbonyl, carbamoyl, hydroxycarbonyl, ($C_1$-$C_6$ alkyl)carbonyl, aminocarbonyl, ($C_1$-$C_6$ alkyl)aminocarbonyl, di($C_1$-$C_6$ alkyl)aminocarbonyl, provided that the substituents are sterically compatible and the rules of chemical bonding and strain energy are satisfied. Preferred substituents include halogen, $C_1$-$C_2$ alkyl and $C_1$-$C_2$ haloalkyl.

As used herein "alkoxycarbonyl" refers to a group of the formula

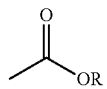

wherein R is alkyl.

As used herein "alkylamino" refers to an amino group substituted with one or two alkyl groups, which may be the same or different.

As used herein "alkylcarbamyl" refers to a carbamyl group substituted on the nitrogen with an alkyl group.

As used herein "alkylsulfonyl" refers to —$SO_2R$, wherein R is alkyl (e.g., $C_1$-$C_{10}$ alkyl).

As used herein "carbamyl" (also referred to as carbamoyl and aminocarbonyl) refers to a group of the formula

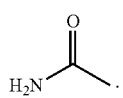

As used herein "haloalkylamino" refers to an alkylamino group wherein the alkyl carbon atoms are partially or entirely substituted with halogen atoms, As used herein "Me" refers to a methyl group.

As used herein, the term "halogen" including derivative terms such as "halo" refers to fluorine, chlorine, bromine and iodine.

As used herein, plants and vegetation include, but are not limited to, germinant seeds, emerging seedlings, plants emerging from vegetative propagules, immature vegetation, and established vegetation.

Compounds

The invention provides compounds of Formula (I) as defined above and N-oxides and agriculturally acceptable salts thereof.

In some embodiments, the compound is the carboxylic acid or an agriculturally acceptable ester or salt. In some embodiments, the compound is the carboxylic acid or its methyl ester.

In one embodiment, X is N.

In one embodiment, X is CY, wherein Y is hydrogen, halogen, $C_1$-$C_3$ alkyl, $C_1$-$C_3$ haloalkyl, $C_1$-$C_3$ alkoxy, $C_1$-$C_3$ haloalkoxy, $C_1$-$C_3$ alkylthio, or $C_1$-$C_3$ haloalkylthio.

In one embodiment, X is CY, wherein Y is hydrogen or halogen. In one embodiment, X is CY, wherein Y is hydrogen. In another embodiment, X is CY, wherein Y is halogen. In one embodiment, X is CY, wherein Y is F.

In one embodiment, $R^1$ is $OR^{1'}$, wherein $R^{1'}$ is H, $C_1$-$C_8$ alkyl, or $C_7$-$C_{10}$ arylalkyl. In one embodiment, $R^1$ is $OR^{1'}$, wherein $R^{1'}$ is H or $C_1$-$C_8$ alkyl. In one embodiment, $R^1$ is $OR^{1'}$, wherein $R^{1'}$ is H or methyl.

In one embodiment, $R^1$ is $OR^{1'}$, wherein $R^{1'}$ is H.

In one embodiment, $R^1$ is $OR^{1'}$, wherein $R^{1'}$ is $C_1$-$C_8$ alkyl. In one embodiment, $R^1$ is $OR^{1'}$, wherein $R^{1'}$ is methyl.

In one embodiment, $R^1$ is $OR^{1'}$, wherein $R^{1'}$ is $C_7$-$C_{10}$ arylalkyl.

In one embodiment, $R^1$ is $NR^{1''}R^{2''}$, wherein $R^{1''}$ and $R^{2''}$ are independently hydrogen, $C_1$-$C_{12}$ alkyl, $C_3$-$C_{12}$ alkenyl, or $C_3$-$C_{12}$ alkynyl. In one embodiment, $R^1$ is $NR^{1''}R^{2''}$, wherein $R^{1''}$ and $R^{2''}$ are independently hydrogen or $C_1$-$C_{12}$ alkyl. In one embodiment, $R^1$ is $NR^{1''}R^{2''}$, wherein $R^{1''}$ and $R^{2''}$ are both hydrogen. In another embodiment, $R^1$ is $NR^{1''}R^{2''}$, wherein $R^{1''}$ and $R^{2''}$ are independently hydrogen or methyl.

In one embodiment, $R^2$ is halogen, $C_1$-$C_4$ alkyl, $C_1$-$C_4$ haloalkyl, $C_2$-$C_4$ alkenyl, $C_2$-$C_4$ haloalkenyl, $C_2$-$C_4$ alkynyl, $C_2$-$C_4$ haloalkynyl, $C_1$-$C_4$ alkoxy, $C_1$-$C_4$ haloalkoxy, $C_1$-$C_4$ alkylthio, $C_1$-$C_4$ haloalkylthio, amino, $C_1$-$C_4$ alkylamino, $C_2$-$C_4$ haloalkylamino, formyl, ($C_1$-$C_3$ alkyl)carbonyl, ($C_1$-$C_3$ haloalkyl)carbonyl, or cyano.

In one embodiment, $R^2$ is halogen, $C_1$-$C_4$ alkyl, $C_1$-$C_4$ haloalkyl, $C_2$-$C_4$ alkenyl, $C_2$-$C_4$ haloalkenyl, $C_2$-$C_4$ alkynyl, $C_2$-$C_4$ haloalkynyl, $C_1$-$C_4$ alkoxy, or $C_1$-$C_4$ haloalkoxy.

In one embodiment, $R^2$ is halogen, $C_2$-$C_4$ alkenyl, $C_2$-$C_4$ haloalkenyl, $C_1$-$C_4$ alkoxy, or $C_1$-$C_4$ haloalkoxy.

In one embodiment, $R^2$ is halogen. In one embodiment, $R^2$ is Cl.

In one embodiment, $R^2$ is $C_2$-$C_4$ alkenyl. In one embodiment, $R^2$ is vinyl.

In one embodiment, $R^2$ is $C_1$-$C_4$ alkoxy. In one embodiment, $R^2$ is methoxy.

In one embodiment, $R^2$ is a group of the formula —$CR^{17}$=$CR^{18}$—$SiR^{19}R^{20}R^{21}$, wherein $R^{17}$, $R^{18}$, $R^{19}$, $R^{20}$, and $R^{21}$ are defined herein elsewhere.

In one embodiment, $R^3$ and $R^4$ are independently hydrogen, $C_1$-$C_6$ alkyl, $C_1$-$C_6$ haloalkyl, $C_3$-$C_6$ alkenyl, $C_3$-$C_6$ haloalkenyl, $C_3$-$C_6$ alkynyl, $C_3$-$C_6$ haloalkynyl, hydroxy, $C_1$-$C_6$ alkoxy, $C_1$-$C_6$ haloalkoxy, formyl, ($C_1$-$C_3$ alkyl)carbonyl, ($C_1$-$C_3$ haloalkyl)carbonyl, ($C_1$-$C_6$ alkoxy)carbonyl, ($C_1$-$C_6$ alkyl)carbamyl, ($C_1$-$C_6$ alkyl)sulfonyl, tri($C_1$-$C_6$ alkyl)silyl, or di($C_1$-$C_6$ alkyl)phosphonyl.

In one embodiment, $R^3$ and $R^4$ are independently hydrogen, $C_1$-$C_6$ alkyl, or $C_1$-$C_6$ haloalkyl. In one embodiment, $R^3$ and $R^4$ are both hydrogen.

In one embodiment, $R^3$ and $R^4$ taken together with the nitrogen atom to which they are attached form a 5- or 6-membered saturated ring.

In one embodiment, $R^3$ and $R^4$ taken together represent =$CR^{3'}R^{4'}$, wherein $R^{3'}$ and $R^{4'}$ are independently hydrogen, $C_1$-$C_6$ alkyl, $C_3$-$C_6$ alkenyl, $C_3$-$C_6$ alkynyl, $C_1$-$C_6$ alkoxy or $C_1$-$C_6$ alkylamino, or, $R^{3'}$ and $R^{4'}$ taken together with the carbon atom to which they are attached form a 5- or 6-membered saturated ring.

In one embodiment, Ar is Ar1. In one embodiment, provided herein is a compound of Formula (I-1):

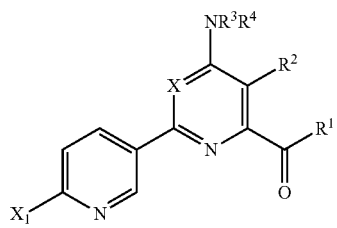

(I-1)

or an N-oxide or agriculturally acceptable salt thereof, wherein X, $R^1$, $R^2$, $R^3$, $R^4$, and $X_1$ are defined herein elsewhere.

In one embodiment, provided herein is a compound of Formula (I-1), or an N-oxide or agriculturally acceptable salt thereof, wherein:
$R^1$ is $OR^{1'}$, wherein $R^{1'}$ is H or $C_1$-$C_8$ alkyl;
$R^2$ is halogen, $C_2$-$C_4$ alkenyl, $C_2$-$C_4$ haloalkenyl, $C_1$-$C_4$ alkoxy, $C_1$-$C_4$ haloalkoxy, $C_1$-$C_4$ alkylthio, or $C_1$-$C_4$ haloalkylthio;
$R^3$ and $R^4$ are hydrogen; and
X is N, CH, or CF.

In one embodiment of Formula (I-1), X is CY, wherein Y is halogen (e.g., F), and $X_1$ is F, Cl, Br, I, or $C_1$-$C_4$ haloalkyl. In one embodiment of Formula (I-1), X is CY, wherein Y is halogen (e.g., F), and $X_1$ is F, Cl, Br, I, —$CH_2F$, —$CHF_2$, or —$CF_3$. In one embodiment of Formula (I-1), X is CY, wherein Y is halogen (e.g., F), and $X_1$ is F. In one embodiment of Formula (I-1), X is CY, wherein Y is halogen (e.g., F), and $X_1$ is Cl. In one embodiment of Formula (I-1), X is CY, wherein Y is halogen (e.g., F), and $X_1$ is Br. In one embodiment of Formula (I-1), X is CY, wherein Y is halogen (e.g., F), and $X_1$ is I. In one embodiment of Formula (I-1), X is CY, wherein Y is halogen (e.g., F), and $X_1$ is —$CH_2F$. In one embodiment of Formula (I-1), X is CY, wherein Y is halogen (e.g., F), and $X_1$ is —$CHF_2$. In one embodiment of Formula (I-1), X is CY, wherein Y is halogen (e.g., F), and $X_1$ is —$CF_3$. In one embodiment of Formula (I-1), X is CY, wherein Y is F, and $X_1$ is F, Cl, Br, I, —$CH_2F$, —$CHF_2$, or —$CF_3$. In one embodiment of Formula (I-1), X is CY, wherein Y is Cl, and $X_1$ is F, Cl, Br, I, —$CH_2F$, —$CHF_2$, or —$CF_3$.

In one embodiment of Formula (I-1), $X_1$ is hydrogen. In one embodiment of Formula (I-1), $X_1$ is F, Cl, Br, I, $C_1$-$C_4$ alkyl, $C_1$-$C_4$ haloalkyl, cyclopropyl, $C_1$-$C_4$ alkoxy, or $C_1$-$C_4$ haloalkoxy.

In one embodiment of Formula (I-1), $X_1$ is F. In one embodiment of Formula (I-1), $X_1$ is Cl. In one embodiment of Formula (I-1), $X_1$ is Br. In one embodiment of Formula (I-1), $X_1$ is I.

In one embodiment of Formula (I-1), $X_1$ is $C_1$-$C_4$ alkyl. In one embodiment of Formula (I-1), $X_1$ is Me.

In one embodiment of Formula (I-1), $X_1$ is $C_1$-$C_4$ haloalkyl. In one embodiment of Formula (I-1), $X_1$ is —$CH_2F$, —$CHF_2$, or —$CF_3$. In one embodiment of Formula (I-1), $X_1$ is —$CH_2F$ or —$CHF_2$. In one embodiment of Formula (I-1), $X_1$ is —$CF_3$.

In one embodiment of Formula (I-1), $X_1$ is cyclopropyl.

In one embodiment of Formula (I-1), $X_1$ is $C_1$-$C_4$ alkoxy. In one embodiment of Formula (I-1), $X_1$ is methoxy.

In one embodiment of Formula (I-1), $X_1$ is $C_1$-$C_4$ haloalkoxy. In one embodiment of Formula (I-1), $X_1$ is —$OCH_2F$, —$OCHF_2$, or —$OCF_3$. In one embodiment of Formula (I-1), $X_1$ is —$OCH_2F$. In one embodiment of Formula (I-1), $X_1$ is —$OCHF_2$. In one embodiment of Formula (I-1), $X_1$ is —$OCF_3$.

In one embodiment, Ar is Ar2. In one embodiment, provided herein is a compound of Formula (I-2):

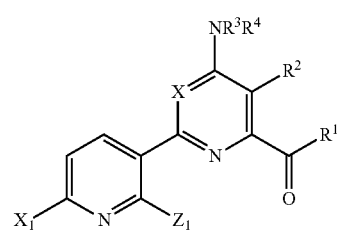

(I-2)

or an N-oxide or agriculturally acceptable salt thereof, wherein X, $R^1$, $R^2$, $R^3$, $R^4$, $X_1$, and $Z_1$ are defined herein elsewhere.

In one embodiment, provided herein is a compound of Formula (I-2), or an N-oxide or agriculturally acceptable salt thereof, wherein:

$R^1$ is $OR^{1'}$, wherein $R^{1'}$ is H or $C_1$-$C_8$ alkyl;

$R^2$ is halogen, $C_2$-$C_4$ alkenyl, $C_2$-$C_4$ haloalkenyl, $C_1$-$C_4$ alkoxy, $C_1$-$C_4$ haloalkoxy, $C_1$-$C_4$ alkylthio, or $C_1$-$C_4$ haloalkylthio;

$R^3$ and $R^4$ are hydrogen; and

X is N, CH, or CF.

In one embodiment of Formula (I-2), X is CY, wherein Y is halogen (e.g., F), and $X_1$ is F, Cl, Br, I, or $C_1$-$C_4$ haloalkyl. In one embodiment of Formula (I-2), X is CY, wherein Y is halogen (e.g., F), and $X_1$ is F, Cl, Br, I, —$CH_2F$, —$CHF_2$, or —$CF_3$. In one embodiment of Formula (I-2), X is CY, wherein Y is halogen (e.g., F), and $X_1$ is F. In one embodiment of Formula (I-2), X is CY, wherein Y is halogen (e.g., F), and $X_1$ is Cl. In one embodiment of Formula (I-2), X is CY, wherein Y is halogen (e.g., F), and $X_1$ is Br. In one embodiment of Formula (I-2), X is CY, wherein Y is halogen (e.g., F), and $X_1$ is I. In one embodiment of Formula (I-2), X is CY, wherein Y is halogen (e.g., F), and $X_1$ is —$CH_2F$. In one embodiment of Formula (I-2), X is CY, wherein Y is halogen (e.g., F), and $X_1$ is —$CHF_2$. In one embodiment of Formula (I-2), X is CY, wherein Y is halogen (e.g., F), and $X_1$ is —$CF_3$. In one embodiment of Formula (I-2), X is CY, wherein Y is F, and $X_1$ is F, Cl, Br, I, —$CH_2F$, —$CHF_2$, or —$CF_3$. In one embodiment of Formula (I-2), X is CY, wherein Y is Cl, and $X_1$ is F, Cl, Br, I, —$CH_2F$, —$CHF_2$, or —$CF_3$.

In one embodiment of Formula (I-2), $X_1$ is F, Cl, Br, I, $C_1$-$C_4$ alkyl, $C_1$-$C_4$ haloalkyl, $C_1$-$C_4$ alkoxy, or $C_1$-$C_4$ haloalkoxy. In one embodiment of Formula (I-2), $X_1$ is Cl, Me, $CF_3$, OMe. In one embodiment of Formula (I-2), $X_1$ is Cl. In one embodiment of Formula (I-2), $X_1$ is $CF_3$. In one embodiment of Formula (I-2), $X_1$ is Me. In one embodiment of Formula (I-2), $X_1$ is OMe.

In one embodiment of Formula (I-2), $Z_1$ is halogen, $C_1$-$C_4$ alkyl, $C_1$-$C_4$ alkoxy. In one embodiment of Formula (I-2), $Z_1$ is F, Cl, Me, OMe. In one embodiment of Formula (I-2), $Z_1$ is F. In one embodiment of Formula (I-2), $Z_1$ is Cl. In one embodiment of Formula (I-2), $Z_1$ is Me. In one embodiment of Formula (I-2), $Z_1$ is OMe.

In one embodiment of Formula (I-2), $X_1$ is Cl, and $Z_1$ is F, Cl, Me, OMe. In one embodiment of Formula (I-2), $X_1$ is $CF_3$, and $Z_1$ is F, Cl, Me, OMe. In one embodiment of Formula (I-2), $X_1$ is Cl, Me, $CF_3$, OMe, and $Z_1$ is Cl. In one embodiment of Formula (I-2), $X_1$ is Cl, Me, $CF_3$, OMe, and $Z_1$ is OMe.

In one embodiment, Ar is Ar3. In one embodiment, provided herein is a compound of Formula (I-3):

(I-3)

or an N-oxide or agriculturally acceptable salt thereof, wherein X, $R^1$, $R^2$, $R^3$, $R^4$, $X_1$, $Z_2$, and $W_1$ are defined herein elsewhere.

In one embodiment, provided herein is a compound of Formula (I-3), or an N-oxide or agriculturally acceptable salt thereof, wherein:

$R^1$ is $OR^{1'}$, wherein $R^{1'}$ is H or $C_1$-$C_8$ alkyl;

$R^2$ is halogen, $C_2$-$C_4$ alkenyl, $C_2$-$C_4$ haloalkenyl, $C_1$-$C_4$ alkoxy, $C_1$-$C_4$ haloalkoxy, $C_1$-$C_4$ alkylthio, or $C_1$-$C_4$ haloalkylthio;

$R^3$ and $R^4$ are hydrogen; and

X is N, CH, or CF.

In one embodiment of Formula (I-3), X is CY, wherein Y is halogen (e.g., F), and $X_1$ is F, Cl, Br, I, or $C_1$-$C_4$ haloalkyl. In one embodiment of Formula (I-3), X is CY, wherein Y is halogen (e.g., F), and $X_1$ is F, Cl, Br, I, —$CH_2F$, —$CHF_2$, or —$CF_3$. In one embodiment of Formula (I-3), X is CY, wherein Y is halogen (e.g., F), and $X_1$ is F. In one embodiment of Formula (I-3), X is CY, wherein Y is halogen (e.g., F), and $X_1$ is Cl. In one embodiment of Formula (I-3), X is CY, wherein Y is halogen (e.g., F), and $X_1$ is Br. In one embodiment of Formula (I-3), X is CY, wherein Y is halogen (e.g., F), and $X_1$ is I. In one embodiment of Formula (I-3), X is CY, wherein Y is halogen (e.g., F), and $X_1$ is —$CH_2F$. In one embodiment of Formula (I-3), X is CY, wherein Y is halogen (e.g., F), and $X_1$ is —$CHF_2$. In one embodiment of Formula (I-3), X is CY, wherein Y is halogen (e.g., F), and $X_1$ is —$CF_3$. In one embodiment of Formula (I-3), X is CY, wherein Y is F, and $X_1$ is F, Cl, Br, I, —$CH_2F$, —$CHF_2$, or —$CF_3$. In one embodiment of Formula (I-3), X is CY, wherein Y is Cl, and $X_1$ is F, Cl, Br, I, —$CH_2F$, —$CHF_2$, or —$CF_3$.

In one embodiment of Formula (I-3), $W_1$ is F or amino, and $Z_2$ is hydrogen.

In one embodiment, Ar is Ar4. In one embodiment, provided herein is a compound of Formula (I-4):

(I-4)

or an N-oxide or agriculturally acceptable salt thereof, wherein X, $R^1$, $R^2$, $R^3$, $R^4$, $X_2$, $Z_3$, and $W_2$ are defined herein elsewhere.

In one embodiment, provided herein is a compound of Formula (I-4), or an N-oxide or agriculturally acceptable salt thereof, wherein:

$R^1$ is $OR^{1'}$, wherein $R^{1'}$ is H or $C_1$-$C_8$ alkyl;

$R^2$ is halogen, $C_2$-$C_4$ alkenyl, $C_2$-$C_4$ haloalkenyl, $C_1$-$C_4$ alkoxy, $C_1$-$C_4$ haloalkoxy, $C_1$-$C_4$ alkylthio, or $C_1$-$C_4$ haloalkylthio;

$R^3$ and $R^4$ are hydrogen; and

X is N, CH, or CF.

In one embodiment of Formula (I-4), X is CY, wherein Y is halogen (e.g., F), and $X_2$ is F, Cl, Br, I, or $C_1$-$C_4$ haloalkyl. In one embodiment of Formula (I-4), X is CY, wherein Y is halogen (e.g., F), and $X_2$ is F, Cl, Br, I, —$CH_2F$, —$CHF_2$, or —$CF_3$. In one embodiment of Formula (I-4), X is CY, wherein Y is halogen (e.g., F), and $X_2$ is F. In one embodiment of Formula (I-4), X is CY, wherein Y is halogen (e.g., F), and $X_2$ is Cl. In one embodiment of Formula (I-4), X is CY, wherein Y is halogen (e.g., F), and $X_2$ is Br. In one embodiment of Formula (I-4), X is CY, wherein Y is halogen (e.g., F), and $X_2$ is I. In one embodiment of Formula (I-4), X is CY, wherein Y is halogen (e.g., F), and $X_2$ is —$CH_2F$. In one embodiment of Formula (I-4), X is CY, wherein Y is halogen (e.g., F), and $X_2$ is —$CHF_2$. In one embodiment of Formula (I-4), X is CY, wherein Y is halogen (e.g., F), and $X_2$ is —$CF_3$. In one embodiment of Formula (I-4), X is CY, wherein Y is F, and $X_2$ is F, Cl, Br, I, —$CH_2F$, —$CHF_2$, or —$CF_3$. In one embodiment of Formula (I-4), X is CY, wherein Y is Cl, and $X_2$ is F, Cl, Br, I, —$CH_2F$, —$CHF_2$, or —$CF_3$.

In one embodiment of Formula (I-4), $X_2$ is F, Cl, Br, I, $C_1$-$C_4$ alkyl, or $C_1$-$C_4$ haloalkyl. In one embodiment of Formula (I-4), $X_2$ is Cl, I, or $CF_3$. In one embodiment of Formula (I-4), $X_2$ is Cl. In one embodiment of Formula (I-4), $X_2$ is I. In one embodiment of Formula (I-4), $X_2$ is $CF_3$.

In one embodiment of Formula (I-4), $Z_3$ is Cl, Br, I, $C_1$-$C_4$ alkyl, $C_1$-$C_4$ haloalkyl, $C_2$-$C_4$ alkenyl, $C_2$-$C_4$ alkynyl, $C_1$-$C_4$ alkoxy, $C_1$-$C_4$ alkylthio, or $C_1$-$C_4$ haloalkylthio. In one embodiment of Formula (I-4), $Z_3$ is Cl, Me, ethyl, —$CH_2F$, —$CHF_2$, ethenyl, ethynyl, OMe, or SMe. In one embodiment of Formula (I-4), $Z_3$ is Cl, methyl, or methoxy.

In one embodiment of Formula (I-4), $W_2$ is hydrogen. In another embodiment of Formula (I-4), $W_2$ is F.

In one embodiment, Ar is Ar5. In one embodiment, provided herein is a compound of Formula (I-5):

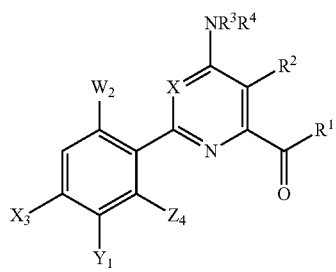

(I-5)

or an N-oxide or agriculturally acceptable salt thereof, wherein X, $R^1$, $R^2$, $R^3$, $R^4$, $X_3$, $Y_1$, $Z_4$, and $W_2$ are defined herein elsewhere.

In one embodiment, provided herein is a compound of Formula (I-5), or an N-oxide or agriculturally acceptable salt thereof, wherein:
 $R^1$ is $OR^{1'}$, wherein $R^{1'}$ is H or $C_1$-$C_8$ alkyl;
 $R^2$ is halogen, $C_2$-$C_4$ alkenyl, $C_2$-$C_4$ haloalkenyl, $C_1$-$C_4$ alkoxy, $C_1$-$C_4$ haloalkoxy, $C_1$-$C_4$ alkylthio, or $C_1$-$C_4$ haloalkylthio;
 $R^3$ and $R^4$ are hydrogen; and
 X is N, CH, or CF.

In one embodiment of Formula (I-5), X is CY, wherein Y is halogen (e.g., F), and $X_3$ is F, Cl, Br, I, or $C_1$-$C_4$ haloalkyl. In one embodiment of Formula (I-5), X is CY, wherein Y is halogen (e.g., F), and $X_3$ is F, Cl, Br, I, —$CH_2F$, —$CHF_2$, or —$CF_3$. In one embodiment of Formula (I-5), X is CY, wherein Y is halogen (e.g., F), and $X_3$ is F. In one embodiment of Formula (I-5), X is CY, wherein Y is halogen (e.g., F), and $X_3$ is Cl. In one embodiment of Formula (I-5), X is CY, wherein Y is halogen (e.g., F), and $X_3$ is Br. In one embodiment of Formula (I-5), X is CY, wherein Y is halogen (e.g., F), and $X_3$ is I. In one embodiment of Formula (I-5), X is CY, wherein Y is halogen (e.g., F), and $X_3$ is —$CH_2F$. In one embodiment of Formula (I-5), X is CY, wherein Y is halogen (e.g., F), and $X_3$ is —$CHF_2$. In one embodiment of Formula (I-5), X is CY, wherein Y is halogen (e.g., F), and $X_3$ is —$CF_3$. In one embodiment of Formula (I-5), X is CY, wherein Y is F, and $X_3$ is F, Cl, Br, I, —$CH_2F$, —$CHF_2$, or —$CF_3$. In one embodiment of Formula (I-5), X is CY, wherein Y is Cl, and $X_3$ is F, Cl, Br, I, —$CH_2F$, —$CHF_2$, or —$CF_3$.

In one embodiment of Formula (I-5), $X_3$ is F, Cl, Br, I, $C_1$-$C_4$ alkyl, or $C_1$-$C_4$ haloalkyl. In one embodiment of Formula (I-5), $X_3$ is Cl, I, or $CF_3$. In one embodiment of Formula (I-5), $X_3$ is Cl. In one embodiment of Formula (I-5), $X_3$ is I. In one embodiment of Formula (I-5), $X_3$ is $CF_3$.

In one embodiment of Formula (I-5), $Z_4$ is Cl, Br, I, $C_1$-$C_4$ alkyl, $C_1$-$C_4$ haloalkyl, $C_2$-$C_4$ alkenyl, $C_2$-$C_4$ alkynyl, $C_1$-$C_4$ alkoxy, $C_1$-$C_4$ alkylthio, or $C_1$-$C_4$ haloalkylthio. In one embodiment of Formula (I-5), $Z_4$ is Cl, Me, ethyl, —$CH_2F$, —$CHF_2$, ethenyl, ethynyl, OMe, or SMe. In one embodiment of Formula (I-5), $Z_4$ is Cl, methyl, or methoxy.

In one embodiment of Formula (I-5), $W_2$ is hydrogen. In another embodiment of Formula (I-5), $W_2$ is F.

In one embodiment of Formula (I-5), $W_2$ is F and $Y_1$ is F.

In one embodiment of Formula (I-5), $Y_1$ is halogen, $C_1$-$C_4$ alkyl, $C_1$-$C_4$ haloalkyl, $C_1$-$C_4$ alkoxy, or $C_1$-$C_4$ haloalkoxy. In one embodiment of Formula (I-5), $Y_1$ is F, Cl, or OMe.

In one embodiment, Ar is Ar6. In one embodiment, provided herein is a compound of Formula (I-6):

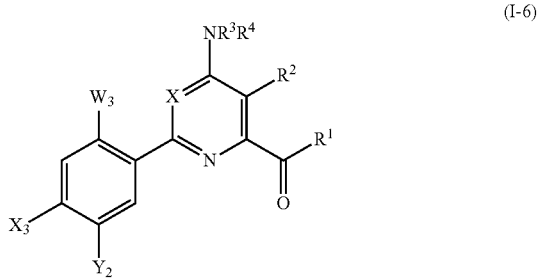

(I-6)

or an N-oxide or agriculturally acceptable salt thereof, wherein X, $R^1$, $R^2$, $R^3$, $R^4$, $X_3$, $Y_2$, and $W_3$ are defined herein elsewhere.

In one embodiment, provided herein is a compound of Formula (I-6), or an N-oxide or agriculturally acceptable salt thereof, wherein:
 $R^1$ is $OR^{1'}$, wherein $R^{1'}$ is H or $C_1$-$C_8$ alkyl;
 $R^2$ is halogen, $C_2$-$C_4$ alkenyl, $C_2$-$C_4$ haloalkenyl, $C_1$-$C_4$ alkoxy, $C_1$-$C_4$ haloalkoxy, $C_1$-$C_4$ alkylthio, or $C_1$-$C_4$ haloalkylthio;
 $R^3$ and $R^4$ are hydrogen; and
 X is N, CH, or CF.

In one embodiment of Formula (I-6), X is CY, wherein Y is halogen (e.g., F), and $X_3$ is F, Cl, Br, I, or $C_1$-$C_4$ haloalkyl. In one embodiment of Formula (I-6), X is CY, wherein Y is halogen (e.g., F), and $X_3$ is F, Cl, Br, I, —$CH_2F$, —$CHF_2$, or —$CF_3$. In one embodiment of Formula (I-6), X is CY, wherein Y is halogen (e.g., F), and $X_3$ is F. In one embodiment of Formula (I-6), X is CY, wherein Y is halogen (e.g., F), and $X_3$ is Cl. In one embodiment of Formula (I-6), X is CY, wherein Y is halogen (e.g., F), and $X_3$ is Br. In one embodiment of Formula (I-6), X is CY, wherein Y is halogen (e.g., F), and $X_3$ is I. In one embodiment of Formula (I-6), X is CY, wherein Y is halogen (e.g., F), and $X_3$ is —$CH_2F$. In one embodiment of Formula (I-6), X is CY, wherein Y is halogen (e.g., F), and $X_3$ is —$CHF_2$. In one embodiment of Formula (I-6), X is CY, wherein Y is halogen (e.g., F), and $X_3$ is —$CF_3$. In one embodiment of Formula (I-6), X is CY, wherein Y is F, and $X_3$ is F, Cl, Br, I, —$CH_2F$, —$CHF_2$, or —$CF_3$. In one embodiment of Formula (I-6), X is CY, wherein Y is Cl, and $X_3$ is F, Cl, Br, I, —$CH_2F$, —$CHF_2$, or —$CF_3$.

In one embodiment of Formula (I-6), $X_3$ is F, Cl, Br, I, $C_1$-$C_4$ alkyl, or $C_1$-$C_4$ haloalkyl. In one embodiment of Formula (I-6), $X_3$ is Cl, I, or $CF_3$. In one embodiment of Formula (I-6), $X_3$ is Cl. In one embodiment of Formula (I-6), $X_3$ is I. In one embodiment of Formula (I-6), $X_3$ is $CF_3$.

In one embodiment of Formula (I-6), $W_3$ is Cl, Br, I, $C_1$-$C_4$ alkyl, $C_1$-$C_4$ haloalkyl, $C_1$-$C_4$ alkoxy, or $C_1$-$C_4$ haloalkoxy. In one embodiment of Formula (I-6), $W_3$ is Cl, Me, $CF_3$, OMe, or $OCF_3$.

In one embodiment of Formula (I-6), $Y_2$ is hydrogen. In one embodiment of Formula (I-6), $Y_2$ is halogen, $C_1$-$C_4$ alkyl, $C_1$-$C_4$ haloalkyl, $C_1$-$C_4$ alkoxy, or $C_1$-$C_4$ haloalkoxy. In one embodiment of Formula (I-6), $Y_2$ is F, Cl, or OMe.

In one embodiment, Ar is Ar1, Ar3, or Ar4.

In one embodiment, X is CY, wherein Y is halogen (e.g., F), and $X_1$, $X_2$, and $X_3$ are independently F, Cl, Br, I, or $C_1$-$C_4$ haloalkyl. In one embodiment, X is CY, wherein Y is halogen (e.g., F), Ar is Ar1, and $X_1$ is F, Cl, Br, I, or $C_1$-$C_4$ haloalkyl. In another embodiment, X is CY, wherein Y is halogen (e.g., F), Ar is Ar2, and $X_1$ is F, Cl, Br, I, or $C_1$-$C_4$ haloalkyl. In yet another embodiment, X is CY, wherein Y is halogen (e.g., F), Ar is Ar3, and $X_1$ is F, Cl, Br, I, or $C_1$-$C_4$ haloalkyl. In yet another embodiment, X is CY, wherein Y is halogen (e.g., F), Ar is Ar4, and $X_2$ is F, Cl, Br, I, or $C_1$-$C_4$ haloalkyl. In yet another embodiment, X is CY, wherein Y is halogen (e.g., F), Ar is Ar5, and $X_3$ is F, Cl, Br, I, or $C_1$-$C_4$ haloalkyl. In yet another embodiment, X is CY, wherein Y is halogen (e.g., F), Ar is Ar6, and $X_3$ is F, Cl, Br, I, or $C_1$-$C_4$ haloalkyl.

In certain embodiments of Formula (I-1), (I-2), and (I-3), $X_1$ is F, Cl, Br, I, $C_1$-$C_4$ alkyl, $C_1$-$C_4$ haloalkyl, cyclopropyl, $C_1$-$C_4$ alkoxy, or $C_1$-$C_4$ haloalkoxy. In one embodiment, $X_1$ is F, Cl, Br, I, —$CH_3$, cyclopropyl, —$CHF_2$, —$CF_3$, —$OCH_3$, —$OCHF_2$, or —$OCF_3$. In one embodiment, $X_1$ is F. In one embodiment, $X_1$ is Cl. In one embodiment, $X_1$ is Br. In one embodiment, $X_1$ is I. In one embodiment, $X_1$ is —$CH_3$. In one embodiment, $X_1$ is cyclopropyl. In one embodiment, $X_1$ is —$CHF_2$. In one embodiment, $X_1$ is —$CF_3$. In one embodiment, $X_1$ is —$OCH_3$. In one embodiment, $X_1$ is —$OCHF_2$. In one embodiment, $X_1$ is —$OCF_3$.

In certain embodiments of Formula (I-4), $X_2$ is F, Cl, Br, I, $C_1$-$C_4$ alkyl, $C_1$-$C_4$ haloalkyl, $C_1$-$C_4$ alkoxy, or $C_1$-$C_4$ haloalkoxy. In one embodiment, $X_2$ is F, Cl, Br, I, —$CH_3$, —$CHF_2$, —$CF_3$, —$OCH_3$, —$OCHF_2$, or —$OCF_3$. In one embodiment, $X_2$ is F. In one embodiment, $X_2$ is Cl. In one embodiment, $X_2$ is Br. In one embodiment, $X_2$ is I. In one embodiment, $X_2$ is —$CH_3$. In one embodiment, $X_2$ is —$CHF_2$. In one embodiment, $X_2$ is —$CF_3$. In one embodiment, $X_2$ is —$OCH_3$. In one embodiment, $X_2$ is —$OCHF_2$. In one embodiment, $X_2$ is —$OCF_3$.

In certain embodiments of Formula (I-5) and (I-6), $X_3$ is F, Cl, Br, I, $C_1$-$C_4$ alkyl, $C_1$-$C_4$ haloalkyl, $C_1$-$C_4$ alkoxy, or $C_1$-$C_4$ haloalkoxy. In one embodiment, $X_3$ is F, Cl, Br, I, —$CH_3$, —$CHF_2$, —$CF_3$, —$OCH_3$, —$OCHF_2$, or —$OCF_3$. In one embodiment, $X_3$ is F. In one embodiment, $X_3$ is Cl. In one embodiment, $X_3$ is Br. In one embodiment, $X_3$ is I. In one embodiment, $X_3$ is —$CH_3$. In one embodiment, $X_3$ is —$CHF_2$. In one embodiment, $X_3$ is —$CF_3$. In one embodiment, $X_3$ is —$OCH_3$. In one embodiment, $X_3$ is —$OCHF_2$. In one embodiment, $X_3$ is —$OCF_3$.

In some embodiments:

Ar is selected from the group consisting of Ar1, Ar2, Ar3, Ar4, Ar5, and Ar6;

$R^1$ is $OR^{1'}$, wherein $R^{1'}$ is H or $C_1$-$C_8$ alkyl;

$R^2$ is halogen, $C_2$-$C_4$ alkenyl, $C_2$-$C_4$ haloalkenyl, $C_1$-$C_4$ alkoxy, $C_1$-$C_4$ haloalkoxy, $C_1$-$C_4$ alkylthio, or $C_1$-$C_4$ haloalkylthio;

$R^3$ and $R^4$ are hydrogen; and

X is N, CH, or CF.

All of the combinations of the above embodiments are encompassed by this invention.

Methods of Preparing the Compounds

Exemplary procedures to synthesize the compounds of Formula (I) are provided below.

The 3,5-disubstituted-4-amino-6-(optionally substituted phenyl or pyridyl)picolinic acids of Formula (I) can be prepared in a number of ways. As depicted in Scheme I, the 4-amino-6-chloropicolinates of Formula (II) can be converted to the 4-amino-6-substituted-picolinates of Formula (III), wherein Ar is as herein defined, via Suzuki coupling with a boronic acid or ester, in the presence of a base, such as potassium fluoride, and a catalyst, such as bis(triphenylphosphine)-palladium(II) dichloride, in a polar, protic solvent mixture, such as acetonitrile-water, at a temperature, such as 110° C., e.g., in a microwave reactor (reaction $a_1$). 4-Amino-6-substituted-picolinates of Formula (III) can be transformed into the 5-iodo-4-amino-6-substituted-picolinates of Formula (IV) via a reaction with iodinating reagents, such as periodic acid and iodine, in a polar, protic solvent, such as methyl alcohol (reaction $b_1$). Stille coupling of the 5-iodo-4-amino-6-substituted-picolinates of Formula (IV) with a stannane, such as tetramethyltin, in the presence of a catalyst, such as bis(triphenylphosphine)-palladium(II) dichloride, in a non-reactive solvent, such as 1,2-dichloroethane, at a temperature, such as 120-130° C., e.g., in a microwave reactor, provides 5-(substituted)-4-amino-6-substituted-picolinates of Formula (I-A), wherein $Z_1$ is alkyl, alkenyl, alkynyl, haloalkenyl and alkylthio (reaction $c_1$).

Alternatively, 4-amino-6-chloropicolinates of Formula (II) can be transformed to the 5-iodo-4-amino-6-chloropicolinates of Formula (V) via a reaction with iodinating reagents, such as periodic acid and iodine, in a polar, protic solvent, such as methyl alcohol (reaction $b_2$). Stille coupling of the 5-iodo-4-amino-6-chloropicolinates of Formula (V) with a stannane, such as tetramethyltin, in the presence of a catalyst, such as bis(triphenylphosphine)-palladium(II) dichloride, in a non-reactive solvent, such as 1,2-dichloroethane, at a temperature, such as 120-130° C., e.g., in a microwave reactor, provides 5-(substituted)-4-amino-6-chloropicolinates of Formula (VI), wherein $Z_1$ is alkyl, alkenyl, alkynyl, haloalkenyl and alkylthio (reaction $c_2$). The 5-substituted-4-amino-6-chloropicolinates of Formula (VI) can be converted to the 5-substituted-4-amino-6-substituted-picolinates of Formula (I-A), wherein Ar is as herein defined, via Suzuki coupling with a boronic acid or ester, in the presence of a base, such as potassium fluoride, and a catalyst, such as bis(triphenylphosphine)-palladium(II) dichloride, in a polar, protic solvent mixture, such as acetonitrile-water, at a temperature, such as 110° C., e.g., in a microwave reactor (reaction $a_2$).

Scheme I

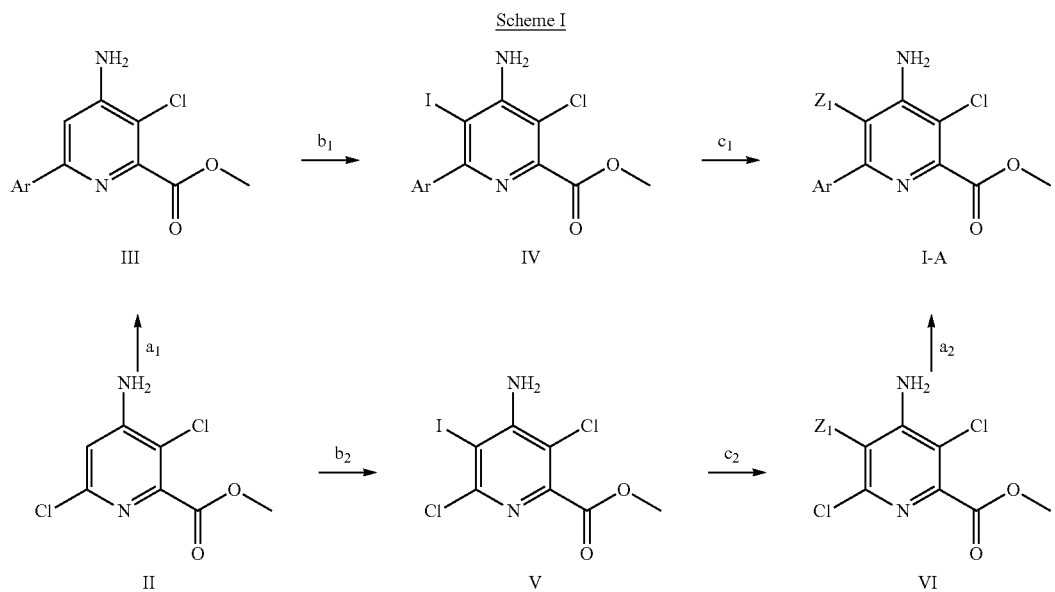

As depicted in Scheme II, the 4,5,6-trichloropicolinate of Formula (VII) can be converted to the corresponding isopropyl ester of Formula (VIII), via a reaction with isopropyl alcohol and concentrated sulfuric acid, e.g., at reflux temperature under Dean-Stark conditions (reaction d). The isopropyl ester of Formula (VIII) can be reacted with a fluoride ion source, such as cesium fluoride, in a polar, aprotic solvent, such as dimethyl sulfoxide, at a temperature, such as 80° C., under Dean-Stark conditions, to yield the isopropyl 4,5,6-trifluoropicolinate of Formula (IX) (reaction e). The isopropyl 4,5,6-trifluoropicolinate of Formula (IX) can be aminated with a nitrogen source, such as ammonia, in a polar, aprotic solvent, such as dimethyl sulfoxide, to produce a 4-amino-5,6-difluoropicolinate of Formula (X) (reaction f). The fluoro substituent in the 6-position of the 4-amino-5,6-difluoropicolinate of Formula (X) can be exchanged with a chloro substituent by treatment with a chloride source, such as hydrogen chloride, e.g., in dioxane, in a Parr reactor, at a temperature, such as 100° C., to produce a 4-amino-5-fluoro-6-chloropicolinate of Formula (XI) (reaction g). The 4-amino-5-fluoro-6-chloropicolinate of Formula ($X_1$) can be transesterified to the corresponding methyl ester of Formula (XII) by reaction with titanium(IV) isopropoxide in methyl alcohol at reflux temperature (reaction h).

Scheme II

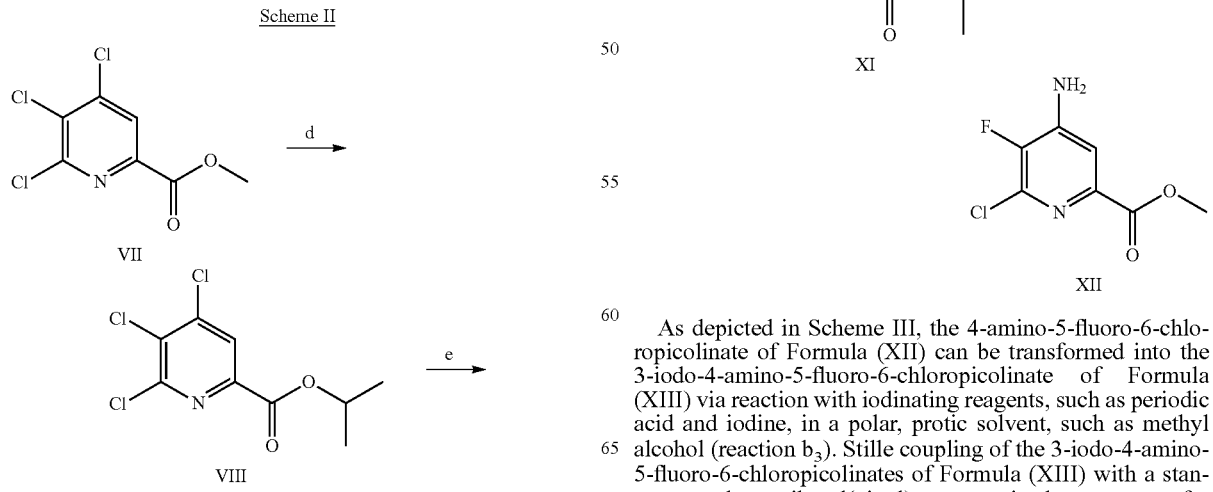

As depicted in Scheme III, the 4-amino-5-fluoro-6-chloropicolinate of Formula (XII) can be transformed into the 3-iodo-4-amino-5-fluoro-6-chloropicolinate of Formula (XIII) via reaction with iodinating reagents, such as periodic acid and iodine, in a polar, protic solvent, such as methyl alcohol (reaction $b_3$). Stille coupling of the 3-iodo-4-amino-5-fluoro-6-chloropicolinates of Formula (XIII) with a stannane, such as tributyl(vinyl)stannane, in the presence of a catalyst, such as bis(triphenylphosphine)-palladium(II) dichloride, in a non-reactive solvent, such as 1,2-dichloroethane, at a temperature, such as 120-130° C., e.g., in a microwave reactor, provides 3-(substituted)-4-amino-5-fluoro-6-chloropicolinates of Formula (XIV), wherein $R^2$ is alkyl, alkenyl, alkynyl, haloalkenyl and alkylthio (reaction $c_3$). Alternatively, the 3-iodo-4-amino-5-fluoro-6-chloropicolinates of Formula (XIII) can be treated with cesium carbonate and a catalytic amount of both copper(I) iodide and 1,10-phenanthroline in the presence of a polar, protic solvent, such as methyl alcohol, at a temperature, such as 65° C., to provide a 3-(substituted)-4-amino-5-fluoro-6-chloropicolinic acids of Formula (XIV), wherein $R^2$ is alkoxy or haloalkoxy (reaction $i_1$), which can be esterified to the methyl esters, e.g., by treatment with hydrogen chloride (gas) and methyl alcohol at 50° C. (reaction $j_1$). The 3-(substituted)-4-amino-5-fluoro-6-chloropicolinates of Formula (XIV) can be converted to the 4-amino-6-substituted-picolinates of Formula (I-B), wherein Ar is as herein defined, via Suzuki coupling with a boronic acid or ester, in the presence of a base, such as potassium fluoride, and a catalyst, such as bis(triphenylphosphine)-palladium(II) dichloride, in a polar, protic solvent mixture, such as acetonitrile-water, at a temperature, such as 110° C., e.g., in a microwave reactor (reaction $a_3$).

Alternatively, the 4-amino-5-fluoro-6-chloropicolinates of Formula (XII) can be converted to the 4-amino-5-fluoro-6-substituted-picolinates of Formula (XV), wherein Ar is as herein defined, via Suzuki coupling with a boronic acid or ester, in the presence of a base, such as potassium fluoride, and a catalyst, such as bis(triphenylphosphine)-palladium (II) dichloride, in a polar, protic solvent mixture, such as acetonitrile-water, at a temperature, such as 110° C., e.g., in a microwave reactor (reaction $a_4$). The 4-amino-5-fluoro-6-substituted-picolinates of Formula (XV) can be transformed into the 3-iodo-4-amino-5-fluoro-6-substituted-picolinates of Formula (XVI) via reaction with iodinating reagents, such as periodic acid and iodine, in a polar, protic solvent, such as methyl alcohol (reaction $b_4$). Stille coupling of the 3-iodo-4-amino-5-fluoro-6-substituted-picolinates of Formula (XVI) with a stannane, such as tributyl(vinyl)stannane, in the presence of a catalyst, such as bis(triphenylphosphine)-palladium(II) dichloride, in a non-reactive solvent, such as 1,2-dichloroethane, at a temperature, such as 120-130° C., e.g., in a microwave reactor, provides 3-(substituted)-4-amino-5-fluoro-6-substituted-picolinates of Formula (I-B), wherein $R^2$ is alkyl, alkenyl, alkynyl, haloalkenyl and alkylthio (reaction $C_4$). Alternatively, the 3-iodo-4-amino-5-fluoro-6-substituted-picolinates of Formula (XVI) can be treated with cesium carbonate and a catalytic amount of both copper(I) iodide and 1,10-phenanthroline in the presence of a polar, protic solvent, such as methyl alcohol, at a temperature, such as 65° C., to provide a 3-(substituted)-4-amino-5-fluoro-6-substituted-picolinic acids of Formula (I-B), wherein $R^2$ is alkoxy or haloalkoxy (reaction $i_2$), which can be esterified to the methyl esters, e.g., by treatment with hydrogen chloride (gas) and methyl alcohol, at a temperature, such as 50° C. (reaction $j_2$).

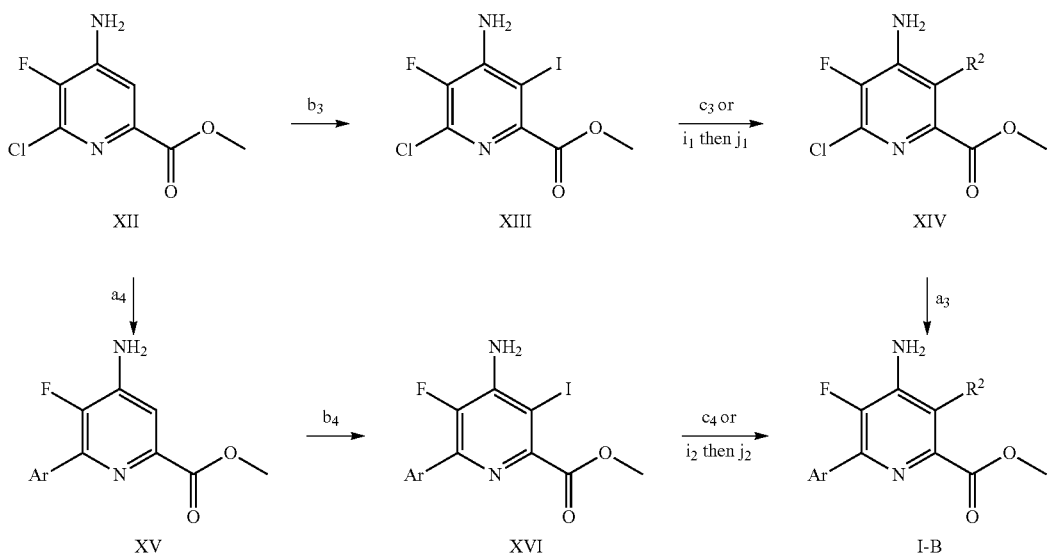

Scheme III

As depicted in Scheme IV, the 4-acetamido-6-(trimethylstannyl)picolinates of Formula (XVII) can be converted to the 4-acetamido-6-substituted-picolinates of Formula (XVIII), wherein Ar is as herein defined, via Stille coupling with an aryl bromide or aryl iodide, in the presence of a catalyst, such as bis(triphenylphosphine)-palladium(II) dichloride, in a solvent, such as dichloroethane, e.g., at reflux temperature (reaction k). 4-Amino-6-substituted-picolinates of Formula (I-C), wherein Ar is as herein defined, can be synthesized from 4-acetamido-6-substituted-picolinates of Formula (XVIII) via standard deprotecting methods, such as hydrochloric acid gas in methanol (reaction l).

Scheme IV

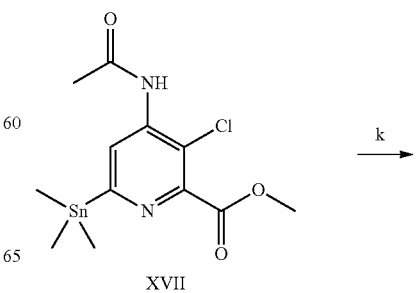

-continued

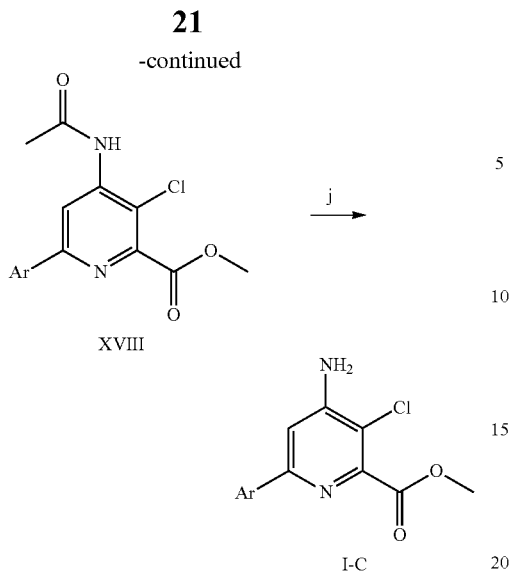

As depicted in Scheme V, 2,4-dichloro-5-methoxypyrimidine (XIX) can be transformed into 2,4-dichloro-5-methoxy-6-vinylpyrimidine (XX) via a reaction with vinyl magnesium bromide, in a polar, aprotic solvent, such as tetrahydrofuran (reaction m). 2,4-Dichloro-5-methoxy-6-vinylpyrimidine (XX) can be transformed into 2,6-dichloro-5-methoxypyrimidine-4-carboxaldehyde (XXI) via treatment with ozone, e.g., in a dichloromethane:methanol solvent mixture (reaction n). 2,6-Dichloro-5-methoxypyrimidine-4-carboxaldehyde (XXI) can be transformed into methyl 2,6-dichloro-5-methoxypyrimidine-4-carboxylate (XXII) via treatment with bromine, e.g., in a methanol:water solvent mixture (reaction o). Methyl 2,6-dichloro-5-methoxypyrimidine-4-carboxylate (XXII) can be transformed into methyl 6-amino-2-chloro-5-methoxypyrimidine-4-carboxylate (XXIII) via treatment with ammonia (e.g., 2 equivalents) in a solvent, such as DMSO (reaction p). Finally, 6-amino-2-substituted-5-methoxypyrimidine-4-carboxylates of Formula (I-D), wherein Ar is as herein defined, can be prepared via Suzuki coupling with a boronic acid or ester, with 6-amino-2-chloro-5-methoxypyrimidine-4-carboxylate (XXIII), in the presence of a base, such as potassium fluoride, and a catalyst, such as bis(triphenylphosphine)-palladium(II) dichloride, in a polar, protic solvent mixture, such as acetonitrile-water, at a temperature, such as 110° C., e.g., in a microwave reactor (reaction as).

Scheme V

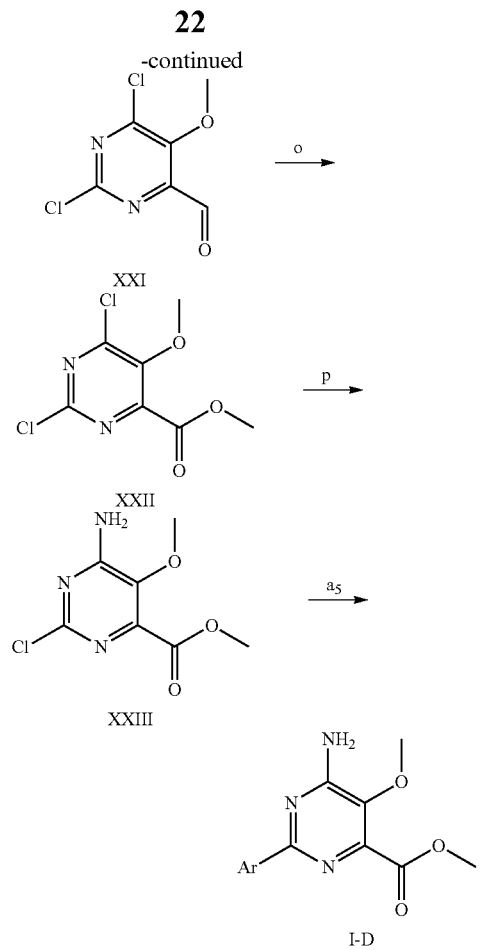

The compounds of Formulae I-A, I-B, I-C, and I-D obtained by any of these processes, can be recovered by conventional means and purified by standard procedures, such as by recrystallization or chromatography. The compounds of Formula (I) can be prepared from compounds of Formulae I-A, I-B, I-C, and I-D using standard methods well known in the art.

Compositions and Methods

In some embodiments, the compounds provided herein are employed in mixtures containing a herbicidally effective amount of the compound along with at least one agriculturally acceptable adjuvant or carrier. Exemplary adjuvants or carriers include those that are not phytotoxic or significantly phytotoxic to valuable crops, e.g., at the concentrations employed in applying the compositions for selective weed control in the presence of crops, and/or do not react or significantly react chemically with the compounds provided herein or other composition ingredients. Such mixtures can be designed for application directly to weeds or their locus or can be concentrates or formulations that are diluted with additional carriers and adjuvants before application. They can be solids, such as, for example, dusts, granules, water dispersible granules, or wettable powders, or liquids, such as, and for example, emulsifiable concentrates, solutions, emulsions or suspensions. They can also be provided as a pre-mix or tank-mixed.

Suitable agricultural adjuvants and carriers that are useful in preparing the herbicidal mixtures of the disclosure are well known to those skilled in the art. Some of these adjuvants include, but are not limited to, crop oil concentrate (mineral oil (85%)+emulsifiers (15%)); nonylphenol ethoxylate; benzylcocoalkyldimethyl quaternary ammonium salt; blend of petroleum hydrocarbon, alkyl esters, organic acid, and anionic surfactant; $C_9$-$C_{11}$ alkylpolyglycoside; phosphated alcohol ethoxylate; natural primary alcohol ($C_{12}$-$C_{16}$) ethoxylate; di-sec-butylphenol EO-PO block copolymer; polysiloxane-methyl cap; nonylphenol ethoxylate+urea ammonium nitrate; emulsified methylated seed oil; tridecyl alcohol (synthetic) ethoxylate (8EO); tallow amine ethoxylate (15 EO); PEG(400) dioleate-99.

Liquid carriers that can be employed include water and organic solvents. The organic solvents typically used include, but are not limited to, petroleum fractions or hydrocarbons such as mineral oil, aromatic solvents, paraffinic oils, and the like; vegetable oils such as soybean oil, rapeseed oil, olive oil, castor oil, sunflower seed oil, coconut oil, corn oil, cottonseed oil, linseed oil, palm oil, peanut oil, safflower oil, sesame oil, tung oil and the like; esters of the above vegetable oils; esters of monoalcohols or dihydric, trihydric, or other lower polyalcohols (4-6 hydroxy containing), such as 2-ethylhexyl stearate, n-butyl oleate, isopropyl myristate, propylene glycol dioleate, di-octyl succinate, dibutyl adipate, di-octyl phthalate and the like; esters of mono-, di- and poly-carboxylic acids and the like. Specific organic solvents include toluene, xylene, petroleum naphtha, crop oil, acetone, methyl ethyl ketone, cyclohexanone, trichloroethylene, perchloroethylene, ethyl acetate, amyl acetate, butyl acetate, propylene glycol monomethyl ether and diethylene glycol monomethyl ether, methyl alcohol, ethyl alcohol, isopropyl alcohol, amyl alcohol, ethylene glycol, propylene glycol, glycerine, N-methyl-2-pyrrolidinone, N,N-dimethyl alkylamides, dimethyl sulfoxide, liquid fertilizers, and the like. In some embodiments, water is the carrier for the dilution of concentrates.

Suitable solid carriers include talc, pyrophyllite clay, silica, attapulgus clay, kaolin clay, kieselguhr, chalk, diatomaceous earth, lime, calcium carbonate, bentonite clay, Fuller's earth, cottonseed hulls, wheat flour, soybean flour, pumice, wood flour, walnut shell flour, lignin, and the like.

In some embodiments, one or more surface-active agents are utilized in the compositions of the present disclosure. Such surface-active agents are, in some embodiments, employed in both solid and liquid compositions, e.g., those designed to be diluted with carrier before application. The surface-active agents can be anionic, cationic or nonionic in character and can be employed as emulsifying agents, wetting agents, suspending agents, or for other purposes. Surfactants conventionally used in the art of formulation and which may also be used in the present formulations are described, inter alia, in *McCutcheon's Detergents and Emulsifiers Annual*, MC Publishing Corp., Ridgewood, N.J., 1998, and in *Encyclopedia of Surfactants*, Vol. I-III, Chemical Publishing Co., New York, 1980-81. Typical surface-active agents include salts of alkyl sulfates, such as diethanolammonium lauryl sulfate; alkylarylsulfonate salts, such as calcium dodecylbenzenesulfonate; alkylphenol-alkylene oxide addition products, such as nonylphenol-$C_{18}$ ethoxylate; alcohol-alkylene oxide addition products, such as tridecyl alcohol-$C_{16}$ ethoxylate; soaps, such as sodium stearate; alkylnaphthalene-sulfonate salts, such as sodium dibutylnaphthalenesulfonate; dialkyl esters of sulfosuccinate salts, such as sodium di(2-ethylhexyl) sulfosuccinate; sorbitol esters, such as sorbitol oleate; quaternary amines, such as lauryl trimethylammonium chloride; polyethylene glycol esters of fatty acids, such as polyethylene glycol stearate; block copolymers of ethylene oxide and propylene oxide; salts of mono- and dialkyl phosphate esters; vegetable or seed oils such as soybean oil, rapeseed/canola oil, olive oil, castor oil, sunflower seed oil, coconut oil, corn oil, cottonseed oil, linseed oil, palm oil, peanut oil, safflower oil, sesame oil, tung oil and the like; and esters of the above vegetable oils, e.g., methyl esters.

Oftentimes, some of these materials, such as vegetable or seed oils and their esters, can be used interchangeably as an agricultural adjuvant, as a liquid carrier or as a surface active agent.

Other adjuvants commonly used in agricultural compositions include compatibilizing agents, antifoam agents, sequestering agents, neutralizing agents and buffers, corrosion inhibitors, dyes, odorants, spreading agents, penetration aids, sticking agents, dispersing agents, thickening agents, freezing point depressants, antimicrobial agents, and the like. The compositions may also contain other compatible components, for example, other herbicides, plant growth regulants, fungicides, insecticides, and the like and can be formulated with liquid fertilizers or solid, particulate fertilizer carriers such as ammonium nitrate, urea and the like.

The concentration of the active ingredients in the herbicidal compositions of this disclosure is generally from about 0.001 to about 98 percent by weight. Concentrations from about 0.01 to about 90 percent by weight are often employed. In compositions designed to be employed as concentrates, the active ingredient is generally present in a concentration from about 5 to about 98 weight percent, preferably about 10 to about 90 weight percent. Such compositions are typically diluted with an inert carrier, such as water, before application. The diluted compositions usually applied to weeds or the locus of weeds generally contain about 0.0001 to about 1 weight percent active ingredient and preferably contain about 0.001 to about 0.05 weight percent.

The present compositions can be applied to weeds or their locus by the use of conventional ground or aerial dusters, sprayers, and granule applicators, by addition to irrigation or flood water, and by other conventional means known to those skilled in the art.

In some embodiments, the compounds and compositions described herein are applied as a post-emergence application, pre-emergence application, in-water application to flooded paddy rice or water bodies (e.g., ponds, lakes and streams), or burn-down application.

In some embodiments, the compounds and compositions provided herein are utilized to control weeds in crops, including but not limited to citrus, apple, rubber, oil, palm, forestry, direct-seeded, water-seeded and transplanted rice, wheat, barley, oats, rye, sorghum, corn/maize, pastures, grasslands, rangelands, fallowland, turf, tree and vine orchards, aquatics, or row-crops, as well as non-crop settings, e.g., industrial vegetation management or rights-of-way. In some embodiments, the compounds and compositions are used to control woody plants, broadleaf and grass weeds, or sedges.

In some embodiments, the compounds and compositions provided herein are utilized to control undesirable vegetation in rice. In certain embodiments, the undesirable vegetation is *Brachiaria platyphylla* (Groseb.) Nash (broadleaf signalgrass, BRAPP), *Digitaria sanguinalis* (L.) Scop. (large crabgrass, DIGSA), *Echinochloa crus-galli* (L.) P. Beauv. (barnyardgrass, ECHCG), *Echinochloa colonum* (L.) LINK (junglerice, ECHCO), *Echinochloa oryzoides* (Ard.) Fritsch (early watergrass, ECHOR), *Echinochloa oryzicola* (Vasinger) Vasinger (late watergrass, ECHPH), *Ischaemum rugosum* Salisb. (saramollagrass, ISCRU), *Leptochloa chinensis* (L.) Nees (Chinese sprangletop, LEFCH), *Leptochloa*

*fascicularis* (Lam.) Gray (bearded sprangletop, LEFFA), *Leptochloa panicoides* (Presl.) Hitchc. (Amazon sprangletop, LEFPA), *Panicum dichotomiflorum* (L.) Michx. (fall panicum, PANDI), *Paspalum dilatatum* Poir. (dallisgrass, PASDI), *Cyperus difformis* L. (smallflower flatsedge, CYPDI), *Cyperus esculentus* L. (yellow nutsedge, CYPES), *Cyperus iria* L. (rice flatsedge, CYPIR), *Cyperus rotundus* L. (purple nutsedge, CYPRO), *Eleocharis* species (ELOSS), *Fimbristylis miliacea* (L.) Vahl (globe fringerush, FIMMI), *Schoenoplectus juncoides* Roxb. (Japanese bulrush, SCPJU), *Schoenoplectus maritimus* L. (sea clubrush, SCPMA), *Schoenoplectus mucronatus* L. (ricefield bulrush, SCPMU), *Aeschynomene* species, (jointvetch, AESSS), *Alternanthera philoxeroides* (Mart.) Griseb. (alligatorweed, ALRPH), *Alisma plantago-aquatica* L. (common waterplantain, ALSPA), *Amaranthus* species, (pigweeds and amaranths, AMASS), *Ammannia coccinea* Rottb. (redstem, AMMCO), *Eclipta alba* (L.) Hassk. (American false daisy, ECLAL), *Heteranthera limosa* (SW.) Willd./Vahl (ducksalad, HETLI), *Heteranthera reniformis* R. & P. (roundleaf mudplantain, HETRE), *Ipomoea hederacea* (L.) Jacq. (ivyleaf morningglory, IPOHE), *Lindernia dubia* (L.) Pennell (low false pimpernel, LIDDU), *Monochoria korsakowii* Regel & Maack (monochoria, MOOKA), *Monochoria vaginalis* (Burm. F.) C. Presl ex Kuhth, (monochoria, MOOVA), *Murdannia nudiflora* (L.) Brenan (doveweed, MUDNU), *Polygonum pensylvanicum* L., (Pennsylvania smartweed, POLPY), *Polygonum persicaria* L. (ladysthumb, POLPE), *Polygonum hydropiperoides* Michx. (POLHP, mild smartweed), *Rotala indica* (Willd.) Koehne (Indian toothcup, ROTIN), *Sagittaria* species, (arrowhead, SAGSS), *Sesbania exaltata* (Raf.) Cory/Rydb. Ex Hill (hemp sesbania, SEBEX), or *Sphenoclea zeylanica* Gaertn. (gooseweed, SPDZE).

In some embodiments, the compounds and compositions provided herein are utilized to control undesirable vegetation in cereals. In certain embodiments, the undesirable vegetation is *Alopecurus myosuroides* Huds. (blackgrass, ALOMY), *Apera spica-venti* (L.) Beauv. (windgrass, APESV), *Avena fatua* L. (wild oat, AVEFA), *Bromus tectorum* L. (downy brome, BROTE), *Lolium multiflorum* Lam. (Italian ryegrass, LOLMU), *Phalaris minor* Retz. (littleseed canarygrass, PHAMI), *Poa annua* L. (annual bluegrass, POAAN), *Setaria pumila* (Poir.) Roemer & J. A. Schultes (yellow foxtail, SETLU), *Setaria viridis* (L.) Beauv. (green foxtail, SETVI), *Cirsium arvense* (L.) Scop. (Canada thistle, CIRAR), *Galium aparine* L. (catchweed bedstraw, GALAP), *Kochia scoparia* (L.) Schrad. (kochia, KCHSC), *Lamium purpureum* L. (purple deadnettle, LAMPU), *Matricaria recutita* L. (wild chamomile, MATCH), *Matricaria matricarioides* (Less.) Porter (pineappleweed, MATMT), *Papaver rhoeas* L. (common poppy, PAPRH), *Polygonum convolvulus* L. (wild buckwheat, POLCO), *Salsola tragus* L. (Russian thistle, SASKR), *Stellaria media* (L.) Vill. (common chickweed, STEME), *Veronica persica* Poir. (Persian speedwell, VERPE), *Viola arvensis* Murr. (field violet, VIOAR), or *Viola tricolor* L. (wild violet, VIOTR).

In some embodiments, the compounds and compostions provided herein are utilized to control undesirable vegetation in range and pasture. In certain embodiments, the undesirable vegetation is *Ambrosia artemisiifolia* L. (common ragweed, AMBEL), *Cassia obtusifolia* (sickle pod, CASOB), *Centaurea maculosa* auct. non Lam. (spotted knapweed, CENMA), *Cirsium arvense* (L.) Scop. (Canada thistle, CIRAR), *Convolvulus arvensis* L. (field bindweed, CONAR), *Euphorbia esula* L. (leafy spurge, EPHES), *Lactuca serriola* L./Torn. (prickly lettuce, LACSE), *Plantago lanceolata* L. (buckhorn plantain, PLALA), *Rumex obtusifolius* L. (broadleaf dock, RUMOB), *Sida spinosa* L. (prickly sida, SIDSP), *Sinapis arvensis* L. (wild mustard, SINAR), *Sonchus arvensis* L. (perennial sowthistle, SONAR), *Solidago* species (goldenrod, SOOSS), *Taraxacum officinale* G. H. Weber ex Wiggers (dandelion, TAROF), *Trifolium repens* L. (white clover, TRFRE), or *Urtica dioica* L. (common nettle, URTDI).

In some embodiments, the compounds and compositions provided herein are utilized to control undesirable vegetation found in row crops. In certain embodiments, the undesirable vegetation is *Alopecurus myosuroides* Huds. (blackgrass, ALOMY), *Avena fatua* L. (wild oat, AVEFA), *Brachiaria platyphylla* (Groseb.) Nash (broadleaf signalgrass, BRAPP), *Digitaria sanguinalis* (L.) Scop. (large crabgrass, DIGSA), *Echinochloa crus-galli* (L.) P. Beauv. (barnyardgrass, ECHCG), *Echinochloa colonum* (L.) Link (junglerice, ECHCO), *Lolium multiflorum*, Lam. (Italian ryegrass, LOLMU), *Panicum dichotomiflorum* Michx. (fall panicum, PANDI), *Panicum miliaceum* L. (wild-proso millet, PANMI), *Setaria faberi* Herrm. (giant foxtail, SETFA), *Setaria viridis* (L.) Beauv. (green foxtail, SETVI), *Sorghumhalepense* (L.) Pers. (Johnsongrass, SORHA), *Sorghum bicolor* (L.) Moench ssp. *Arundinaceum* (shattercane, SORVU), *Cyperus esculentus* L. (yellow nutsedge, CYPES), *Cyperus rotundus* L. (purple nutsedge, CYPRO), *Abutilon theophrasti* Medik. (velvetleaf, ABUTH), *Amaranthus* species (pigweeds and amaranths, AMASS), *Ambrosia artemisiifolia* L. (common ragweed, AMBEL), *Ambrosia psilostachya* DC. (western ragweed, AMBPS), *Ambrosia trifida* L. (giant ragweed, AMBTR), *Asclepias syriaca* L. (common milkweed, ASCSY), *Chenopodium album* L. (common lambsquarters, CHEAL), *Cirsium arvense* (L.) Scop. (Canada thistle, CIRAR), *Commelina benghalensis* L. (tropical spiderwort, COMBE), *Datura stramonium* L. (jimsonweed, DATST), *Daucus carota* L. (wild carrot, DAUCA), *Euphorbia heterophylla* L. (wild poinsettia, EPHHL), *Erigeron bonariensis* L. (hairy fleabane, ERIBO), *Erigeron canadensis* L. (Canadian fleabane, ERICA), *Helianthus annuus* L. (common sunflower, HELAN), *Jacquemontia tamnifolia* (L.) Griseb. (smallflower morningglory, IAQTA), *Ipomoea hederacea* (L.) Jacq. (ivyleaf morningglory, IPOHE), *Ipomoea lacunosa* L. (white morningglory, IPOLA), *Lactuca serriola* L./Torn. (prickly lettuce, LACSE), *Portulaca oleracea* L. (common purslane, POROL), *Sida spinosa* L. (prickly sida, SIDSP), *Sinapis arvensis* L. (wild mustard, SINAR), *Solanum ptychanthum* Dunal (eastern black nightshade, SOLPT), or *Xanthium strumarium* L. (common cocklebur, XANST).

In some embodiments, application rates of about 1 to about 4,000 grams/hectare (g/ha) are employed in post-emergence operations. In some embodiments, rates of about 1 to about 4,000 g/ha are employed in pre-emergence operations.

In some embodiments, the compounds, compositions, and methods provided herein are used in conjunction with one or more other herbicides to control a wider variety of undesirable vegetation When used in conjunction with other herbicides, the presently claimed compounds can be formulated with the other herbicide or herbicides, tank-mixed with the other herbicide or herbicides or applied sequentially with the other herbicide or herbicides. Some of the herbicides that can be employed in conjunction with the compounds of the present disclosure include: 4-CPA, 4-CPB, 4-CPP, 2,4-D, 2,4-D choline salt, 2,4-D esters and amines, 2,4-DB, 3,4-DA, 3,4-DB, 2,4-DEB, 2,4-DEP, 3,4-DP, 2,3,6-TBA, 2,4,5-T, 2,4,5-TB, acetochlor, acifluorfen, aclonifen, acrolein, alachlor, allidochlor, alloxydim, allyl alcohol, alorac, ametridione, ametryn, amibuzin, amicarbazone, amidosulfuron, aminocyclopyrachlor, aminopyralid, amiprofos-methyl, amitrole, ammonium sulfamate, anilofos, anisuron, asulam, atraton, atrazine, azafenidin, azimsulfuron, aziprotryne, barban, BCPC, beflubutamid, benazolin, bencarbazone, benfluralin, benfuresate, bensulfuron-methyl, bensulide, benthiocarb, bentazon-sodium, benzadox, benzfendizone, benzipram, benzobicyclon, benzofenap, benzofluor, benzoylprop, benzthiazuron, bicyclopyrone, bifenox, bilanafos, bispyribac-sodium, borax, bromacil, bromobonil, bromobutide, bromofenoxim, bromoxynil, brompyrazon, butachlor, butafenacil, butamifos, butenachlor, buthidazole, buthiuron, butralin, butroxydim, buturon, butylate, cacodylic acid, cafenstrole, calcium chlorate, calcium cyanamide, cambendichlor, carbasulam, carbetamide, carboxazole chlorprocarb, carfentrazone-ethyl, CDEA, CEPC, chlomethoxyfen, chloramben, chloranocryl, chlorazifop, chlorazine, chlorbromuron, chlorbufam, chloreturon, chlorfenac, chlorfenprop, chlorflurazole, chlorflurenol, chloridazon, chlorimuron, chlomitrofen, chloropon, chlorotoluron, chloroxuron, chloroxynil, chlorpropham, chlorsulfuron, chlorthal, chlorthiamid, cinidon-ethyl, cinmethylin, cinosulfuron, cisanilide, clethodim, cliodinate, clodinafop-propargyl, clofop, clomazone, clomeprop, cloprop, cloproxydim, clopyralid, cloransulam-methyl, CMA, copper sulfate, CPMF, CPPC, credazine, cresol, cumyluron, cyanatryn, cyanazine, cycloate, cyclosulfamuron, cycloxydim, cycluron, cyhalofop-butyl, cyperquat, cyprazine, cyprazole, cypromid, daimuron, dalapon, dazomet, delachlor, desmedipham, desmetryn, di-allate, dicamba, dichlobenil, dichloralurea, dichlormate, dichlorprop, dichlorprop-P, diclofop, diclosulam, diethamquat, diethatyl, difenopenten, difenoxuron, difenzoquat, diflufenican, diflufenzopyr, dimefuron, dimepiperate, dimethachlor, dimethametryn, dimethenamid, dimethenamid-P, dimexano, dimidazon, dinitramine, dinofenate, dinoprop, dinosam, dinoseb, dinoterb, diphenamid, dipropetryn, diquat, disul, dithiopyr, diuron, DMPA, DNOC, DSMA, EBEP, eglinazine, endothal, epronaz, EPTC, erbon, esprocarb, ethalfluralin, ethbenzamide, ethametsulfuron, ethidimuron, ethiolate, ethobenzamid, etobenzamid, ethofumesate, ethoxyfen, ethoxysulfuron, etinofen, etnipromid, etobenzanid, EXD, fenasulam, fenoprop, fenoxaprop, fenoxaprop-P-ethyl, fenoxaprop-P-ethyl+ isoxadifen-ethyl, fenoxasulfone, fenteracol, fenthiaprop, fentrazamide, fenuron, ferrous sulfate, flamprop, flamprop-M, flazasulfuron, florasulam, fluazifop, fluazifop-P-butyl, fluazolate, flucarbazone, flucetosulfuron, fluchloralin, flufenacet, flufenican, flufenpyr-ethyl, flumetsulam, flumezin, flumiclorac-pentyl, flumioxazin, flumipropyn, fluometuron, fluorodifen, fluoroglycofen, fluoromidine, fluoronitrofen, fluothiuron, flupoxam, flupropacil, flupropanate, flupyrsulfuron, fluridone, fluorochloridone, fluoroxypyr, flurtamone, fluthiacet, fomesafen, foramsulfuron, fosamine, furyloxyfen, glufosinate, glufosinate-ammonium, glyphosate, halosafen, halosulfuron-methyl, haloxydine, haloxyfop-methyl, haloxyfop-P-methyl, halauxifen-methyl, hexachloroacetone, hexaflurate, hexazinone, imazamethabenz, imazamox, imazapic, imazapyr, imazaquin, imazethapyr, imazosulfuron, indanofan, indaziflam, iodobonil, iodomethane, iodosulfuron, iofensulfuron, ioxynil, ipazine, ipfencarbazone, iprymidam, isocarbamid, isocil, isomethiozin, isonoruron, isopolinate, isopropalin, isoproturon, isouron, isoxaben, isoxachlortole, isoxaflutole, isoxapyrifop, karbutilate, ketospiradox, lactofen, lenacil, linuron, MAA, MAMA, MCPA, esters and amines, MCPA-thioethyl, MCPB, mecoprop, mecoprop-P, medinoterb, mefenacet, mefluidide, mesoprazine, mesosulfuron, mesotrione, metam, metamifop, metamitron, metazachlor, metazosulfuron, metflurazon, methabenzthiazuron, methalpropalin, methazole, methiobencarb, methiozolin, methiuron, methometon, methoprotryne, methyl bromide, methyl isothiocyanate, methyldymron, metobenzuron, metobromuron, metolachlor, metosulam, metoxuron, metribuzin, metsulfuron, molinate, monalide, monisouron, monochloroacetic acid, monolinuron, monuron, morfamquat, MSMA, naproanilide, napropamide, naptalam, neburon, nicosulfuron, nipyraclofen, nitralin, nitrofen, nitrofluorfen, norflurazon, noruron, OCH, orbencarb, ortho-dichlorobenzene, orthosulfamuron, oryzalin, oxadiargyl, oxadiazon, oxapyrazon, oxasulfuron, oxaziclomefone, oxyfluorfen, paraflufenethyl, parafluoron, paraquat, pebulate, pelargonic acid, pendimethalin, penoxsulam, pentachlorophenol, pentanochlor, pentoxazone, perfluidone, pethoxamid, phenisopham, phenmedipham, phenmedipham-ethyl, phenobenzuron, phenylmercury acetate, picloram, picolinafen, pinoxaden, piperophos, potassium arsenite, potassium azide, potassium cyanate, pretilachlor, primisulfuron-methyl, procyazine, prodiamine, profluazol, profluralin, profoxydim, proglinazine, prohexadione-calcium, prometon, prometryn, propachlor, propanil, propaquizafop, propazine, propham, propisochlor, propoxycarbazone, propyrisulfuron, propyzamide, prosulfalin, prosulfocarb, prosulfuron, proxan, prynachlor, pydanon, pyraclonil, pyraflufen, pyrasulfotole, pyrazogyl, pyrazolynate, pyrazosulfuron-ethyl, pyrazoxyfen, pyribenzoxim, pyributicarb, pyriclor, pyridafol, pyridate, pyriftalid, pyriminobac, pyrimisulfan, pyrithiobac-methyl, pyroxasulfone, pyroxsulam, quinclorac, quinmerac, quinoclamine, quinonamid, quizalofop, quizalofop-P-ethyl, rhodethanil, rimsulfuron, saflufenacil, S-metolachlor, sebuthylazine, secbumeton, sethoxydim, siduron, simazine, simeton, simetryn, SMA, sodium arsenite, sodium azide, sodium chlorate, sulcotrione, sulfallate, sulfentrazone, sulfometuron, sulfosate, sulfosulfuron, sulfuric acid, sulglycapin, swep, TCA, tebutam, tebuthiuron, tefuryltrione, tembotrione, tepraloxydim, terbacil, terbucarb, terbuchlor, terbumeton, terbuthylazine, terbutryn, tetrafluoron, thenylchlor, thiazafluoron, thiazopyr, thidiazimin, thidiazuron, thiencarbazone-methyl, thifensulfuron, thiobencarb, tiocarbazil, tioclorim, topramezone, tralkoxydim, triafamone, triallate, triasulfuron, triaziflam, tribenuron, tricamba, triclopyr esters and amines, tridiphane, trietazine, trifloxysulfuron, trifluralin, triflusulfuron, trifop, trifopsime, trihydroxytriazine, trimeturon, tripropindan, tritac, tritosulfuron, vernolate and xylachlor.

The compounds and compositions of the present disclosure can generally be employed in combination with known herbicide safeners, such as benoxacor, benthiocarb, brassinolide, cloquintocet (e.g., mexyl), cyometrinil, daimuron, dichlormid, dicyclonon, dimepiperate, disulfoton, fenchlorazole-ethyl, fenclorim, flurazole, fluxofenim, furilazole, harpin proteins, isoxadifen-ethyl, mefenpyr-diethyl, MG 191, MON 4660, naphthalic anhydride (NA), oxabetrinil, R29148 and N-phenylsulfonylbenzoic acid amides, to enhance their selectivity.

The compounds, compositions, and methods described herein be used to control undesirable vegetation on glyphosate-tolerant-, glufosinate-tolerant-, dicamba-tolerant-, phenoxy auxin-tolerant-, pyridyloxy auxin-tolerant-, aryloxyphenoxypropionate-tolerant-, acetyl CoA carboxylase (ACCase) inhibitor-tolerant-, imidazolinone-tolerant-, acetolactate synthase (ALS) inhibitor-tolerant-, 4-hydroxyphenyl-pyruvate dioxygenase (HPPD) inhibitor-tolerant-, protoporphyrinogen oxidase (PPO) inhibitor-tolerant-, triazine-tolerant-, and bromoxynil-tolerant-crops (such as, but not limited to, soybean, cotton, canola/oilseed rape, rice, cereals, corn, turf, etc.), for example, in conjunction with glyphosate, glufosinate, dicamba, phenoxy auxins, pyridyloxy auxins, aryloxyphenoxypropionates, ACCase inhibitors, imidazolinones, ALS inhibitors, HPPD inhibitors, PPO inhibitors, triazines, and bromoxynil. The compositions and methods may be used in controlling undesirable vegetation in crops possessing multiple or stacked traits conferring tolerance to multiple chemistries and/or inhibitors of multiple modes-of-action.

The compounds and compositions provided herein may also be employed to control herbicide resistant or tolerant weeds. Exemplary resistant or tolerant weeds include, but are not limited to, biotypes resistant or tolerant to acetolactate synthase (ALS) inhibitors, photosystem II inhibitors, acetyl CoA carboxylase (ACCase) inhibitors, synthetic auxins, photosystem I inhibitors, 5-enolpyruvylshikimate-3-phosphate (EPSP) synthase inhibitors, microtubule assembly inhibitors, lipid synthesis inhibitors, protoporphyrinogen oxidase (PPO) inhibitors, carotenoid biosynthesis inhibitors, very long chain fatty acid (VLCFA) inhibitors, phytoene desaturase (PDS) inhibitors, glutamine synthetase inhibitors, 4-hydroxyphenyl-pyruvate-dioxygenase (HPPD) inhibitors, mitosis inhibitors, cellulose biosynthesis inhibitors, herbicides with multiple modes-of-action such as quinclorac, and unclassified herbicides such as arylaminopropionic acids, difenzoquat, endothall, and organoarsenicals. Exemplary resistant or tolerant weeds include, but are not limited to, biotypes with resistance or tolerance to multiple herbicides, multiple chemical classes, and multiple herbicide modes-of-action.

The described embodiments and following examples are for illustrative purposes and are not intended to limit the scope of the claims. Other modifications, uses, or combinations with respect to the compositions described herein will be apparent to a person of ordinary skill in the art without departing from the spirit and scope of the claimed subject matter.

SYNTHESIS OF PERCURSORS

Example 1

Preparation of methyl 4-amino-3,6-dichloropicolinate (Head A)

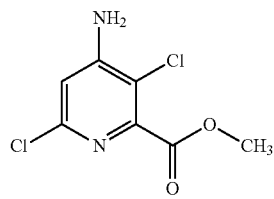

Prepared as described in Fields et al., WO 2001051468 A1.

Example 2

Preparation of methyl 4-amino-3,6-dichloro-5-fluoropicolinate (Head B)

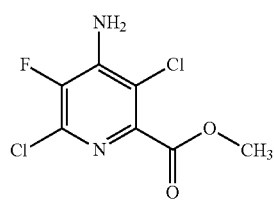

Prepared as described in Fields et al., *Tetrahedron Letters* 2010, 51, 79-81.

Example 3

Preparation of 2,6-dichloro-5-methoxy-4-vinyl pyrimidine

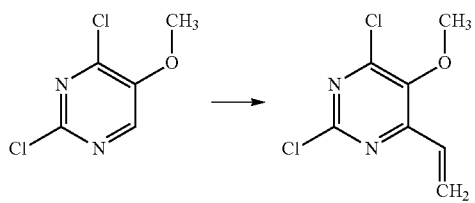

To a solution of commercially available 2,6-dichloro-5-methoxy pyrimidine (100 grams (g), 0.55 moles (mol)) in dry tetrahydrofuran (THF) was added, dropwise, 1 molar (M) vinyl magnesium bromide in tetrahydrofuran solvent (124 g, 0.94 mol) over one hour (h) at room temperature. The mixture was then stirred for 4 h at room temperature. Excess Grignard reagent was quenched by addition of acetone (200 milliliters (mL)) while the temperature of the mixture was maintained at a temperature below 20° C. Thereafter, 2,3-dichloro-5,6-dicyano-p-benzoquinone (DDQ; 151 g, 0.67 mol) was added at once and stirred overnight. A yellow solid precipitated out. The solid was filtered and washed with ethyl acetate (500 mL). The filtrate was concentrated under reduced pressure and the resulting crude compound was diluted with ethyl acetate (2 liters (L)). The resulting undissolved, dark, semi-solid was separated by filtration using ethyl acetate. It was further concentrated under reduced pressure to provide a crude compound, which was purified by column chromatography. The compound was eluted with 5% to 10% ethyl acetate in hexane mixture to provide the title compound (70 g, 60%): mp 60-61° C.; $^1$H NMR (CDCl$_3$) δ 3.99 (s, 3H), 5.85 (d, 1H), 6.75 (d, 1H), 6.95 (dd, 1H).

Example 4

Preparation of 2,6-dichloro-5-methoxy-pyrimidine-4-carbaldehyde

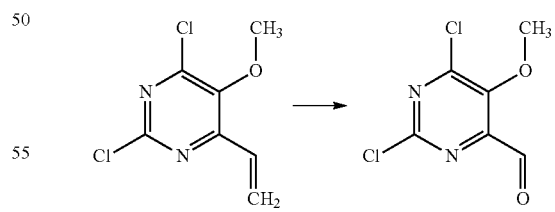

A solution of 2,6-dichloro-5-methoxy-4-vinyl pyrimidine (50 g, 0.24 mol) in dichloromethane:methanol (4:1, 2 L) was cooled to −78° C. Ozone gas was bubbled there through for 5 h. The reaction was quenched with dimethyl sulfide (50 mL). The mixture was slowly warmed to room temperature and concentrated under reduced pressure at 40° C. to provide the title compound (50.5 g, 100%) that was used in the next step without further purification.

Example 5

Preparation of methyl 2,6-dichloro-5-methoxy-pyrimidine-4-carboxylate

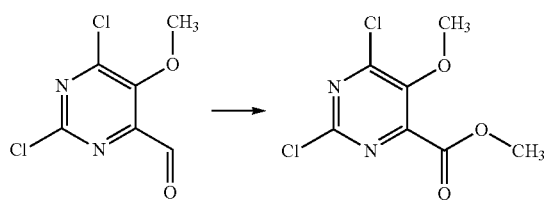

A solution of 2,6-dichloro-5-methoxy-pyrimidine-4-carbaldehyde (50 g, 0.24 mol) in methanol (1 L) and water (60 mL) was prepared. To the solution, sodium bicarbonate (400 g) was added. A 2 M solution of bromine (192 g, 1.2 mol) in methanol/water (600 mL, 9:1) was added dropwise to the pyrimidine solution over 45 minutes (min) at 0° C. while stirring the mixture. The stirring was continued at the same temperature for 1 h. Later, the mixture was stirred at room temperature for 4 h. While stirring, the reaction mixture was thereafter poured onto a mixture of crushed ice (2 L), sodium bisulfite (50 g), and sodium chloride (200 g). The product was extracted with ethyl acetate (1 L×2), and the combined organic layer was dried over sodium sulfate and filtered. Evaporation of the solvent under reduced pressure produced a thick material, which solidified on long standing to afford the title compound (50.8 g, 87%): ESIMS m/z 238 ([M+H]$^+$).

Example 6

Preparation of methyl 6-amino-2-chloro-5-methoxy-pyrimidine-4-carboxylate (Head C)

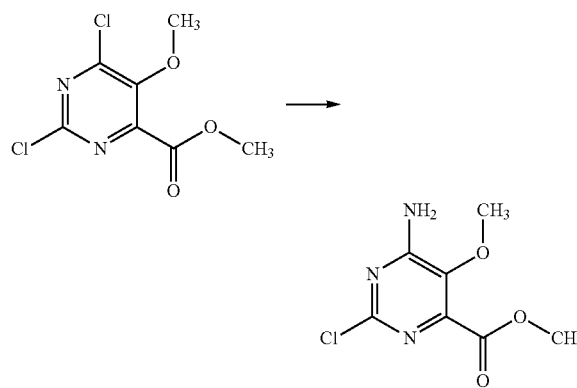

A solution of methyl 2,6-dichloro-5-methoxy-pyrimidine-4-carboxylate (25 g, 0.1 mol) and dimethyl sulfoxide (DMSO) was prepared. To this solution was added, at 0-5° C., a solution of ammonia (2 equivalents (equiv) in DMSO). This mixture was stirred at the same 0-5° C. temperature for 10 to 15 min. Later, the mixture was diluted with ethyl acetate, and the resulting solid was filtered off. The ethyl acetate filtrate was washed with a brine solution and dried over sodium sulfate. Upon concentration, the crude product was obtained. The crude product was stirred in a minimum amount of ethyl acetate and filtered to obtain the pure compound. Additional pure compound was obtained from the filtrate which, after concentration, was purified by flash chromatography. This produced the title compound (11 g, 50%): mp 158° C.; $^1$H NMR (DMSO-d$_6$) δ 3.71 (s, 3H), 3.86 (s, 3H), 7.65 (brs, 1H), 8.01 (brs, 1H).

Example 7

Preparation of methyl 4-amino-3,6-dichloro-5-Iodopicolinate

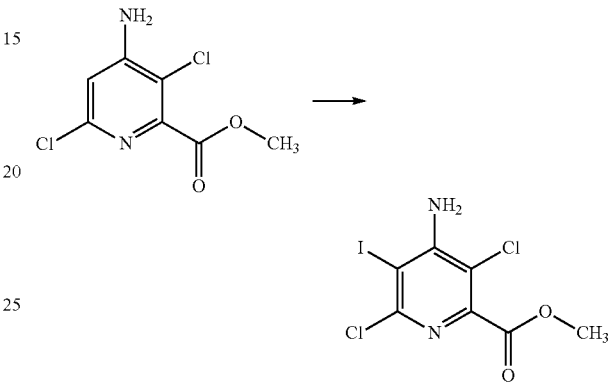

Methyl 4-amino-3,6-dichloropicolinate (10.0 g, 45.2 mmol), periodic acid (3.93 g, 17.2 millimoles (mmol)), and iodine (11.44 g, 45.1 mmol) were dissolved in methanol (30 mL) and stirred at reflux at 60° C. for 27 h. The reaction mixture was concentrated, diluted with diethyl ether, and washed twice with saturated aqueous sodium bisulfite. The aqueous layers were extracted once with diethyl ether, and the combined organic layers were dried over anhydrous sodium sulfate. The product was concentrated and purified by flash chromatography (silica gel; 0-50% ethyl acetate/hexanes) to provide the title compound as a pale yellow solid (12.44 g, 79%): mp 130.0-131.5° C.; $^1$H NMR (400 MHz, CDCl$_3$) δ 5.56 (s, 2H), 3.97 (s, 3H); $^{13}$C NMR (101 MHz, CDCl$_3$) δ 163.80, 153.00, 152.75, 145.63, 112.12, 83.91, 53.21; EIMS m/z 346.

Example 8

Preparation of methyl 4-amino-3,6-dichloro-5-methylpicolinate (Head D)

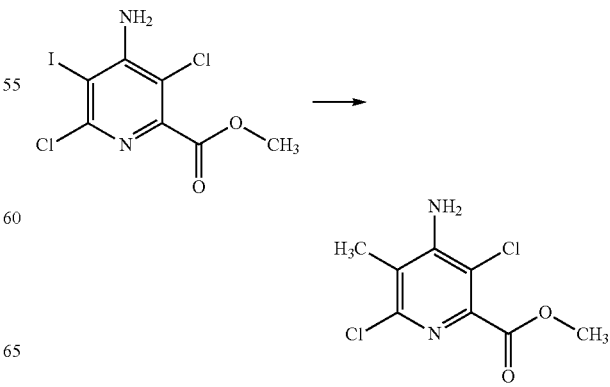

A mixture of methyl 4-amino-3,6-dichloro-5-iodopicolinate (8.1 g, 23.4 mmol), tetramethylstannane (8.35 g, 46.7 mmol), and bis(triphenylphosphine)palladium(II) chloride (2.5 g, 3.5 mmol) in 1,2-dichloroethane (40 mL) was irradiated in a Biotage Initiator™ microwave at 120° C. for 30 min, with external infrared (IR)-sensor temperature monitoring from the side. The reaction mixture was loaded directly onto a silica gel cartridge and purified by flash chromatography (silica gel; 0-50% ethyl acetate/hexanes) to provide the title compound as an orange solid (4.53 g, 83%): mp 133-136° C.; $^1$H NMR (400 MHz, CDCl$_3$) δ 4.92 (s, 2H), 3.96 (s, 3H), 2.29 (s, 3H); $^{13}$C NMR (101 MHz, CDCl$_3$) δ 164.34, 150.24, 148.69, 143.94, 117.01, 114.60, 53.02, 14.40; ESIMS m/z 236 ([M+H]$^+$), 234 ([M−H]$^−$).

Example 9

Preparation of methyl 6-amino-2,5-dichloropyrimidine-4-carboxylate (Head E)

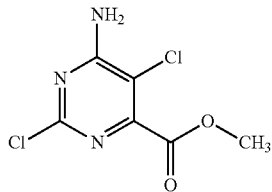

Prepared as described in Epp et al., WO 2007082076 A1.

Example 10

Preparation of methyl 4-amino-6-chloro-5-fluoro-3-methoxypicolinate (Head F)

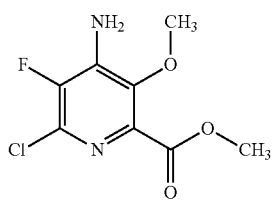

Prepared as described in Epp et al., WO 2013003740 A1.

Example 11

Preparation of methyl 4-amino-6-chloro-5-fluoro-3-vinylpicoilnate (Head G)

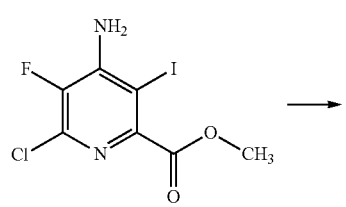

→

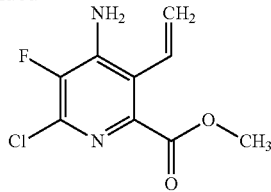

Methyl 4-amino-6-chloro-5-fluoro-3-iodopicolinate (7.05 g, 21.33 mmol, prepared as described in Epp et al., WO 2013003740 A1) and vinyltri-n-butyltin (7.52 mL, 25.6 mmol) were suspended in dichloroethane (71.1 mL) and the mixture was degassed with Argon for 10 min. Bis(triphenylphosphine)palladium(II) chloride (1.497 g, 2.133 mmol) was then added and the reaction mixture was stirred at 70° C. overnight (clear orange solution). The reaction was monitored by gas chromatography mass spectrometry (GCMS). After 20 h, the reaction mixture was concentrated, adsorbed onto Celite, and purified by column chromatography (silica gel (SiO$_2$); hexanes/ethyl acetate gradient) to afford the title compound as a light brown solid (3.23 g, 65.7%): mp 99-100° C.; $^1$H NMR (400 MHz, CDCl$_3$) δ 6.87 (dd, J=18.1, 11.6 Hz, 1H), 5.72 (dd, J=11.5, 1.3 Hz, 1H), 5.52 (dd, J=18.2, 1.3 Hz, 1H), 4.79 (s, 2H), 3.91 (s, 3H); $^{19}$F NMR (376 MHz, CDCl$_3$) δ −138.79 (s); EIMS m/z 230.

Example 12

Preparation of methyl 4-amino-3,5,6-trichloropicolinate (Head H)

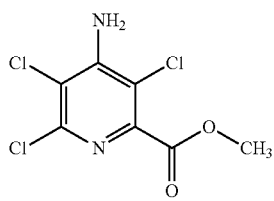

Prepared as described in Finkelstein et al., WO 2006062979 A1.

Example 13

Preparation of methyl 4-amino-6-bromo-3-chloro-5-fluoropicolinate (Head I)

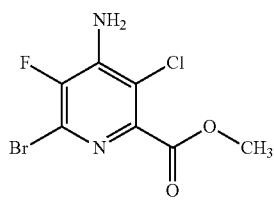

Prepared as described in Arndt et al., US 20120190857 A1.

Example 14

Preparation of methyl 4-amino-3-chloro-5-fluoro-6-(trimethylstannyl)picolinate (Head J)

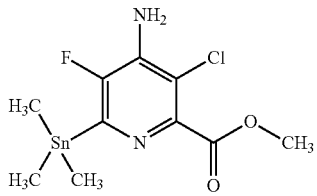

Methyl 4-amino-6-bromo-3-chloro-5-fluoropicolinate (500 milligrams (mg), 1.8 mmol), 1,1,1,2,2,2-hexamethyldistannane (580 mg, 1.8 mmol) and bis(triphenylphosphine)-palladium(II) chloride (120 mg, 0.18 mmol) were combined in dry dioxane (6 mL), sparged with a stream of nitrogen for 10 min and then heated to 80° C. for 2 h. The cooled mixture was stirred with ethyl acetate (25 mL) and saturated NaCl (25 mL) for 15 min. The organic phase was separated, filtered through diatomaceous earth, dried ($Na_2SO_4$) and evaporated. The residue was taken up in ethyl acetate (4 mL), stirred and treated in portions with hexane (15 mL). The milky white solution was decanted from any solids produced, filtered through glass wool and evaporated to give the title compound as an off-white solid (660 mg, 100%): $^1$H NMR (400 MHz, $CDCl_3$) δ 4.63 (d, J=29.1 Hz, 1H), 3.97 (s, 2H), 0.39 (s, 4H); $^{19}$F NMR (376 MHz, $CDCl_3$) δ −130.28; EIMS m/z 366.

Example 15

Preparation of methyl 4-acetamido-3-chloro-6-(trimethylstannyl)-picolinate (Head K)

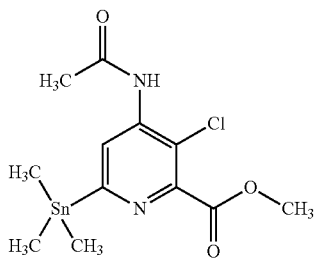

Prepared as described in Balko et al., WO 2003011853 A1.

Example 16

Preparation of methyl 4-acetamido-3,6-dichloropicolinate (Head L)

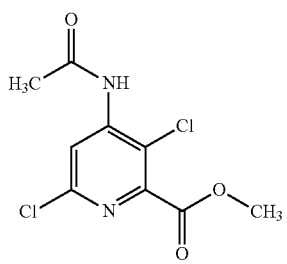 [SMILES: COC(=O)c1nc(Cl)cc(NC(C)=O)c1Cl]

Prepared as described in Fields et al., WO 2001051468 A1.

Example 17

Preparation of methyl 4-amino-3-chloro-6-Iodopicolinate (Head M)

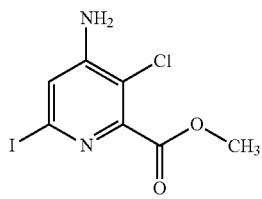

Prepared as described in Balko et al., WO 2007082098 A2.

Example 18

Preparation of methyl 4-acetamido-3-chloro-6-Iodopicolinate (Head N)

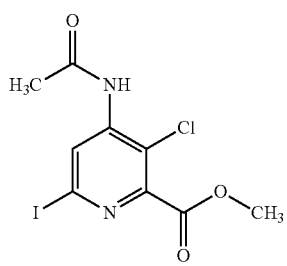 [SMILES: COC(=O)c1nc(I)cc(NC(C)=O)c1Cl]

Prepared as described in Balko et al., WO 2007082098 A2.

Example 19

Preparation of methyl 4-amino-6-bromo-3,5-dlfluoropicolinate (Head O)

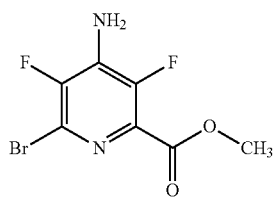

Prepared as described in Fields et al., WO 2001051468 A1.

Example 20

Preparation of methyl 6-amino-2-chloro-5-vinylpyrimidine-4-carboxylate (Head P)

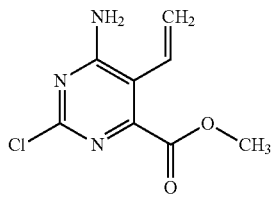

Prepared as described in Epp et al., US20090088322.

Example 22

Preparation of 1-bromo-4-chloro-2-(difluoromethyl)-3-fluorobenzene

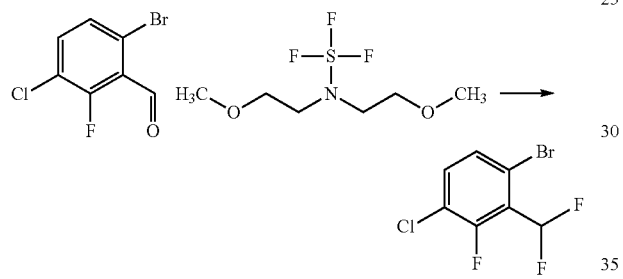

To a 50-mL round bottom flask equipped with a stir bar was added 6-bromo-3-chloro-2-fluorobenzaldehyde (0.750 g, 3.16 mmol) and dichloroethane (16 mL). The reaction was placed under a nitrogen ($N_2$) atmosphere and Deoxo-Fluor (2.33 mL, 12.6 mmol) was added. The flask was placed in a heating block and was warmed to 80° C. for 18 h. The reaction mixture was poured into 1 normal (N) sodium bicarbonate ($NaHCO_3$) and extracted with dichloromethane (3×75 mL). The combined organic layers were dried over anhydrous magnesium sulfate ($MgSO_4$), filtered and concentrated. The resulting residue was purified by flash chromatography (silica 0-30% ethyl acetate in hexane) to afford the title compound as a clear liquid (0.660 g, 81%): $^1$H NMR (400 MHz, DMSO-$d_6$) δ 7.77 (dd, J=8.9, 7.6 Hz, 1H), 7.62-7.71 (m, 1H), 7.29 (t, J=51.8 Hz, 1H); $^{19}$F NMR (376 MHz, DMSO-$d_6$) δ −113.87 (d, J=17.3 Hz), −115.21 (t, J=16.5 Hz); EIMS m/z 260.

Example 23

Preparation of 1-bromo-4-chloro-3-fluoro-2-(fluoromethyl)benzene

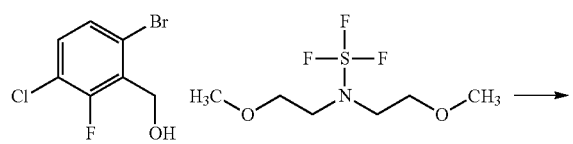

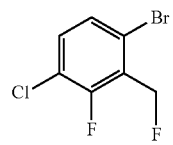

To a 50-mL round bottom flask equipped with a stir bar was added (6-bromo-3-chloro-2-fluorophenyl)methanol (0.750 g, 3.13 mmol), dichloroethane (16 mL), and Deoxo-Fluor (1.16 mL, 6.26 mmol). The flask was capped and placed in a heating block and was warmed to 80° C. for 18 h. The reaction mixture was poured into 1 M $NaHCO_3$ and extracted with dichloromethane (3×75 mL). The combined organic layers were dried over anhydrous $MgSO_4$, filtered and concentrated. The resulting residue was purified by flash chromatography (silica; 0-30% ethyl acetate in hexane) to afford the title compound as a clear liquid (0.509 g, 67%): $^1$H NMR (400 MHz, DMSO-$d_6$) δ 7.73-7.54 (m, 2H), 5.61 (d, J=2.4 Hz, 1H), 5.49 (d, J=2.4 Hz, 1H); $^{19}$F NMR (376 MHz, DMSO-$d_6$) δ −114.12 (d, J=3.6 Hz), −209.52 (d, J=3.2 Hz); EIMS m/z 241.

Example 24

Preparation of 2-(4-chloro-3-fluoro-2-methoxyphenyl)-4,4,5,5-tetramethyl-1,3,2-dioxaborolane

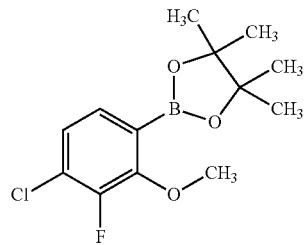 [SMILES: COc1c(B2OC(C)(C)C(C)(C)O2)ccc(Cl)c1F]

To a 200-mL round bottom flask, equipped with a stir bar, was added 1-bromo-4-chloro-3-fluoro-2-methoxybenzene (7.24 g, 30.2 mmol), 4,4,4',4',5,5,5',5'-octamethyl-2,2'-bi(1,3,2-dioxaborolane) (11.5 g, 45.4 mmol), potassium acetate (5.93 g, 60.5 mmol), and dioxane (120 mL). The reaction mixture was sparged with $N_2$ gas for 10 min. Then DppfP-dCl$_2$ (1.11 g, 1.51 mmol) was added as a solid. The flask was placed under $N_2$ atmosphere and heated to an internal temperature of 80° C. for 18 h. The reaction was cooled to room temperature and poured into brine solution and extracted with ethyl acetate (3×100 mL). The combined organic layers were dried over anhydrous $MgSO_4$, filtered and concentrated. The resulting residue was purified by flash chromatography (silica; 0-40% ethyl acetate in hexane) to afford the title compound as a clear colorless liquid: $^1$H NMR (400 MHz, DMSO-$d_6$) δ 7.41-7.27 (m, 2H), 3.83 (d, J=0.9 Hz, 3H), 1.30 (s, 12H); $^{19}$F NMR (376 MHz, DMSO-$d_6$) δ -134.50; EIMS m/z 286.

The following molecules were made in accordance with the procedures disclosed in Example 24:

2-(4-Chloro-3-fluoro-2-(fluoromethyl)phenyl)-4,4,5,5-tetramethyl-1,3,2-dioxaborolane

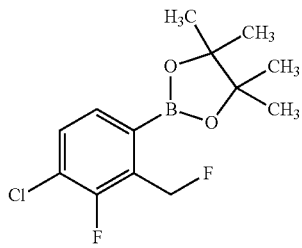 [SMILES: CC1(C)OB(c2ccc(Cl)c(F)c2CF)OC1(C)C]

The title compound was prepared as described in Example 24 with 1-bromo-4-chloro-3-fluoro-2-(fluoromethyl)benzene (0.387 g, 1.60 mmol) and isolated as a yellow solid (0.240 g, 52%): $^1$H NMR (400 MHz, DMSO-$d_6$) δ 7.68 (ddd, J=8.0, 7.0, 2.3 Hz, 1H), 7.54 (dt, J=7.9, 1.1 Hz, 1H), 5.75 (d, J=2.0 Hz, 1H), 5.63 (d, J=2.0 Hz, 1H), 1.30 (s, 12H); $^{19}$F NMR (376 MHz, DMSO-$d_6$) δ −120.36 (d, J=3.9 Hz), −203.92 (d, J=4.1 Hz); EIMS m/z 288.

3-Chloro-2-fluoro-6-(4,4,5,5-tetramethyl-1,3,2-dioxaborolan-2-yl)benzaldehyde

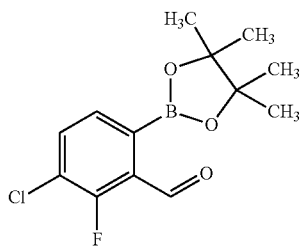 [SMILES: CC1(C)OB(c2ccc(Cl)c(F)c2C=O)OC1(C)C]

The title compound was prepared as described in Example 24 with 6-bromo-3-chloro-2-fluorobenzaldehyde (7.50 g, 31.6 mmol) and isolated as a yellow solid (6.28 g, 70%): $^1$H NMR (400 MHz, DMSO-$d_6$) δ 10.15 (s, 1H), 7.76 (dd, J=7.8, 7.0 Hz, 1H), 7.26 (d, J=7.8 Hz, 1H), 1.21 (s, 12H); $^{19}$F NMR (376 MHz, DMSO-$d_6$) δ −123.48; EIMS m/z 285.

Example 25

Preparation of 2-bromo-4-chloro-3,6-difluoroaniline

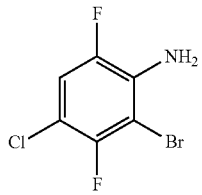 [SMILES: Nc1c(F)cc(Cl)c(F)c1Br]

4-Chloro-2,5-difluoroaniline (4.00 g, 24.46 mmol) was dissolved in acetonitrile (122 mL) and 1-bromopyrrolidine-2,5-dione (4.57 g, 25.7 mmol) was added. The reaction mixture was stirred for 1 h at room temperature, then concentrated under vacuum. The residue was partitioned between ethyl acetate and an aqueous solution of sodium sulfothioate (3.87 g, 24.46 mmol). The organic phase was concentrated onto silica gel and the product was purified by flash chromatography (SiO$_2$; eluting with hexanes first and eluting with 2-10% ethyl acetate in hexanes second) to provide the title compound as a light orange solid (5.13 g, 84%): mp 72-74° C.; $^1$H NMR (400 MHz, CDCl$_3$) δ 7.06 (dd, J=10.2, 6.4 Hz, 1H), 4.26 (s, 2H); $^{19}$F NMR (376 MHz, CDCl$_3$) δ −112.07, −112.10, −134.87, −134.90; EIMS m/z 242.9.

Example 26

Preparation of 4-chloro-3,6-difluoro-2-methylaniline

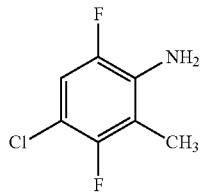

2-Bromo-4-chloro-3,6-difluoroaniline (2.000 g, 8.25 mmol), tetramethylstannane (7.38 g, 41.2 mmol), and bis(triphenylphosphine)palladium(II) chloride (0.579 g, 0.825 mmol) were combined in 1,2-dichloroethane (16.50 mL) and heated at 130° C. for 1 h in a microwave reactor. The cooled reaction mixture was concentrated under vacuum and purified by flash chromatography (SiO$_2$; eluting with hexanes first and eluting with 2-10% ethyl acetate in hexanes second) to provide the title compound as a clear oil (1.13 g, 74.8%): $^1$H NMR (400 MHz, CDCl$_3$) δ 6.92 (dd, J=10.2, 6.6 Hz, 1H), 3.74 (s, 2H), 2.12 (d, J=2.0 Hz, 3H); $^{19}$F NMR (376 MHz, CDCl$_3$) δ −124.06, −124.10, −138.64, −138.68; EIMS m/z 177.

Example 27

Preparation of 1-chloro-2,5-difluoro-4-Iodo-3-methylbenzene

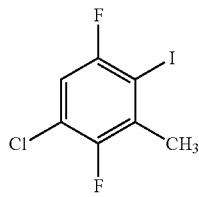

4-Chloro-3,6-difluoro-2-methylaniline (1.0 g, 5.63 mmol) was dissolved in acetonitrile (10 mL) and dichloromethane (20 mL) and cooled to 0° C. Nitrosyl tetrafluoroborate (0.658 g, 5.63 mmol) was added in a single portion, and the reaction mixture was stirred for 30 minutes at 0° C. Sodium iodide (4.2 g, 28.2 mmol) dissolved in a minimum amount of water was added and the and the ice bath was removed. The reaction mixture was stirred at room temperature for 1 h then diluted with dichloromethane (25 mL) and washed with a 5% solution of sodium thiosulfate (25 mL). The organic phase was concentrated and purified by flash chromatography (SiO$_2$; eluting with hexanes) to provide the title compound as a pink oil (1.2 g, 66.5%): $^1$H NMR (400 MHz, CDCl$_3$) δ 7.04 (m, 1H), 2.44 (m, 3H); $^{19}$F NMR (376 MHz, CDCl$_3$) δ −93.66, −93.70, −117.55, −117.59; EIMS m/z 288.

Example 28

Preparation of 1-bromo-3-fluoro-2-methyl-4-(trifluoromethyl)benzene

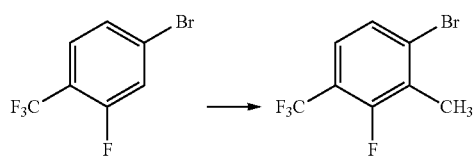

To a stirred solution of bis(isopropyl)amine (1.383 mL, 9.87 mmol) in THF (27.4 mL) at −78° C. was added n-butyllithium (3.62 mL, 9.05 mmol). The resulting pale yellow solution was stirred at −78° C. for 15 min, warmed to 0° C. for 15 min, then recooled to −78° C. for 15 min. 4-Bromo-2-fluoro-1-(trifluoromethyl)benzene (2 g, 8.23 mmol) was then added, and the resulting solution was stirred at −78° C. for 2 h. Iodomethane (0.512 mL, 8.22 μmol) was then added. The solution was allowed to slowly warm to room temperature (rt) and stirred overnight. The reaction mixture was diluted with 0.1 M hydrochloric acid (HCl) and extracted with dichloromethane. The combined organic layers were dried over MgSO$_4$, filtered, and concentrated in vacuo. The crude brown residue was purified via flash chromatography on silica (5-30% ethyl acetate (EtOAc)/Hexanes) to yield the title compound as a clear oil (1.7 g, 80%): $^1$H NMR (400 MHz, CDCl$_3$) δ 7.57-7.41 (m, 1H), 7.32-7.26 (m, 1H), 2.41 (dd, J=10.0, 8.3 Hz, 3H); $^{19}$F NMR (376 MHz, CDCl$_3$) δ −61.2, −105.7, −108.1; IR (thin film) 2177, 1319 cm$^{−1}$.

Example 29

Preparation of 2-(3-fluoro-2-methyl-4-(trifluoromethyl)phenyl)-4,4,5,5-tetramethyl-1,3,2-dioxaborolane

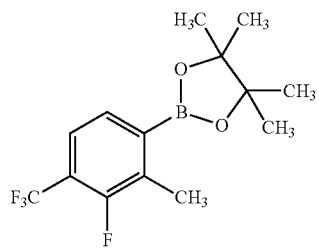 [SMILES: Cc1c(B2OC(C)(C)C(C)(C)O2)ccc(C(F)(F)F)c1F]

1-Nromo-3-fluoro-2-methyl-4-(trifluoromethyl)benzene (1.5 g, 5.84 mmol) was added dropwise to a solution of n-butyllithium (2.57 mL, 6.43 mmol) in THF (14.59 mL) that was cooled to −78° C. under nitrogen. The reaction mixture was stirred at −70-75° C. for 10 min, then 2-isopropoxy-4,4,5,5-tetramethyl-1,3,2-dioxaborolane (1.310 mL, 6.42 mmol) was added dropwise, keeping the temperature below −65° C. The reaction mixture was then allowed to warm to 0° C. Water was added, and the resulting mixture was extracted with diethyl ether (Et$_2$O). The aqueous phase was carefully acidified with 2M HCl, and extracted with Et$_2$O. The organic phase was dried and concentrated to give the title compound (0.8 g, 45%): $^1$H NMR (400 MHz, CDCl$_3$) δ 7.72-7.55 (m, 1H), 7.39 (d, J=7.8 Hz, 1H), 2.43-2.24 (m, 3H), 1.37 (s, 12H); $^{19}$F NMR (376 MHz, CDCl$_3$) δ −1.4, −104.3; IR (thin film) 2981, 1622 cm$^{−1}$.

Example 30

Preparation of 5-(4,4,5,5-tetramethyl-1,3,2-dioxaborolan-2-yl)-2-(trifluoromethyl)pyridine

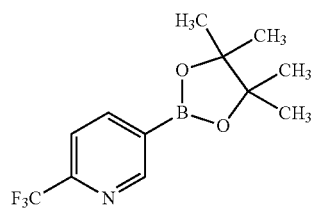 [SMILES: CC1(C)OB(c2ccc(C(F)(F)F)nc2)OC1(C)C]

A 2.5M solution of n-butyllithium (1.9 mL, 4.7 mmol, 1.2 equiv) was added to a stirred solution of 5-bromo-2-(trifluoromethyl)pyridine (890 mg, 3.9 mmol, 1.0 equiv) in tetrahydrofuran (80 mL) at −78° C. The resulting orange solution was stirred at −78° C. for 2 h. 2-Isopropoxy-4,4,5,5-tetramethyl-1,3,2-dioxaborolane (1.1 mL, 5.9 mmol, 1.5 equiv) was added and the light brown solution was allowed to slowly warm to 23° C., by allowing the dry ice/acetone bath to melt, and stirred for 20 h. The reaction mixture was diluted with 0.1M HCl (150 mL) and extracted with dichloromethane (3×50 mL). The combined organic layers were dried (MgSO$_4$), gravity filtered, and concentrated by rotary evaporation to afford the title compound as a tan semisolid (1.0 g, 91% crude yield): $^1$H NMR (300 MHz, CDCl$_3$) δ 9.04 (br s, 1H), 8.24 (d, J=8 Hz, 1H), 7.66 (dd, J=8, 1 Hz, 1H), 1.37 (s, 12H).

Example 31

Preparation of 6-chloro-2-fluoro-3-(4,4,5,5-tetramethyl-1,3,2-dioxaborolan-2-yl)pyridine

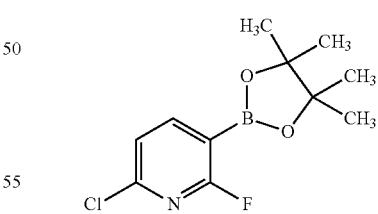

A 2.5M solution of n-butyllithium (3.6 mL, 9.1 mmol, 1.2 equiv) was added to a stirred solution of diisopropylamine (1.4 mL, 9.9 mmol, 1.3 equiv) in tetrahydrofuran (11 mL) at −78° C. The resulting pale yellow solution was stirred at −78° C. for 15 min, warmed to 0° C. and stirred for 15 min, and then cooled back to −78° C. and stirred for 15 min. A solution of 2-chloro-6-fluoropyridine (1.0 g, 7.6 mmol, 1.0 equiv) in tetrahydrofuran (9 mL) was added via cannula at −78° C. The resulting pale yellow mixture was stirred at −78° C. for 2 h. 2-Isopropoxy-4,4,5,5-tetramethyl-1,3,2-dioxaborolane (2.3 mL, 11 mmol, 1.5 equiv) was added and the reaction mixture was allowed to slowly warm to 23° C., by allowing the dry ice/acetone bath to melt, and stirred for 20 h. The reaction mixture was diluted with 2M sodium hydroxide (150 mL) and washed with Et$_2$O (3×50 mL). The aqueous layer was adjusted to pH 2, using concentrated HCl, and extracted with dichloromethane (4×50 mL). The combined organic layers were dried (MgSO$_4$), gravity filtered, and concentrated by rotary evaporation to afford the title compound as a colorless oil (1.9 g, 95% crude yield): $^1$H NMR (300 MHz, CDCl$_3$) δ 8.11 (t, J=8 Hz, 1H), 7.23 (dd, J=8, 2 Hz, 1H), 1.36 (s, 12H).

The following compound was made in accordance with the procedures disclosed in Example 31:

2-Fluoro-3-(4,4,5,5-tetramethyl-1,3,2-dioxaborolan-2-yl)-6-(trifluoromethyl)pyridine

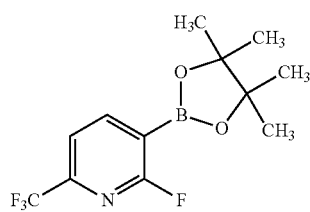 [SMILES: CC1(C)OB(c2ccc(C(F)(F)F)nc2F)OC1(C)C]

$^1$H NMR (300 MHz, CDCl$_3$) δ 8.36 (t, J=7.5, 1H), 7.57 (dd, J=8, 2 Hz, 1H), 1.37 (s, 12H).

Example 32

Preparation of 5-bromo-2-(difluoromethyl)pyridine

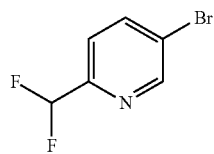

Deoxofluor® (1.7 mL, 9.1 mmol, 1.7 equiv) and ethanol (63 µL, 1.1 mmol, 0.20 equiv) were sequentially added to a stirred solution of 5-bromopicolinaldehyde (1.0 g, 5.4 mmol, 1.0 equiv) in dichloromethane (5.4 mL) at 0° C. The resulting orange solution was allowed to slowly warm to 23° C. and stirred for 18 h. The dark brown reaction mixture was quenched with saturated sodium bicarbonate solution (6 mL) and stirred at 23° C. for 1 h. The reaction mixture was diluted with water (100 mL) and extracted with dichloromethane (3×50 mL). The combined organic layers were washed with 0.1M HCl (1×150 mL), dried (MgSO$_4$), gravity filtered, and concentrated by rotary evaporation to afford the title compound as a brown semisolid (400 mg, 36%): IR (thin film) 3051 (m), 2925 (s), 2853 (m), 1641 (w) cm$^{-1}$; $^1$H NMR (300 MHz, CDCl$_3$) δ 8.72 (d, J=2 Hz, 1H), 7.98 (dd, J=8, 2 Hz, 1H), 7.55 (d, J=8 Hz, 1H), 6.61 (t, J=55 Hz, 1H).

Example 33

Preparation of 2-(difluoromethyl)-5-(4,4,5,5-tetramethyl-1,3,2-dioxaborolan-2-yl)pyridine

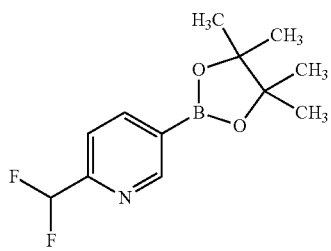 [SMILES: CC1(C)OB(c2ccc(C(F)F)nc2)OC1(C)C]

Dichloro[1,1'-bis(diphenylphosphino)ferrocene]-palladium(II) (42 mg, 0.058 mmol, 0.03 equiv), potassium acetate (570 mg, 5.8 mmol, 3.0 equiv), and diboron bis (pinocol) ester (490 mg, 1.9 mmol, 1.0 equiv) were sequentially added to a stirred solution of 5-bromo-2-(difluoromethyl)pyridine (400 mg, 1.9 mmol, 1.0 equiv) in N,N-dimethylformamide (4.8 mL) at 23° C. The resulting dark brown mixture was sealed under nitrogen, heated to 80° C., and stirred for 24 h. The cooled reaction mixture was diluted with water (400 mL) and extracted with Et$_2$O (4×100 mL). The combined organic layers were dried (MgSO$_4$), gravity filtered, and concentrated by rotary evaporation to afford the title compound as a brown semisolid (500 mg, 99% crude yield): IR (neat film) 2996 (s), 2935 (w), 1668 (w), 1600 (m) cm$^{-1}$; $^1$H NMR (300 MHz, CDCl$_3$) δ 8.96 (br s, 1H), 8.21 (dd, J=8, 1.5 Hz, 1H), 7.62 (d, J=8 Hz, 1H), 6.64 (t, J=55 Hz, 1H), 1.36 (s, 9H).

The following compound was made in accordance with the procedures disclosed in Example 33:

2-(4-Bromo-3-methoxyphenyl)-4,4,5,5-tetramethyl-1,3,2-dioxaborolane

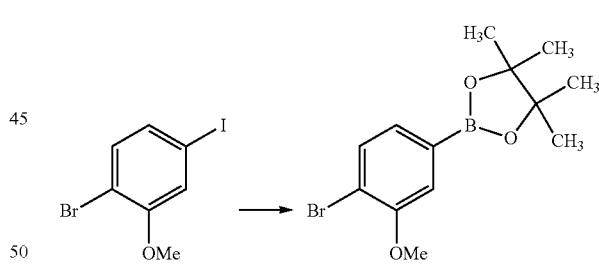

$^1$H NMR (400 MHz, CDCl$_3$) δ 7.55 (d, J=8 Hz, 1H), 7.29 (d, J=1 Hz, 1H), 7.26 (dd, J=8, 1 Hz, 1H), 3.93 (s, 3H), 1.30 (s, 12H).

Example 34

Preparation of 6-bromo-3-chloro-2-fluorophenol

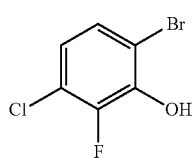

To a 200 mL flask charged with THF (40 mL) and cooled in a dry ice acetone bath was added diisopropylamine (5.02 mL, 35.8 mmol) followed by n-butyllithium (11.94 mL, 29.8 mmol). The reaction flask was warmed to 0° C. and then cooled to −78° C. in a dry ice/acetone bath. 4-Bromo-1-chloro-2-fluorobenzene (5.0 g, 23.87 mmol) was added in one portion. After 60 min at −78° C. had passed, trimethyl borate (10.65 mL, 95 mmol) was added was added, the dry ice acetone bath was removed and the reaction mixture was allowed to warm to room temperature. The reaction mixture was then cooled back to −78° C. and acetic acid (5.47 mL, 95 mmol) and hydrogen peroxide (9.75 mL, 95 mmol) were added. The reaction mixture was again allowed to warm to room temperature. The reaction mixture was diluted with 2N NaOH (100 mL) and washed with Et$_2$O (100 mL). The aqueous layer was neutralized with 2N HCl and washed with Et$_2$O (100 mL×3). The organic layers were combined, dried over Na$_2$SO$_4$, and filtered. The solution was concentrated onto 5 g of Celite® using EtOAc as solvent. The impregnated Celite® was loaded onto a silica gel column and purified by flash chromatography using 0-30% EtOAc:hexanes to yield 6-bromo-3-chloro-2-fluorophenol as a light brown oil (608 mg, 11%): $^1$H NMR (400 MHz, DMSO-d$_6$) δ 6.96 (dd, J=8.8, 7.1 Hz, 1H), 7.36 (dd, J=8.8, 2.1 Hz, 1H), 10.98 (s, 1H); $^{19}$F NMR (376 MHz, DMSO-d$_6$) δ −132.58; ESIMS m/z 226 ([M+H]+1).

Example 35

Preparation of 1-bromo-4-chloro-3-fluoro-2-methoxybenzene

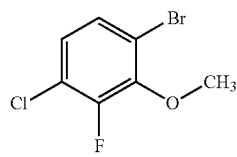

To a 100 mL flask charged with acetone (20 mL) was added 6-bromo-3-chloro-2-fluorophenol (1.0 g, 4.44 mmol) and potassium carbonate (0.920 g, 6.65 mmol). This suspension was stirred for 30 min at rt. Then iodomethane (0.414 mL, 6.65 mmol) was added and the reaction mixture was stirred in a heating block that was pre-heated to 65° C. The reaction mixture was diluted with water (100 mL) and EtOAc (100 mL). The aqueous layer was washed with EtOAc (100 mL×3). The combined organic extracts were washed with saturated NaCl solution (100 mL) and dried over MgSO$_4$. Following filtration, the organics were concentrated to afford 1-bromo-4-chloro-3-fluoro-2-methoxybenzene (800 mg, 75%) as a dark brown liquid that was used without further purification: $^1$H NMR (400 MHz, DMSO-d$_6$) δ 3.90 (d, J=1.4 Hz, 3H), 7.24-7.36 (m, 1H), 7.49 (dt, J=9.1, 2.0 Hz, 1H). $^{19}$F NMR (376 MHz, DMSO-d$_6$) δ −128.75; ESIMS m/z 240 ([M+H]+1).

Example 36

Preparation of 1-bromo-4-chloro-3-fluoro-2-methylbenzene

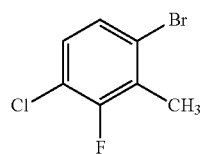

To a 500 mL flask charged with THF (100 mL) was added diisopropyl amine (7.49 mL, 52.5 mmol). The reaction flask was cooled to −78° C. in a dry ice acetone bath and n-butyllithium (3.06 g, 47.7 mmol) was added. After 40 min of stirring at −78° C., 4-bromo-1-chloro-2-fluorobenzene (10 g, 47.7 mmol) was added in one portion. Once an additional 40 min at −78° C. had passed, iodomethane (8.96 mL, 143 mmol) was added, the dry ice acetone bath was removed and the reaction mixture was allowed to warm to room temperature. The reaction mixture was diluted with CH$_2$Cl$_2$ (300 mL) and washed with 1M sodium bisulfate (NaHSO$_4$; 200 mL) followed by saturated NaHCO$_3$ (200 mL). The resulting organic layer was passed through a cotton plug and concentrated to afford 1-bromo-4-chloro-3-fluoro-2-methylbenzene (10.1 g; 94%) as a clear oil: $^1$H NMR (400 MHz, CDCl$_3$) δ 7.27 (dt, J=8.9, 2.1 Hz, 1H), 7.14-7.02 (m, 1H), 2.35 (s, 3H); $^{19}$F NMR (376 MHz, CDCl$_3$) δ −112.42; ESIMS m/z 256 ([M+H]+1).

Example 37

Preparation of 6-bromo-3-chloro-2-fluorophenyl)(methyl)sulfane

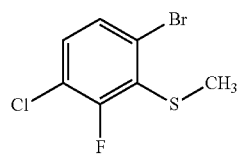

To a 500 mL flask charged with THF (100 mL) was added diisopropylamine (2.66 g, 26.3 mmol). The reaction flask was cooled to −78° C. in a dry ice acetone bath and n-butyllithium (1.45 g, 22.7 mmol) was added. After 1 h of stirring at −78° C., 4-bromo-1-chloro-2-fluorobenzene (5 g, 23.87 mmol) was added down the side of the flask. Once an additional hour at −78° C. had passed, the solution was transferred via canula to a 500 mL flask containing 1,2-dimethyldisulfane (22.5 g, 239 mmol) and THF (30 mL) in a dry ice/acetone bath. After the transfer was complete the dry ice acetone bath was removed and the reaction mixture was allowed to warm to room temperature. The reaction mixture was diluted with CH$_2$Cl$_2$ (300 mL) and washed with 1M NaHSO$_4$ (200 mL) followed by saturated NaHCO$_3$ (200 mL). The resulting organic layer was passed through a cotton plug and concentrated. The resulting residue was purified by flash chromatography with a gradient eluent system of hexanes and EtOAc to afford 6-bromo-3-chloro-2-fluorophenyl)(methyl)sulfane (1 g of; 16%) as a clear oil: $^1$H NMR (400 MHz, CDCl$_3$) δ 7.36 (dd, J=8.7, 1.6 Hz, 1H), 7.19 (dd, J=8.7, 7.3 Hz, 1H), 2.51 (d, J=1.5 Hz, 3H); $^{13}$C NMR (101 MHz, CDCl$_3$) δ 159.70, 157.22, 130.08, 128.65, 128.61, 126.77, 121.25, 121.05, 120.38, 120.14, 18.30, 18.23; ESIMS m/z 256 ([M+H]+1).

Example 38

Preparation of 1-bromo-4-chloro-2-ethyl-3-fluorobenzene

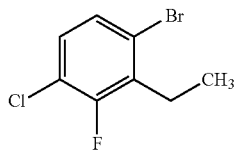

To a 500 mL flask charged with THF (100 mL) was added diisopropyl amine (7.49 mL, 52.5 mmol). The reaction flask was cooled to −78° C. in a dry ice acetone bath and n-butyllithium (3.06 g, 47.7 mmol) was added. After 40 min of stirring at −78° C., 4-bromo-1-chloro-2-fluorobenzene (10 g, 47.7 mmol) was added in one portion. Once an additional 40 min at −78° C. had passed, iodoethane (37.2 g, 239 mmol) was added, the dry ice acetone bath was removed and the reaction mixture was allowed to warm to room temperature. The reaction mixture was diluted with CH$_2$Cl$_2$ (50 mL) and washed with 1M NaHSO$_4$ (50 mL) followed by saturated NaHCO$_3$ (50 mL). The resulting organic layer was passed through a cotton plug and concentrated to afford a clear oil with a 2.3:1 ratio of product to starting material that was used in the next step without further purification (7.4 g): $^1$H NMR (400 MHz, CDCl$_3$) δ 7.38-7.20 (m, 1H), 7.11 (t, J=8.1 Hz, 1H), 2.84 (dq, J=7.6, 2.6 Hz, 2H), 1.18 (t, J=7.5 Hz, 3H); $^{19}$F NMR (376 MHz, CDCl$_3$) δ −115.10; ESIMS m/z 238 ([M+H]+1).

Example 39

Preparation of 2-(4-chloro-3-fluoro-2-methylphenyl)-5,5-dimethyl-1,3,2-dioxaborinane

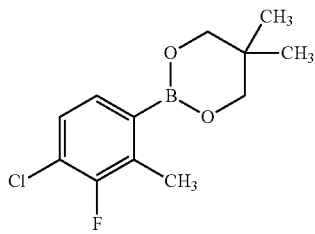 [SMILES: Cc1c(B2OCC(C)(C)CO2)ccc(Cl)c1F]

To a 20 mL vial charged with DMSO (10 mL) was added 5,5,5',5'-tetramethyl-2,2'-bi(1,3,2-dioxaborinane), 1-bromo-4-chloro-3-fluoro-2-methylbenzene (0.8 g, 3.58 mmol), potassium acetate (1.05 g, 10.74 mmol), and PdCl$_2$(dppf) (0.262 g, 0.358 mmol). The reaction mixture was heated to an external temperature of 80° C. for 18 h. Upon cooling, the reaction mixture was poured ice water (50 mL). The ice water mixture was transferred to a separatory funnel and two extractions with EtOAc (50 mL) were completed. The organic layers were combined, dried over Na$_2$SO$_4$, and filtered. The solution was concentrated onto 5 g of Celite® using EtOAc as solvent. The impregnated Celite® was loaded onto a silica gel column and purified by flash chromatography using 0-30% EtOAc:hexanes to yield 2-(4-chloro-3-fluoro-2-methylphenyl)-5,5-dimethyl-1,3,2-dioxaborinane as a yellow oil (338 mg, 36%): $^1$H NMR (400 MHz, CDCl$_3$) δ 7.42 (dd, J=8.1, 1.2 Hz, 1H), 7.21-7.13 (m, 1H), 3.77 (s, 4H), 2.45 (d, J=2.8 Hz, 3H), 1.03 (s, 6H); $^{13}$C NMR (101 MHz, CDCl$_3$) δ 157.72, 155.28, 132.19, 132.04, 130.54, 130.49, 126.79, 122.79, 122.60, 72.34, 31.64, 21.83, 13.51, 13.46; ESIMS m/z 257 ([M+H]+1).

The following compounds were made in accordance with the procedures disclosed in Example 39:

2-(4-Chloro-3-fluoro-2-(methylthio)phenyl)-5,5-dimethyl-1,3,2-dioxaborinane

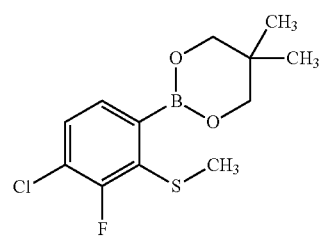 [SMILES: CSc1c(B2OCC(C)(C)CO2)ccc(Cl)c1F]

$^1$H NMR (400 MHz, CDCl$_3$) δ 7.32-7.27 (m, 1H), 7.19 (dd, J=8.0, 1.1 Hz, 1H), 3.79 (s, 4H), 2.46 (d, J=1.2 Hz, 3H), 1.08 (s, 6H); IR (thin film) 669.71, 813.78, 796.08, 867.93, 999.49, 1032.28, 1130.46, 1174.76, 1249.33, 1419.57, 1477.06, 1580.82, 2961.20, 2929.68, 1304.44, 1334.69, 1382.43 cm-1; ESIMS m/z 289 ([M+H]+1).

2-(4-Chloro-2-ethyl-3-fluorophenyl)-5,5-dimethyl-1,3,2-dioxaborinane

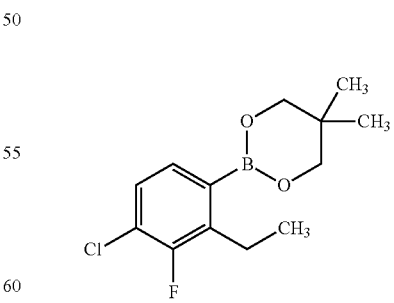

$^1$H NMR (400 MHz, CDCl$_3$) δ 7.43 (dd, J=8.1, 1.2 Hz, 1H), 7.18 (dd, J=8.1, 6.8 Hz, 1H), 3.77 (s, 4H), 2.94 (qd, J=7.5, 2.5 Hz, 2H), 1.16 (t, J=7.5 Hz, 4H), 1.03 (s, 6H); $^{19}$F NMR (376 MHz, CDCl$_3$) δ −122.68; ESIMS m/z 271 ([M+H]+1).

Example 40

Preparation of 2-(4-chloro-3-fluoro-2-methoxyphenyl)-4,4,5,5-tetramethyl-1,3,2-dloxaborolane

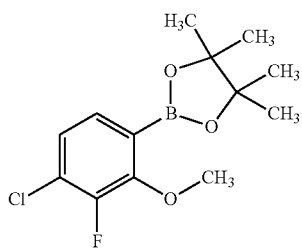 [SMILES: COc1c(B2OC(C)(C)C(C)(C)O2)ccc(Cl)c1F]

To a 100 mL flask charged with THF (25 mL) was added 1-chloro-2-fluoro-3-methoxybenzene (1 g, 6.23 mmol). The reaction flask was cooled to −78° C. in a dry ice acetone bath and n-butyllithium (0.399 g, 6.23 mmol) was added. After 40 min of stirring at −78° C. the reaction mixture was warmed to an internal temperature of −40° C. and the cooled to −78° C. in a dry ice acetone bath. 2-Isopropoxy-4,4,5,5-tetramethyl-1,3,2-dioxaborolane (1.159 g, 6.23 mmol) in THF (5 mL) was added in one portion. The dry ice/acetone bath was removed and the reaction mixture was allowed to warm to room temperature. The reaction mixture was nuetralized with 1N HCl solution and diluted with Et$_2$O (50 mL) and water. The resulting organic layer was dried over Na$_2$SO$_4$, filtered and concentrated to give 1:1 mixture of 2-(4-chloro-3-fluoro-2-methoxyphenyl)-4,4,5,5-tetramethyl-1,3,2-dioxaborolane and 2-(2-chloro-3-fluoro-4-methoxyphenyl)-4,4,5,5-tetramethyl-1,3,2-dioxaborolane as light yellow oil that was used in the next step without further purification (300 mg): ESIMS m/z 271 ([M+H]+1).

Example 41

Preparation of 2-(2,4-dichloro-3-fluorophenyl)-4,4,5,5-tetramethyl-1,3,2-dioxaborolane

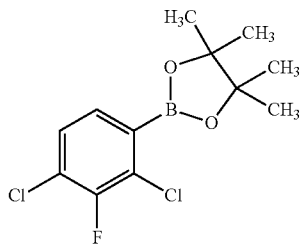 [SMILES: CC1(C)OB(c2ccc(Cl)c(F)c2Cl)OC1(C)C]

To a 200 mL flask charged with THF (20 mL) was added 1,3-dichloro-2-fluorobenzene (3 g, 18.18 mmol). The reaction mixture was cooled to −78° C. in a dry ice/acetone bath. 2.5 M n-Butyllithium in hexanes (1.4 g, 24.8 mmol) was added slowly down the sides of the flask. After allowing the reaction mixture to stir for 1 hour at −78° C., 2-isopropoxy-4,4,5,5-tetramethyl-1,3,2-dioxaborolane (4.06 g, 21.82 mmol) in a solution of THF (10 mL) was added all at once. The reaction mixture was allowed to warm slowly to room temperature overnight. The solution was then neutralized with 2N HCl and diluted with water (200 mL). The aqueous layer was washed with Et$_2$O (200 mL×2). The organic layers were combined, dried over MgSO$_4$, and filtered. The solution was concentrated onto 8 g of Celite® using EtOAc as solvent. The impregnated Celite® was loaded onto a silica gel column and purified by flash chromatography using 0-30% EtOAc:hexanes to yield 2-(2,4-dichloro-3-fluorophenyl)-4,4,5,5-tetramethyl-1,3,2-dioxaborolane as a clear oil (1.8 g, 34%).

Example 42

Preparation of (4-bromo-2-fluoro-3-methylphenyl)dimethyl(phenyl)silane

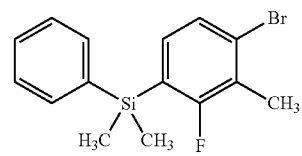 [SMILES: Cc1c(Br)ccc([Si](C)(C)c2ccccc2)c1F]

To a 100 mL flask charged with THF (30 mL) was added diisopropylamine (1.285 g, 12.70 mmol). The reaction flask was cooled to −78° C. in a dry ice acetone bath and n-butyllithium (0.746 g, 11.64 mmol) was added. After 40 min of stirring at −78° C., 1-bromo-3-fluoro-2-methylbenzene (2 g, 10.58 mmol) in THF (10 mL) was added dropwise. Once an additional 40 min at −78° C. had passed, chlorodimethyl(phenyl)silane (5.42 g, 31.7 mmol) was added in one portion, the dry ice/acetone bath was removed and the reaction mixture was allowed to warm to room temperature. The reaction mixture was neutralized with a 5% HCl solution and diluted with water (200 mL). The aqueous solution was washed with EtOAc (200 mL×2). The combined organic layers were dried over Na$_2$SO$_4$. Following filtration, the organics were concentrated and the resulting residue was purified by flash chromatography with a gradient eluent system of hexanes and EtOAc to yield a clear oil as a mixture of products that contained (4-bromo-2-fluoro-3-methylphenyl)dimethyl(phenyl)silane which was used without further purification (850 mg): ESIMS m/z 324 ([M+H]+1).

Example 43

Preparation of (4-(5,5-dimethyl-1,3,2-dioxaborinan-2-yl)-2-fluoro-3-methylphenyl)dimethyl(phenyl)silane

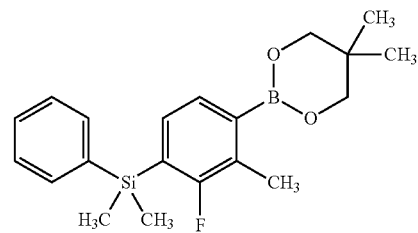 [SMILES: Cc1c(B2OCC(C)(C)CO2)ccc([Si](C)(C)c2ccccc2)c1F]

To a 20 mL vial charged with DMSO (10 mL) was added PdCl$_2$(dppf) (0.226 g, 0.309 mmol), potassium acetate (0.911 g, 9.28 mmol), (4-bromo-2-fluoro-3-methylphenyl)dimethyl(phenyl)silane (1 g, 3.09 mmol), and 5,5,5',5'- tetramethyl-2,2'-bi(1,3,2-dioxaborinane) (1.537 g, 6.81 mmol). The reaction mixture was heated to an external temperature of 80° C. for 18 hours. Upon cooling, the reaction mixture was poured into ice water (50 mL). The ice water mixture was transferred to a separatory funnel and two extractions with EtOAc (50 mL) were completed. The organic layers were combined, dried over $Na_2SO_4$, and filtered. The solution was concentrated onto 5 g of Celite® using EtOAc as solvent. The impregnated celite was loaded onto a silica gel column and purified by flash chromatography using 0-30% EtOAc:hexanes to yield (4-(5,5-dimethyl-1,3,2-dioxaborinan-2-yl)-2-fluoro-3-methylphenyl)dimethyl(phenyl)silane in a mixture of silated materials as a clear oil that was used in the next step without further purification (425 mg): ESIMS m/z 324 ([M+H]+1).

Example 44

Preparation of 6-bromo-3-chloro-2-methoxybenzaldehyde

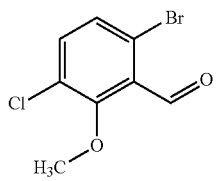

Sodium methoxide was prepared with dry methanol (20 mL) and sodium metal (650 mg, 28 mmol), treated with 6-bromo-3-chloro-2-fluorobenzaldehyde (1.7 g, 7.0 mmol) and heated at reflux for 90 min. After cooling, the volatiles were removed under vacuum, and the residue was partitioned between 2N HCl and ethyl acetate. The organic phase was washed with saturated NaCl, dried ($Na_2SO_4$), and evaporated to provide the title compound as a tan solid which was used without further purification (1.8 g, 100%): $^1$H NMR (400 MHz, $CDCl_3$) δ 10.31 (s, 1H), 7.43 (d, J=8.6 Hz, 1H), 7.39 (d, J=8.6 Hz, 1H), 7.47-7.35 (m, 1H), 3.96 (s, 3H); EIMS m/z 248.

Example 45

Preparation of 1-bromo-4-chloro-2-(difluoromethyl)-3-methoxybenzene

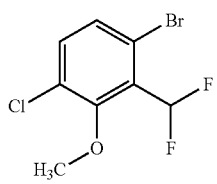

6-Bromo-3-chloro-2-methoxybenzaldehyde (1.6 g, 6.4 mmol) was dissolved in dry dichloromethane (15 mL), cooled in an ice-salt bath and treated with diethylaminosulfur trifluoride (DAST; 1.1 mL, 1.3 g, 8.0 mmol). The reaction mixture was allowed to warm to 20° C. and stir for 20 h. The solution was washed with water, washed with saturated NaCl, dried ($Na_2SO_4$), and concentrated under vacuum. Purification by flash chromatography ($SiO_2$; eluting with 5% EtOAc in hexanes) provided the title compound as a clear liquid (1.2 g, 70%): $^1$H NMR (400 MHz, $CDCl_3$) δ 7.35 (d, J=0.5 Hz, 1H), 7.07 (t, 1H), 3.94 (s, 3H); EIMS m/z 270.

Example 46

Preparation of 5-bromo-2-(difluoromethoxy)pyridine

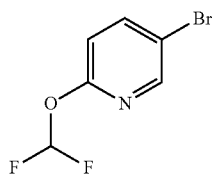 [SMILES: FC(F)Oc1ccc(Br)cn1]

5-Bromopyridin-2-ol (10.0 g, 58 mmol), cesium carbonate (29 g, 87 mmol) and sodium 2-chloro-2,2-difluoroacetate (8.9 g, 58 mmol) were combined in dry N,N-dimethylformamide (DMF; 200 mL) and heated to 100° C. for 3 h to produce a 3:1 mixture of isomeric O and N-difluoromethylated products. The cooled mixture was diluted with water (300 mL) and extracted with ether (250 mL). The organic phase was washed with water, washed with saturated NaCl, dried ($Na_2SO_4$), and evaporated. The major isomer, the O-alkylated product was isolated by flash chromatography ($SiO_2$; eluting with 0-30% EtOAc in hexane) as the less polar component to provide the title compound as a clear liquid (6.7 g, 50%): $^1$H NMR (400 MHz, $CDCl_3$) δ 8.25 (d, J=2.4 Hz, 1H), 7.82 (dd, J=8.7, 2.5 Hz, 1H), 7.40 (t, J=72.7 Hz, 1H), 6.83 (dd, J=8.7, 0.5 Hz, 1H); $^{19}$F NMR (376 MHz, $CDCl_3$) δ −89.12; EIMS m/z 223.

Example 47

Preparation of 2-(difluoromethoxy)-5-(4,4,5,5-tetramethyl-1,3,2-dioxaborolan-2-yl)pyridine

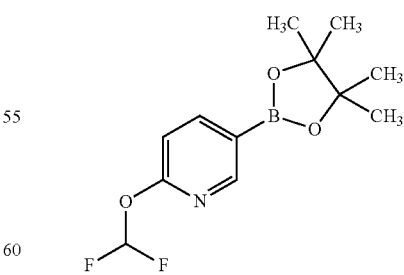

5-Bromo-2-(difluoromethoxy)pyridine (1.0 g, 4.5 mmol) was dissolved in dry THF (10 mL), cooled to 0° C., and treated in portions with isopropylmagnesium lithium chloride complex (1.3 M; 3.3 mL, 4.3 mmol). The mixture was allowed to warm to 20° C., stirred for 2 h, treated with 2-isopropoxy-4,4,5,5-tetramethyl-1,3,2-dioxaborolane (910 µl, 4.3 mmol) and stirred for 70 min more. The mixture was quenched with saturated ammonium chloride (NH₄Cl; 5 mL) and partitioned between ethyl acetate and water. The organic phase was washed with saturated NaCl, dried (Na₂SO₄), and evaporated to provide the title compound as a brown oil that was used without further purification (1.1 g, 86%): $^1$H NMR (400 MHz, CDCl₃) 8.54 (dd, J=1.9, 0.6 Hz, 1H), 8.07 (dd, J=8.2, 1.9 Hz, 1H), 7.54 (t, J=73.0 Hz, 2H), 6.87 (dd, J=8.2, 0.8 Hz, 1H), 1.34 (s, 13H); $^{19}$F NMR (376 MHz, CDCl₃) δ −89.22.

Example 48

Preparation of methyl 4-amino-3-chloro-6-(4-chloro-3-fluoro-2-methoxyphenyl)-5-fluoropicolinate (Compound 39)

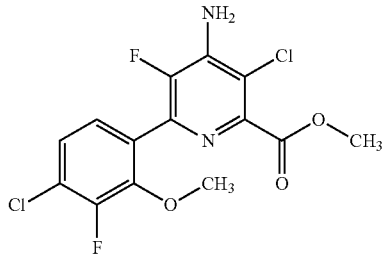 [SMILES: COC(=O)c1nc(-c2ccc(Cl)c(F)c2OC)c(F)c(N)c1Cl]

To a 10-mL microwave reaction vessel, equipped with a stir bar, was added Head B (400 mg, 1.67 mmol), 2-(4-chloro-3-fluoro-2-methoxyphenyl)-4,4,5,5-tetramethyl-1,3,2-dioxaborolane (621 mg, 1.84 mmol), cesium fluoride (508 mg, 3.35 mmol), and bis(triphenylphosphine)palladium(II) dichloride (117 mg, 0.167 mmol) as solids. The vessel was sealed and placed under N₂ atmosphere. Dioxane (5.0 mL) and H₂O (1.0 mL) were then added. The reaction mixture was placed on a Biotage Initiator™ microwave reactor for 60 min at 120° C., with external IR-sensor temperature monitoring from the side of the vessel. The reaction mixture was poured into brine solution and extracted with ethyl acetate (3×50 mL). The combined organic layers were dried over anhydrous MgSO₄, filtered and concentrated. The resulting residue was purified by flash chromatography (0-40% EtOAc in hexane) and reverse phase chromatography (0-100% acetonitrile in H₂O), as needed, to afford the title compound as light tan solid (428 mg, 70%).

The following compounds were made in accordance with the procedures disclosed in Example 48:

Methyl 6-amino-2-(4-chloro-3-fluoro-2-methoxyphenyl)-5-methoxypyrimidine-4-carboxylate (Compound 70)

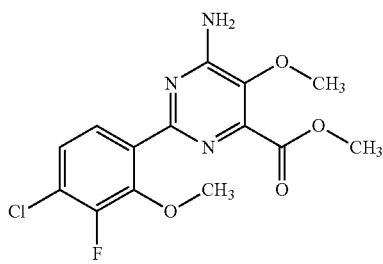 [SMILES: COC(=O)c1nc(-c2ccc(Cl)c(F)c2OC)nc(N)c1OC]

The title compound was prepared as described in Example 48 with Head C (400 mg, 1.84 mmol) and isolated as an off white solid (484 mg, 77%).

Methyl 4-acetamido-3-chloro-6-(4-chloro-3-fluoro-2-(fluoromethyl)phenyl)

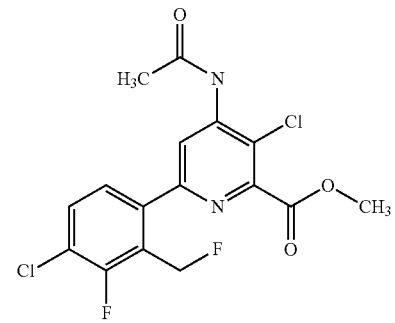 [SMILES: COC(=O)c1nc(-c2ccc(Cl)c(F)c2CF)cc(NC(C)=O)c1Cl]

The title compound was prepared as described in Example 48 with Head L (328 mg, 1.25 mmol) and 2-(4-chloro-3-fluoro-2-(fluoromethyl)phenyl)-4,4,5,5-tetramethyl-1,3,2-dioxaborolane (240 mg, 0.832 mmol) and isolated as an off white solid (303 mg, 94%): $^1$H NMR (400 MHz, DMSO-d₆) δ 10.03 (s, 1H), 8.39 (d, J=33.1 Hz, 1H), 7.72-7.90 (m, 1H), 7.44 (dt, J=8.6, 1.2 Hz, 1H), 5.56 (dd, J=47.4, 2.0 Hz, 1H), 3.92 (d, J=4.5 Hz, 3H), 2.24 (s, 3H); $^{19}$F NMR (376 MHz, DMSO-d₆) δ −117.81, −204.72 (d, J=4.1 Hz); ESIMS m/z 389 [(M+H)⁺]387 [M−H]⁻].

Methyl 4-acetamido-3-chloro-6-(4-chloro-3-fluoro-2-formylphenyl)picolinate

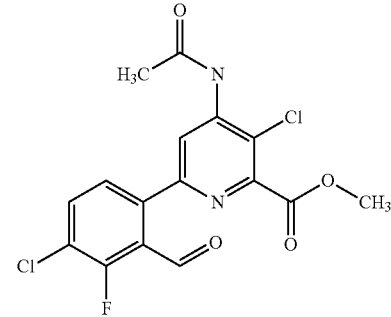 [SMILES: COC(=O)c1nc(-c2ccc(Cl)c(F)c2C=O)cc(NC(C)=O)c1Cl]

The title compound was prepared as described in Example 48 with Head L (2.00 g, 7.60 mmol) and 3-chloro-2-fluoro-6-(4,4,5,5-tetramethyl-1,3,2-dioxaborolan-2-yl)benzaldehyde (3.00 g, 10.5 mmol) and isolated as a yellow solid: $^1$H NMR (400 MHz, DMSO-d₆) δ 10.05 (s, 1H), 9.89 (s, 1H), 8.63 (s, 1H), 7.94 (dd, J=8.5, 7.2 Hz, 1H), 7.60 (dd, J=8.3, 1.1 Hz, 1H), 3.89 (s, 3H), 2.24 (s, 3H); $^{19}$F NMR (376 MHz, DMSO-d₆) δ− 120.34; ESIMS m/z 385 [(M+H)⁺] 383 [(M−H)⁻].

Methyl 4-amino-3-chloro-6-(2,4-dichloro-3-fluorophenyl)-5-fluoropicolinate (Compound 19)

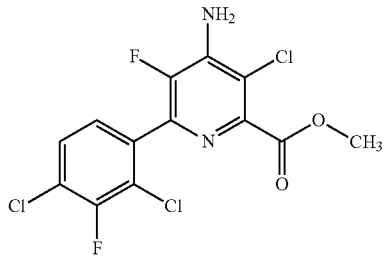 [SMILES: COC(=O)c1nc(-c2ccc(Cl)c(F)c2Cl)c(F)c(N)c1Cl]

The title compound was prepared as described in Example 48 with Head B (0.463 g, 1.94 mmol) and 2-(2,4-dichloro-3-fluorophenyl)-4,4,5,5-tetramethyl-1,3,2-dioxaborolane (0.620 g, 2.13 mmol) and isolated as a white solid (0.176 g, 25%).

Methyl 6-amino-2-(2,4-dichloro-3-fluorophenyl)-5-methoxypyrimidine-4-carboxylate (Compound 42)

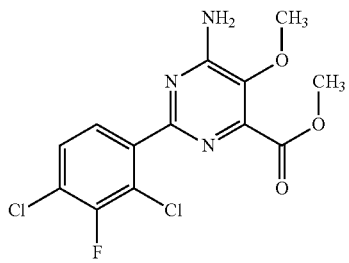 [SMILES: COC(=O)c1nc(-c2ccc(Cl)c(F)c2Cl)nc(N)c1OC]

The title compound was prepared as described in Example 48 with Head C (0.400 g, 1.83 mmol) and (2,4-dichloro-3-fluorophenyl)boronic acid (0.486 g, 2.33 mmol) and isolated as a white solid (0.030 g, 5%).

Example 49

Preparation of methyl 4-acetamido-3-chloro-6-(4-chloro-2-(difluoromethyl)-3-fluorophenyl)picolinate

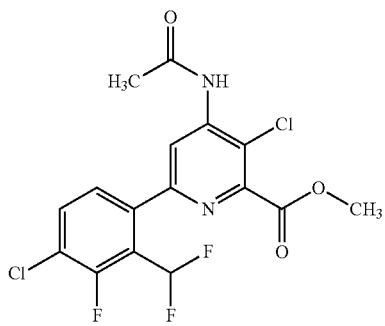 [SMILES: COC(=O)c1nc(-c2ccc(Cl)c(F)c2C(F)F)cc(NC(C)=O)c1Cl]

To a 20-mL microwave reaction vessel, equipped with a stir bar, was added Head K (0.950 g, 2.43 mmol) and bis(triphenylphosphine)palladium(II) dichloride (0.154 g, 0.220 mmol). The vessel was sealed and placed under $N_2$ atmosphere. A solution of 1-bromo-4-chloro-2-(difluoromethyl)-3-fluorobenzene (0.570 g, 2.20 mmol) in toluene (11.0 mL) was then added. The reaction was placed on a Biotage Initiator™ microwave reactor for 60 min at 100° C., with external IR-sensor temperature monitoring from the side of the vessel. The reaction was poured into a saturated $NH_4Cl$ solution and extracted with EtOAc (4×75 mL). The combined organic layers were dried over anhydrous $MgSO_4$, filtered and concentrated. The resulting residue was purified by flash chromatography (silica 0-50% EtOAc in hexane) to afford the title compound as a white solid (0.361 g, 46%): $^1$H NMR (400 MHz, DMSO-$d_6$) δ 10.04 (s, 1H), 8.48 (s, 1H), 7.93 (dd, J=8.4, 7.3 Hz, 1H), 7.46 (dd, J=8.4, 1.4 Hz, 1H), 6.93-7.34 (m, 1H), 3.92 (s, 3H), 2.25 (s, 3H). $^{19}$F NMR (376 MHz, DMSO-$d_6$) δ −110.75 (d, J=16.0 Hz), −116.61 (t, J=16.6 Hz); ESIMS m/z 407 [(M+H)*], 405 [M−H]$^−$.

Example 50

Preparation of methyl 4-acetamido-2',5,6'-trichloro-[2,3'-bipyridine]-6-carboxylate

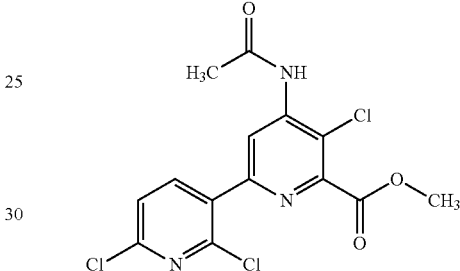

To a solution of methyl 4-acetamido-3-chloro-6-(trimethylstannyl)picolinate (1.0 g, 2.55 mmol) in DMF (5 mL) was added 2,6-dichloro-3-iodopyridine (1.0 g, 2.04 mmol), CsF (0.62 g, 4.1 mmol), and CuI (39 mg, 0.20 mmol). This mixture was sparged with $N_2$ and then bis(triphenylphosphine)palladium(II) dichloride (18 mg, 0.026 mmol) was added. The mixture was heated at 70° C. for 3 h, and then the reaction mixture was diluted with DCM and washed with $H_2O$ and brine. The organic layers were dried ($Na_2SO_4$), filtered and concentrated in vacuo, and then purified by silica gel chromatography eluting with 3% $Et_2O$ in $CH_2Cl_2$ to afford a tan solid (910 mg, 95%): mp 178-79° C.; $^1$H NMR (400 MHz, CDCl$_3$) δ 9.04 (s, 1H), 8.03 (s, 1H), 7.98 (d, J=8.0 Hz, 1H), 7.39 (d, J=8.0 Hz, 1H), 4.02 (s, 3H), 2.34 (s, 3H); ESIMS m/z 375 ([M+H]$^+$).

Example 51

Preparation of methyl 4-amino-5-chloro-3-fluoro-6'-(trifluoromethyl)-[2,3'-bipyridine]-6-carboxylate (Compound 59)

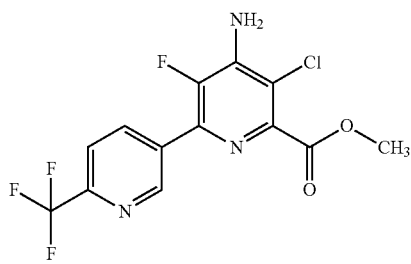 [SMILES: COC(=O)c1nc(-c2ccc(C(F)(F)F)nc2)c(F)c(N)c1Cl]

To a suspension of Head I (350 mg, 1.25 mmol), (6-(trifluoromethyl)pyridin-3-yl)boronic acid (283 mg, 1.50 mmol), potassium fluoride (KF; 144 mg, 2.50 mmol) and tris(3-sulfonatophenyl)phosphine hydrate sodium salt (TPPTS; 80 mg, 0.13 mmol) in a water/acetonitrile mixture (2.0/2.0 mL) was added palladium acetate (14 mg, 0.06 mmol). The reaction mixture was then heated in a Biotage™ bench top microwave at 150° C. for 5 min. The reaction mixture was then filtered through Celite®, diluted with dichloromethane and washed with water. The organic layers were dried (Na₂SO₄), filtered, concentrated in vacuo, and then purified by silica gel chromatography eluting with a mixture of 10% diethyl ether/40% dichloromethane/50% hexanes to afford a white solid (273 mg, 78%).

Compound 50 was made in accordance with the procedures disclosed in Example 51 with the exception that the catalyst/ligand bis(triphenylphosphine)palladium(II) chloride was employed.

Example 52

Preparation of methyl 4-amino-5-chloro-2',3'-difluoro-6'-methyl-[2,3'-bipyridine]-6-carboxylate (Compound 76)

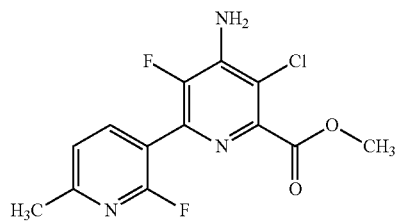

To a suspension of Head I (300 mg, 1.1 mmol), potassium trifluoro(2-fluoro-6-methylpyridin-3-yl)borate (459 mg, 2.12 mmol), KF (184 mg, 3.17 mmol), TPPTS (136 mg, 0.21 mmol) in a mixture of acetonitrile/water (1.0/1.0 mL) was added palladium(II) acetate (23 mg, 0.11 mmol). The reaction mixture was then heated in a Biotage™ bench top microwave at 140° C. for 10 min. The reaction mixture was then diluted with dichloromethane and was washed with water. The organic layers were separated, dried (Na₂SO₄), filtered, concentrated in vacuo, and purified by silica gel chromatography eluting with 0-100% acetone in hexanes to afford a white solid (148 mg, 45%).

Example 53

Preparation of methyl 4-amino-2',5-dichloro-3-fluoro-6'-methoxy-[2,3'-bipyridine]-6-carboxylate (Compound 88)

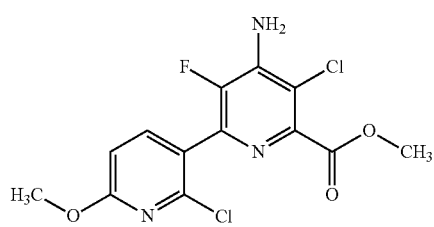

To a suspension of Head I (200 mg, 0.71 mmol), 2-chloro-6-methoxypyridin-3-ylboronic acid (198 mg, 1.06 mmol), sodium carbonate (150 mg, 1.41 mmol) in a mixture of acetonitrile/water (1.2/1.2 mL) was added bis(triphenylphosphine)palladium(II) chloride (49.5 mg, 0.071 mmol). The reaction mixture was then heated in a Biotage™ bench top microwave at 120° C. for 15 min. The reaction mixture was diluted with dichloromethane, washed with water and the organic layers were separated. The organic layers were then dried (MgSO₄), filtered, concentrated and purified by silica gel chromatography eluting with 0-70% EtOAc in hexanes to afford a white solid (94 mg, 39%).

Example 54

Preparation of methyl 6-amino-5-methoxy-2-(6-(trifluoromethyl)pyridin-3-yl)pyrimidine-4-carboxylate (Compound 43)

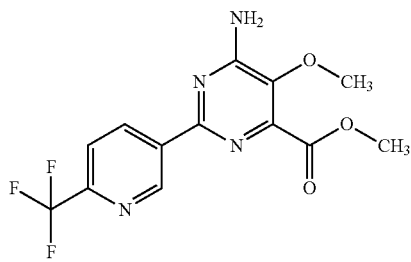 [SMILES: COC(=O)c1nc(-c2ccc(C(F)(F)F)nc2)nc(N)c1OC]

To a suspension of Head C (200 mg, 0.92 mmol) and 5-(tributylstannyl)-2-(trifluoromethyl)pyridine (602 mg, 1.38 mmol) in a mixture of dioxane/toluene (2.25/2.25 mL) was added tetrakis(triphenylphosphine)palladium(0) (Pd(PPh₃)₄; 106 mg, 0.092 mmol). In a Biotage bench top microwave the reaction mixture was heated at 150° C. for 5 min. The reaction mixture was diluted with EtOAc, washed with 10% aqueous (aq) potassium bifluorodie (KHF₂) solution, brine, dried (Na₂SO₄), filtered and concentrated in vacuo. The residue was purified by silica gel chromatography eluting with 0-40% diethyl ether (Et₂O) in dichloromethane to afford a light yellow solid (179 mg, 59%).

Example 55

Preparation of methyl 4-amino-3-chloro-6-(4-chloro-3,6-difluoro-2-methylphenyl)picolinate (Compound 38)

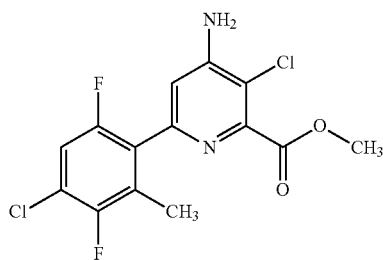 [SMILES: COC(=O)c1nc(-c2c(F)cc(Cl)c(F)c2C)cc(N)c1Cl]

Step 1: Head K (1.000 g, 2.55 mmol), 1-chloro-2,5-difluoro-4-iodo-3-methylbenzene (1.032 g, 3.58 mmol), bis(triphenylphosphine)palladium(II) chloride (0.179 g, 0.255 mmol) and copper(I) iodide (0.073 g, 0.383 mmol) were combined with DMF (10.22 mL) in a microwave vessel and heated at 100° C. in a microwave reactor for 30 min. The reaction mixture was partitioned between diethyl ether and water. The organic phase was washed with water and concentrated onto silica gel. The product was purified by flash chromatograpy (SiO$_2$; eluting with 7-60% EtOAc in hexanes) to provide methyl 4-acetamido-3-chloro-6-(4-chloro-3,6-difluoro-2-methylphenyl)picolinate (0.320 g, 0.822 mmol, 32.2%) as an off-white solid.

Step 2: Methyl 4-acetamido-3-chloro-6-(4-chloro-3,6-difluoro-2-methylphenyl)picolinate (0.320 g, 0.822 mmol) was dissolved in methanol (16.44 mL) and acetyl chloride (1.291 g, 16.44 mmol) was added dropwise at room temperature. The reaction mixture was stirred overnight then concentrated under vacuum. The residue was partitioned between ethyl acetate and sodium bicarbonate. The organic phase was dried and concentrated. The product was purified by flash chromatography (SiO$_2$, eluting with 5-60% EtOAc in hexanes) to provide the title compound as a white solid (0.235 g, 80%).

Example 56

Preparation of methyl 4-amino-3-chloro-6-(3-fluoro-2-methyl-4-(trifluoromethyl)phenyl)picolinate (Compound 9)

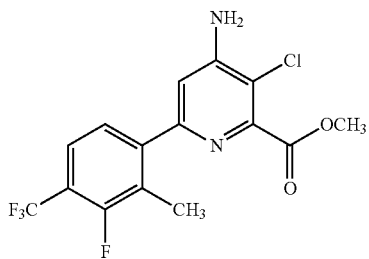 [SMILES: COC(=O)c1nc(-c2ccc(C(F)(F)F)c(F)c2C)cc(N)c1Cl]

To a microwave vial was added Head A (200 mg, 0.905 mmol), 2-(3-fluoro-2-methyl-4-(trifluoromethyl)phenyl)-4,4,5,5-tetramethyl-1,3,2-dioxaborolane (303 mg, 0.995 mmol), KF (137 mg, 2.353 mmol), and bis(triphenylphosphine)palladium(II) chloride (63.5 mg, 0.090 mmol). Subsequently, acetonitrile (2.79 mL) and water (2.79 mL) were added. The reaction vial was then capped and placed in a Biotage Initiator™ microwave reactor for 20 min at 115° C., with external IR-sensor temperature monitoring from the side of the vessel. The reaction mixture was cooled to rt, diluted with EtOAc, and washed with H$_2$O. The organics were dried over Na$_2$SO$_4$, filtered and concentrated in vacuo. The crude product was purified by flash chromatography (silica; Hexanes/EtOAc). This yielded the title compound (264 mg, 80%) as a white solid.

Example 57

Preparation of methyl 6-amino-5-chloro-2-(6-(trifluoromethyl)pyridin-3-yl)pyrimidine-4-carboxylate (Compound 82)

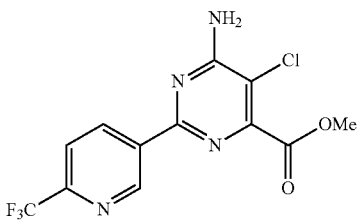 [SMILES: COC(=O)c1nc(-c2ccc(C(F)(F)F)nc2)nc(N)c1Cl]

Head E (410 mg, 1.8 mmol, 1.0 equiv) and 5-(4,4,5,5-tetramethyl-1,3,2-dioxaborolan-2-yl)-2-(trifluoromethyl)pyridine (500 mg, 1.8 mmol, 1.0 equiv) were combined in a 20 mL vial followed by cesium fluoride (560 mg, 3.7 mmol, 2.0 equiv) and dichloro[bis(triphenylphosphino)]-palladium(II) (130 mg, 0.18 mmol, 0.10 equiv). A 1:1 mixture of water:dimethoxyethane (5.2 mL) was added and the resulting yellow mixture was capped and placed in a Biotage Initiator™ microwave reactor for 15 min at 100° C., with external IR-sensor temperature monitoring from the side of the vessel. The cooled reaction mixture was diluted with water (150 mL) and extracted with dichloromethane (4×50 mL). The combined organic layers were dried (MgSO$_4$), gravity filtered, and concentrated by rotary evaporation. The residue was sequentially purified by silica gel column chromatography (33% EtOAc in hexane) and reverse phase column chromatography (5% acetonitrile to 100% acetonitrile gradient) to afford the title compound as a pale yellow powder (78 mg, 13%).

Example 58

Preparation of methyl 4-amino-5,6'-dichloro-2'-fluoro-[2,3'-bipyridine]-6-carboxylate (Compound 17)

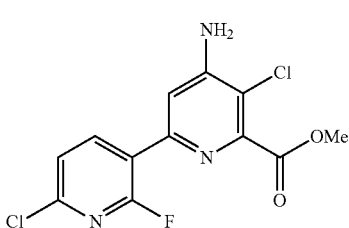 [SMILES: COC(=O)c1nc(-c2ccc(Cl)nc2F)cc(N)c1Cl]

Head L (470 mg, 1.8 mmol, 1.0 equiv) and 6-chloro-2-fluoro-3-(4,4,5,5-tetramethyl-1,3,2-dioxaborolan-2-yl)pyridine (650 mg, 2.1 mmol, 1.2 equiv) were combined in a 20 mL vial followed by cesium fluoride (540 mg, 3.6 mmol, 2.0 equiv) and dichloro[bis(triphenylphosphino)]-palladium(II) (130 mg, 0.18 mmol, 0.10 equiv). A 1:1 mixture of water:dimethoxyethane (4.8 mL) was added and the resulting tan mixture was capped and placed in a Biotage Initiator™ microwave reactor for 15 min at 100° C., with external IR-sensor temperature monitoring from the side of the vessel. The cooled reaction mixture was diluted with water (150 mL) and extracted with dichloromethane (5×50 mL). The combined organic layers were dried (MgSO$_4$), gravity filtered and concentrated by rotary evaporation. Reverse phase column chromatography (5% acetonitrile to 100% acetonitrile gradient) afforded 110 mg residue. Acetyl chloride (220 µL, 3.1 mmol, 10 equiv) was slowly added to methanol (3.0 mL) and stirred at 23° C. for 30 min. The residue (110 mg, 0.31 mmol, 1.0 equiv) was added and the heterogeneous white mixture was stirred at 23° C. for 20 h. The reaction mixture was concentrated by rotary evaporation. The residue was diluted with saturated sodium bicarbonate (100 mL) and extracted with dichloromethane (4×50 mL). The organic layer was dried (MgSO₄), gravity filtered, and concentrated by rotary evaporation to afford the title compound as a white powder (90 mg, 16%).

Example 59

Preparation of methyl 4-amino-5-chloro-6'-(difluoromethyl)-3-fluoro-2,3'-bipyridine-6-carboxylate (Compound 34)

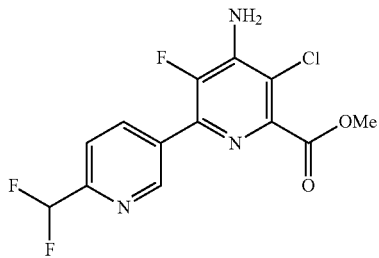 [SMILES: COC(=O)c1nc(-c2ccc(C(F)F)nc2)c(F)c(N)c1Cl]

Head B (380 mg, 1.6 mmol, 1.0 equiv) and 2-(difluoromethyl)-5-(4,4,5,5-tetramethyl-1,3,2-dioxaborolan-2-yl)pyridine (500 mg, 1.7 mmol, 1.1 equiv) were combined in a 20 mL vial followed by cesium fluoride (480 mg, 3.2 mmol, 2.0 equiv), palladium acetate (18 mg, 0.079 mmol, 0.05 equiv), and sodium 3,3',3''-phosphinetriyltribenzenesulfonate (90 mg, 0.16 mmol, 0.10 equiv). A 3:1 mixture of water:acetonitrile (3.2 mL) was added and the resulting brown mixture was capped and placed in a Biotage Initiator™ microwave reactor for 6 min at 150° C., with external IR-sensor temperature monitoring from the side of the vessel. The cooled reaction mixture was diluted with water (200 mL) and extracted with dichloromethane (5×60 mL). The combined organic layers were dried (MgSO₄), gravity filtered, and concentrated by rotary evaporation. The residue was sequentially purified by reverse phase column chromatography (5% acetonitrile to 100% acetonitrile gradient) to afford the title compound as an off-white powder (140 mg, 26%).

Example 61

Preparation of methyl 4-amino-3-fluoro-6'-(trifluoromethyl)-5-vinyl-[2,3'-bipyridine]-6-carboxylate (Compound 14)

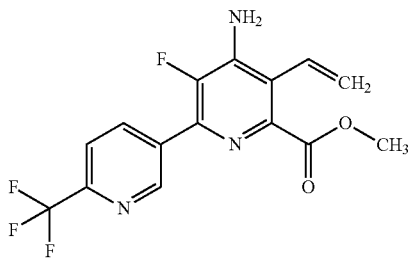 [SMILES: C=Cc1c(C(=O)OC)nc(-c2ccc(C(F)(F)F)nc2)c(F)c1N]

In a microwave vessel, a suspension of methyl 4-amino-6-chloro-5-fluoro-3-vinylpicolinate (Head G; 0.5 g, 2.168 mmol), (6-(trifluoromethyl)pyridin-3-yl)boronic acid (commercially available) (0.621 g, 3.25 mmol), KF (0.378 g, 6.50 mmol) and bis(triphenylphosphine)palladium(II) chloride (0.152 g, 0.217 mmol) in a mixture of acetonitrile (4.34 mL) and water (4.34 mL) was stirred under microwave irradiation (120° C., 30 min). The reaction mixture was poured into a half saturated NaHCO₃ solution and extracted with EtOAc (2×). The combined organic layers were dried over MgSO₄, filtered and concentrated. The residue was purified by flash column chromatography (SiO₂; hexane/EtOAc gradient) to afford methyl 4-amino-3-fluoro-6'-(trifluoromethyl)-5-vinyl-[2,3'-bipyridine]-6-carboxylate (522 mg, 67%) as a white solid.

Example 62

Preparation of methyl 6-amino-2-(6-(trifluoromethyl)pyridin-3-yl)-5-vinylpyrimidine-4-carboxylate (Compound 6)

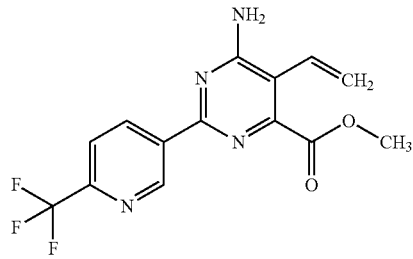 [SMILES: C=Cc1c(N)nc(-c2ccc(C(F)(F)F)nc2)nc1C(=O)OC]

In a microwave vessel, a suspension of Head P (0.5 g, 2.341 mmol), (6-(trifluoromethyl)pyridin-3-yl)boronic acid (commercially available) (0.670 g, 3.51 mmol), KF (0.408 g, 7.02 mmol) and bis(triphenylphosphine)palladium(II) chloride (0.164 g, 0.234 mmol) in a mixture of acetonitrile (4.68 mL) and water (4.68 mL) was stirred under microwave irradiation (120° C., 30 min). The reaction mixture was poured into a half saturated NaHCO₃ solution and extracted with EtOAc (2×). The organics were dried over MgSO₄, filtered and concentrated. The residue was purified by flash column chromatography (SiO₂, hexane/EtOAc gradient) to afford methyl 6-amino-2-(6-(trifluoromethyl)pyridin-3-yl)-5-vinylpyrimidine-4-carboxylate (267 mg, 33.4%) as a white solid.

Example 63

Preparation of methyl 4-amino-5-chloro-3-fluoro-2'-methoxy-6'-(trifluoromethyl)-2,3'-bipyridine-6-carboxylate (Compound 44)

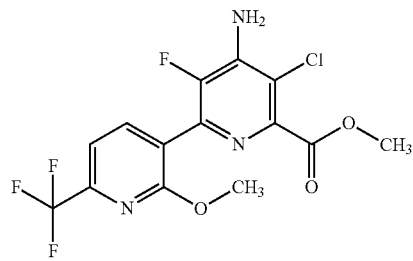 [SMILES: COC(=O)c1nc(-c2ccc(C(F)(F)F)nc2OC)c(F)c(N)c1Cl]

To a 5-mL microwave safe vial was added bis(triphenylphosphine)palladium (II) chloride (0.088 g, 0.126 mmol), KF (0.219 g, 3.77 mmol), methyl 4-amino-3,6-dichloro-5-fluoropicolinate (0.3 g, 1.255 mmol), and 2-methoxy-3-(4,4,5,5-tetramethyl-1,3,2-dioxaborolan-2-yl)-6-(trifluoromethyl)pyridine (0.399 g, 1.318 mmol). A mixture of water (1 mL) and acetonitrile (2 mL) was added and the reaction was capped and placed in a Biotage Initiator™ microwave reactor for 20 min at 115° C., with external IR-sensor temperature monitoring from the side of the vessel. Upon cooling to room temperature, the reaction mixture was diluted with dichloromethane (CH$_2$Cl$_2$; 25 mL) and water (25 mL) and the organic layer was filtered through a cotton plug. An additional extraction using EtOAc (25 mL) was combined with the CH$_2$Cl$_2$ and dried over of Na$_2$SO$_4$ (50 g). Following filtration of the combined organics through a cotton plug and concentration on a rotary evaporator, the residue was purified by flash chromatography with a gradient eluent system of CH$_2$Cl$_2$ and EtOAc to yield the title compound as a tan solid (256 mg).

Example 64

Preparation of methyl 4-acetamido-3-chloro-6-(4-(dimethyl(phenyl)silyl)-3-fluoro-2-methylphenyl)picolinate

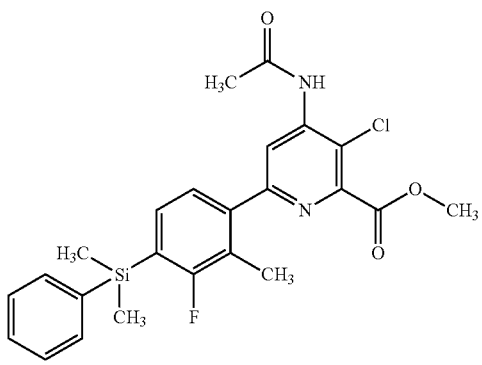 [SMILES: COC(=O)c1nc(-c2ccc([Si](C)(C)c3ccccc3)c(F)c2C)cc(NC(C)=O)c1Cl]

To a 5-mL microwave safe vial was added bis(triphenylphosphine)palladium (II) chloride (1.334 g, 1.901 mmol), KF (0.331 g, 5.70 mmol), methyl 4-acetamido-3,6-dichloropicolinate (0.5 g, 1.901 mmol) and a mixture containing (4-(5,5-dimethyl-1,3,2-dioxaborinan-2-yl)-2-fluoro-3-methylphenyl)dimethyl(phenyl)silane (942 mg). A mixture of water (1 mL) and acetonitrile (2 mL) was added and the reaction vial was capped and placed in a Biotage Initiator™ microwave reactor for 20 min at 115° C., with external IR-sensor temperature monitoring from the side of the vessel. Upon cooling to room temperature, the reaction mixture was diluted with CH$_2$Cl$_2$ (25 mL) and water (25 mL) and the organic layer was filtered through a cotton plug. An additional extraction using EtOAc (25 mL) was combined with the CH$_2$Cl$_2$ and dried over of Na$_2$SO$_4$ (50 g). Following filtration of the combined organics through a cotton plug and concentration on a rotary evaporator, the residue was purified by flash chromatography with a gradient eluent system of CH$_2$Cl$_2$ and EtOAc to yield methyl 4-acetamido-3-chloro-6-(4-(dimethyl(phenyl)silyl)-3-fluoro-2-methylphenyl)picolinate as a yellow solid (199 mg, 22%): $^1$H NMR (400 MHz, CDCl$_3$) δ 8.67 (s, 1H), 7.98 (s, 1H), 7.59-7.53 (m, 2H), 7.38 (ddd, J=4.7, 2.0, 0.9 Hz, 3H), 7.21-7.14 (m, 2H), 3.99 (s, 3H), 2.32 (s, 3H), 2.25 (d, J=2.5 Hz, 3H), 0.61 (d, J=1.1 Hz, 6H); ESIMS m/z 472 ([M+H]+1).

Example 65

Preparation of methyl 4-amino-3-chloro-6-(4-chloro-2-(difluoromethyl)-3-methoxyphenyl)picolinate (Compound 60)

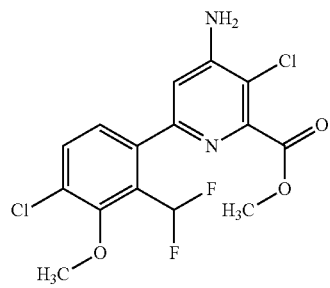 [SMILES: COC(=O)c1nc(-c2ccc(Cl)c(OC)c2C(F)F)cc(N)c1Cl]

1-Bromo-4-chloro-2-(difluoromethyl)-3-methoxybenzene (860 mg, 3.2 mmol), methyl 4-acetamido-3-chloro-6-(trimethylstannyl)picolinate (1.2 g, 3.2 mmol), cesium fluoride (970 mg, 6.4 mmol), copper(I)iodide (61 mg, 0.32 mmol) and bis(triphenylphosphine)palladium(II) chloride (220 mg, 0.32 mmol) were combined in dry DMF (8 mL) and heated to 80° C. for 15 h. An additional 300 mg (0.80 mmol) of the stannane was added and heating was continued for 3 h more. After cooling, the mixture was partitioned between EtOAc/water, the organic phase was washed with water, washed with saturated NaCl, dried (Na$_2$SO$_4$), and evaporated. The crude material was purified by flash chromatography (SiO$_2$; eluting with 3% diethyl ether in dichloromethane) to provide the acetamide intermediate (530 mg, 40%). This material was stirred in methanol (15 mL), treated with acetyl chloride (2 mL) and heated to 60° C. for 1 h. After cooling, the volatiles were removed under vacuum, the residue partitioned between EtOAc and saturated NaHCO$_3$. The organic phase was dried (Na$_2$SO$_4$) and evaporated to give the title compound as a gum (500 mg).

Example 66

Preparation of methyl 4-acetamido-3-chloro-6-(4-chloro-3-fluoro-2-(hydroxymethyl)phenyl)picolinate

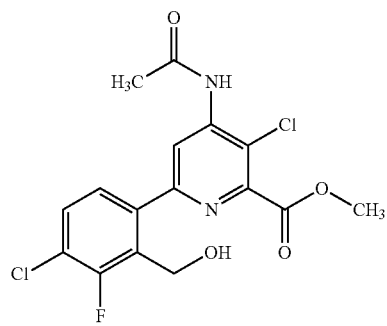 [SMILES: COC(=O)c1nc(-c2ccc(Cl)c(F)c2CO)cc(NC(C)=O)c1Cl]

To a 100-mL round bottom flask, equipped with a stir bar, were added methyl 4-acetamido-3-chloro-6-(4-chloro-3-fluoro-2-formylphenyl)picolinate (0.400 g, 1.04 mmol), methanol (10.0 mL), and sodium borohydride (0.043 g, 1.142 mmol). The reaction mixture was stirred at room temperature for 18 h. An additional portion of sodium borohydride (0.043 g, 1.142 mmol) was added and the reaction mixture was stirred at room temperature for 3 additional hours. The reaction mixture was treated with 1 M NH$_4$Cl and stirred for 30 minutes. The reaction mixture was then poured into brine solution and extracted with EtOAc (4×75 mL). The combined organic layers were dried over anhydrous MgSO$_4$, filtered and concentrated to afford the title compound as a white solid (0.364 g, 91%): $^1$H NMR (400 MHz, DMSO-d$_6$) δ 10.02 (s, 1H), 8.49 (s, 1H), 7.69 (m, J=8.4, 7.5 Hz, 1H), 7.35 (dd, J=8.45, 1.2 Hz, 1H), 6.92 (s, 1H), 4.52 (dd, J=5.8, 2.2 Hz, 2H), 3.92 (s, 3H), 2.23 (s, 3H); $^{19}$F NMR (376 MHz, DMSO-d$_6$) δ −119.20; ESIMS m/z 327 [(M+H)$^+$] (—CO$_2$CH$_3$), 385 [(M−H)$^-$].

Example 67

Preparation of 6-(4-acetamido-5-chloro-6-(methoxycarbonyl)pyridin-2-yl)-3-chloro-2-fluorobenzoic acid

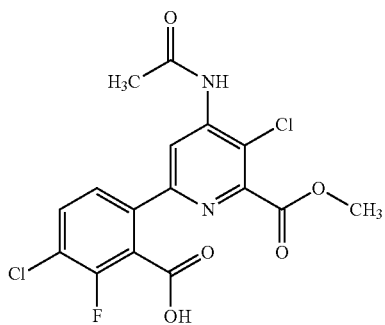 [SMILES: COC(=O)c1nc(-c2ccc(Cl)c(F)c2C(=O)O)cc(NC(C)=O)c1Cl]

To a 50-mL round bottom flask, equipped with a stir bar, was added methyl 4-acetamido-3-chloro-6-(4-chloro-3-fluoro-2-formylphenyl)picolinate (0.300 g, 0.779 mmol), and benzeneseleninic acid (7.36 mg, 0.039 mmol). The flask was sealed and placed under N$_2$ atmosphere. Then tetrahydrofuran (5.0 mL) and hydrogen peroxide (0.115 g, 1.01 mmol) were added. The flask was placed in a heating block that was warmed to 60° C. for 18 h. An additional portion of benzeneseleninic acid (7.36 mg, 0.039 mmol) and hydrogen peroxide (0.115 g, 1.013 mmol) were added. The reaction mixture was poured into brine solution and extracted with EtOAc (3×50 mL). The combined organic layers were dried over anhydrous MgSO$_4$, filtered and concentrated to afford the title compound as a light yellow semi-solid (0.331 g): $^1$H NMR (400 MHz, DMSO-d$_6$) δ 13.70 (s, 1H), 10.01 (s, 1H), 8.53 (s, 1H), 7.82 (dd, J=8.5, 7.5 Hz, 1H), 7.52 (dd, J=8.5, 1.1 Hz, 1H), 3.91 (s, 3H), 2.24 (s, 3H); $^{19}$F NMR (376 MHz, DMSO-d$_6$) δ −118.11; ESIMS m/z 341 [(M+H)$^+$](—CO$_2$Me), 399 [(M−H)$^-$].

Example 68

Preparation of methyl 4-amino-3-chloro-6-(4-chloro-2-ethynyl-3-fluorophenyl)picolinate (Compound 75)

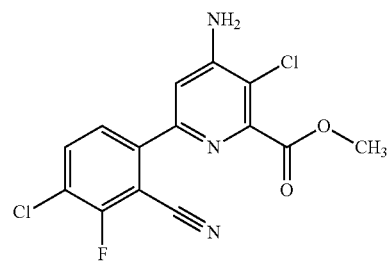 [SMILES: COC(=O)c1nc(-c2ccc(Cl)c(F)c2C#N)cc(N)c1Cl]

In a 50-mL round bottom flask, equipped with a stir bar, methyl 4-acetamido-3-chloro-6-(4-chloro-3-fluoro-2-formylphenyl)picolinate (0.220 g, 0.571 mmol) and potassium carbonate (0.316 g, 2.29 mmol) were suspended in methanol (9.0 mL). The flask was sealed, placed under N$_2$ atmosphere and cooled in an ice water bath. Then a solution of dimethyl (1-diazo-2-oxopropyl)phosphonate (0.165 g, 0.857 mmol) in methanol (2.0 mL) was added drop wise. The reaction was allowed to stir for 18 h, warming to room temperature. The reaction mixture was poured into brine solution and acidified with 1 N HCl. The resulting solution was extracted with EtOAc (4×30 mL). The combined organic layers were dried over anhydrous MgSO$_4$, filtered and concentrated. The resulting residue was purified by reverse phase chromatography (5-100% acetonitrile in H$_2$O) to afford the title compound as a tan solid (0.078 g, 43%).

Example 69

Preparation of methyl 4-acetamido-3-chloro-6-(4-chloro-3-fluoro-2-vinylphenyl)picolinate

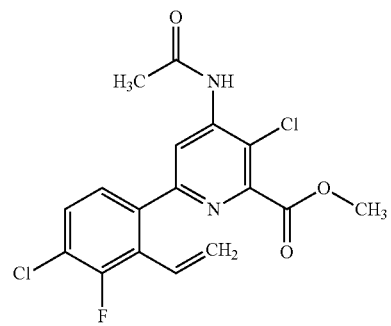 [SMILES: C=Cc1c(-c2cc(NC(C)=O)c(Cl)c(C(=O)OC)n2)ccc(Cl)c1F]

To a 50-mL round bottom flask, equipped with a stir bar, were added methyl 4-acetamido-3-chloro-6-(4-chloro-3-fluoro-2-formylphenyl)picolinate (0.220 g, 0.571 mmol), sodium hydride (0.027 g, 1.142 mmol), and tetrahydrofuran (3.0 mL). The flask was cooled in an ice water bath and methyltriphenylphosphonium bromide (0.245 g, 0.685 mmol) was added. The reaction was placed under N$_2$ atmosphere, and stirred for 18 h, warming to room temperature. The reaction mixture was cooled once again in an ice water bath, and another portion each of sodium hydride (0.027 g, 1.142 mmol) and methyltriphenylphosphonium bromide (0.245 g, 0.685 mmol) was added. The reaction was stirred for an additional 18 h while warming to room temperature. The reaction mixture was concentrated. The resulting residue was purified by reverse phase chromatography (5-100% acetonitrile in H₂O) to afford the title compound as a light brown solid (78.0 mg, 36%): $^1$H NMR (400 MHz, DMSO-$d_6$) δ 9.98 (s, 1H), 8.33 (s, 1H), 7.62 (dd, J=8.4, 7.3 Hz, 1H), 7.33 (dd, J=8.4, 1.3 Hz, 1H), 6.53 (dd, J=17.9, 11.7 Hz, 1H), 5.68 (dt, J=18.0, 1.7 Hz, 1H), 5.57 (dt, J=11.7, 1.5 Hz, 1H), 3.91 (s, 3H), 2.22 (s, 3H); $^{19}$F NMR (376 MHz, DMSO-$d_6$) δ −117.30; ESIMS m/z 383 [(M+H)$^+$], 381 [(M−H)$^−$].

Example 70

Preparation of methyl 4-amino-3-chloro-6-(4-chloro-3-fluoro-2-(fluoromethyl)phenyl)picolinate (Compound 78)

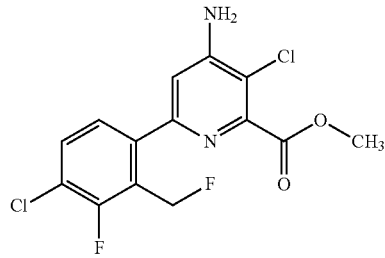 [SMILES: COC(=O)c1nc(-c2ccc(Cl)c(F)c2CF)cc(N)c1Cl]

To a 200-mL round bottom flask, equipped with a stir bar, were added methyl 4-acetamido-3-chloro-6-(4-chloro-3-fluoro-2-(fluoromethyl)phenyl)picolinate (306 mg, 0.786 mmol), methanol (8.0 mL) and acetyl chloride (0.20 mL, 2.8 mmol). The reaction mixture was stirred at room temperature for 18 h. The reaction mixture was poured into brine solution and extracted with EtOAc (3×50 mL). The combined organic layers were dried over anhydrous MgSO₄, filtered and concentrated. The resulting residue was purified by flash chromatography (silica; 0-40% EtOAc in hexane) and reverse phase chromatography (C18 column, 5-100% acetonitrile in H₂O), as needed, to afford the title compound as a white solid (130 mg, 48%).

The following compounds were made in accordance with the procedures disclosed in Example 70:

Methyl 4-amino-3-chloro-6-(4-chloro-3-fluoro-2-(hydroxymethyl)phenyl)picolinate (Compound 29)

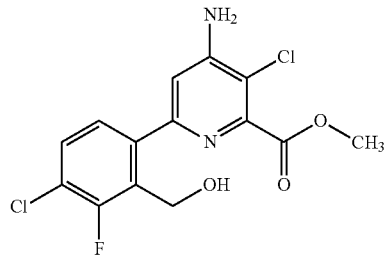 [SMILES: COC(=O)c1nc(-c2ccc(Cl)c(F)c2CO)cc(N)c1Cl]

The title compound was prepared as described in Example 70 with methyl 4-acetamido-3-chloro-6-(4-chloro-3-fluoro-2-(hydroxymethyl)phenyl)picolinate (364 mg, 0.940 mmol) and isolated as a white solid (220 mg, 68%).

Example 71

Preparation of 6-(4-amino-5-chloro-6-(methoxycarbonyl)pyridin-2-yl)-3-chloro-2-fluorobenzoic acid (Compound 91)

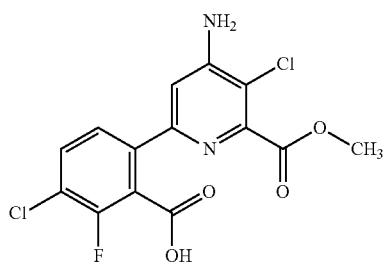 [SMILES: COC(=O)c1nc(-c2ccc(Cl)c(F)c2C(=O)O)cc(N)c1Cl]

The title compound was prepared as described in Example 70 with 6-(4-acetamido-5-chloro-6-(methoxycarbonyl)pyridin-2-yl)-3-chloro-2-fluorobenzoic acid (331 mg, 0.825 mmol) and isolated as an off-white solid (200 mg, 68%).

Example 72

Preparation of methyl 4-amino-3-chloro-6-(4-chloro-3-fluoro-2-vinylphenyl)picolinate (Compound 79)

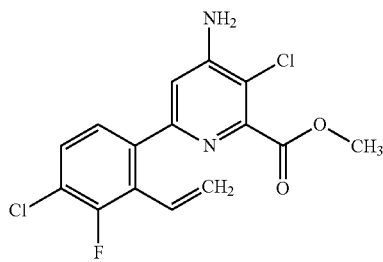 [SMILES: C=Cc1c(-c2cc(N)c(Cl)c(C(=O)OC)n2)ccc(Cl)c1F]

The title compound was prepared as described in Example 70 with methyl 4-acetamido-3-chloro-6-(4-chloro-3-fluoro-2-vinylphenyl)picolinate (75.0 mg, 0.196 mmol) and isolated as a light brown solid (60.0 mg, 90%).

Example 73

Preparation of methyl 4-amino-3-chloro-6-(4-chloro-2-(difluoromethyl)-3-fluorophenyl)picolinate (Compound 53)

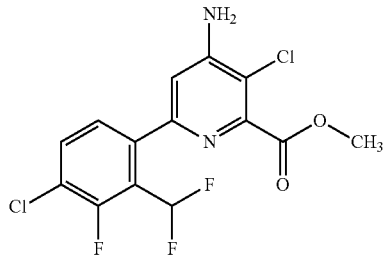 [SMILES: COC(=O)c1nc(-c2ccc(Cl)c(F)c2C(F)F)cc(N)c1Cl]

The title compound was prepared as described in Example 70 with methyl 4-acetamido-3-chloro-6-(4-chloro-2-(difluoromethyl)-3-fluorophenyl)picolinate (0.361 g, 0.887 mmol) and isolated as a tan solid (0.323 g, 99%).

Example 74

Preparation of methyl 4-amino-2',5,6'-trichloro-[2,3'-bipyridine]-6-carboxylate (Compound 15)

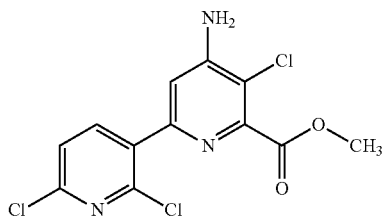 [SMILES: COC(=O)c1nc(-c2ccc(Cl)nc2Cl)cc(N)c1Cl]

To a solution of methyl 4-acetamido-2',5,6'-trichloro-[2,3'-bipyridine]-6-carboxylate (0.60 g, 1.60 mmol) in methanol (MeOH; 5 mL) was slowly added acetyl chloride (4 g, 51 mmol). The solution was stirred at ambient temperature overnight. The reaction mixture was then concentrated in vacuo. The residue was then taken up in EtOAc and washed with aqueous saturated sodium bicarbonate solution. The organics were dried ($Na_2SO_4$), filtered, concentrated to afford a white solid (500 mg, 93%).

Example 75

Preparation of methyl 4-amino-6'-bromo-5-chloro-3-fluoro-[2,3'-bipyridine]-6-carboxylate (Compound 22)

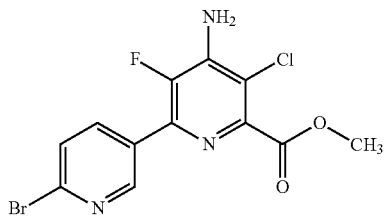

To a degassed (Argon) suspension of methyl 4-amino-5,6'-dichloro-3-fluoro-[2,3'-bipyridine]-6-carboxylate (PCT Int. Appl. 2003, WO 2003011853 A1 20030213; 0.5 g, 1.582 mmol) and hexamethylditin (363 µL, 1.740 mmol) in toluene (6.33 mL) was added tetrakis(triphenylphosphine)palladium(0) (0.091 g, 0.079 mmol) and the reaction mixture was stirred at 105° C. overnight. The reaction mixture was concentrated under reduced pressure. The residue was suspended in $CH_2Cl_2$ (7 mL) and bromine (0.244 mL, 4.75 mmol) was added. The dark brown suspension was stirred at 20° C. for 4 h, then poured into a 1:1 mixture of 10% sodium sulfite ($Na_2SO_3$)/saturated $NaHCO_3$ and extracted with EtOAc (2×). The combined organic layers were dried over $MgSO_4$, filtered and concentrated. The residue was purified by flash column chromatography ($SiO_2$; hexane/EtOAc gradient) to afford the title compound as a white solid (125 mg, 0.347 mmol, 21.9%).

Example 76

Preparation of methyl 4-amino-5-chloro-3-fluoro-6'-Iodo-[2,3'-bipyridine]-6-carboxylate (Compound 54)

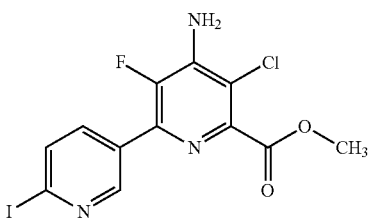 [SMILES: COC(=O)c1nc(-c2ccc(I)nc2)c(F)c(N)c1Cl]

To a degassed (Ar) suspension of methyl 4-amino-5,6'-dichloro-3-fluoro-[2,3'-bipyridine]-6-carboxylate (PCT Int. Appl. 2003, WO 2003011853 A1 20030213; 0.2 g, 0.633 mmol) and hexamethylditin (145 µL, 0.696 mmol) in toluene (2.53 mL) was added tetrakis(triphenylphosphine)palladium(0) (0.037 g, 0.032 mmol) and the reaction mixture was stirred at 105° C. overnight. The reaction mixture was concentrated under reduced pressure. The residue was suspended in $CH_2Cl_2$ (3 mL) and iodine (0.321 g, 1.265 mmol) was added. The dark brown suspension was stirred at 20° C. for 4 h, then poured into a 1:1 mixture of 10% $Na_2SO_3$/saturated $NaHCO_3$ and extracted with EtOAc (2×). The combined organic layers were dried over $MgSO_4$, filtered and concentrated. The residue was purified by flash column chromatography ($SiO_2$, hexane/EtOAc gradient) to afford the title compound as a white solid (51 mg, 19.7%).

Example 77

Preparation of methyl 4-acetamido-3-chloro-6-(3-fluoro-4-iodo-2-methylphenyl)picolinate

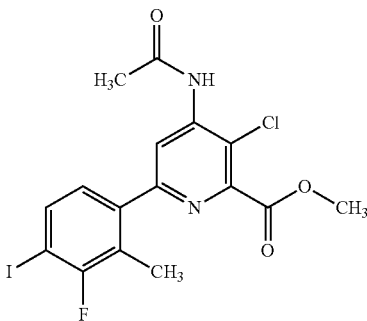 [SMILES: COC(=O)c1nc(-c2ccc(I)c(F)c2C)cc(NC(C)=O)c1Cl]

To a 10 mL vial charged with $CH_2Cl_2$ (1 mL) were added methyl 4-acetamido-3-chloro-6-(4-(dimethyl(phenyl)silyl)-3-fluoro-2-methylphenyl)picolinate (0.1 g, 0.212 mmol) and iodine chloride (0.069 g, 0.425 mmol). The reaction mixture was allowed to stir overnight. The reaction mixture was then diluted with $CH_2Cl_2$ (25 mL) and washed with a 5% solution of sodium bisulfite (25 mL). The organic layer was passed through a cotton plug and concentrated to give a brown oil. The residue was absorbed onto 1 g of Celite® using $CH_2Cl_2$ as solvent. The impregnated Celite® was loaded onto a silica gel column and purified by flash chromatography using 0-50% EtOAc: $CH_2Cl_2$ to yield the title compound as a yellow solid (22 mg): $^1$H NMR (400 MHz, $CDCl_3$) δ 8.67

(s, 1H), 7.99 (s, 1H), 7.65 (dd, J=8.1, 6.2 Hz, 1H), 7.06-6.91 (m, 1H), 4.00 (s, 3H), 2.33 (s, 3H), 2.32 (s, 3H); $^{19}$F NMR (376 MHz, CDCl$_3$) δ −94.41; ESIMS m/z 463 ([M+H]+1).

Example 78

Preparation of methyl 4-amino-3-chloro-6-(3-fluoro-4-Iodo-2-methylphenyl)picolinate (Compound 25)

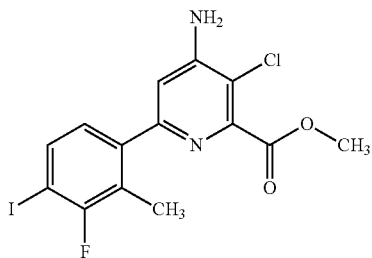 [SMILES: COC(=O)c1nc(-c2ccc(I)c(F)c2C)cc(N)c1Cl]

To a 20 mL vial charged with MeOH (10 mL) was added methyl 4-acetamido-3-chloro-6-(3-fluoro-4-iodo-2-methylphenyl)picolinate (22 mg, 0.048 mmol). Acetyl chloride (37.3 mg, 0.476 mmol) was added dropwise to the reaction vessel. After 4 h, the reaction mixture was concentrated to yield of methyl 4-amino-3-chloro-6-(3-fluoro-4-iodo-2-methylphenyl)picolinate as a brown oil (18 mg, 89%): $^1$H NMR (400 MHz, CD$_3$OD) δ 7.86 (ddd, J=8.1, 6.2, 0.8 Hz, 1H), 7.07 (dd, J=8.2, 1.0 Hz, 1H), 7.04 (s, 1H), 4.08 (s, 3H); $^{19}$F NMR (376 MHz, CD$_3$OD) δ −95.34; ESIMS m/z 421 ([M+H]+1).

Example 79

Preparation of 4-amino-3-chloro-6-(4-chloro-3-fluoro-2-methoxyphenyl)picolinic acid (Compound 84)

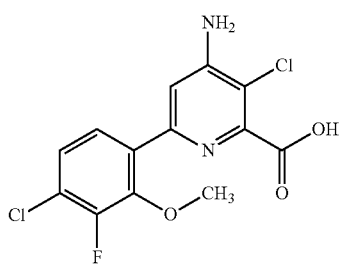

In a 50-mL round bottom flask, equipped with a stir bar, methyl 4-amino-3-chloro-6-(4-chloro-3-fluoro-2-methoxyphenyl)picolinate (0.175 g, 0.507 mmol) and lithium hydroxide hydrate (71.0 mg, 1.69 mmol) were dissolved in tetrahydrofuran (2.0 mL), methanol (2.0 mL) and H$_2$O (1.0 mL). The reaction mixture was stirred at room temperature for 2 h. The solvent was then removed by rotary evaporator. The resulting solid was treated with H$_2$O, which was then adjusted to pH-3.0 with 1 N HCl, and extracted with EtOAc (3×50 mL). The combined organic layers were dried over anhydrous MgSO$_4$, filtered and concentrated. The resulting residue was purified by reverse phase chromatography (150 g C$_{18}$, 5-100% acetonitrile in H$_2$O), as needed, to afford the title compound as a dull yellow solid (0.163 g, 97%).

The following compounds were made in accordance with the procedures disclosed in Example 79:

4-Amino-3-chloro-6-(4-chloro-3-fluoro-2-(fluoromethyl)phenyl)picolinic acid (Compound 80)

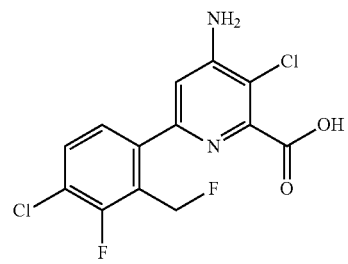

The title compound was prepared as described in Example 79 with methyl 4-amino-3-chloro-6-(4-chloro-3-fluoro-2-(fluoromethyl)phenyl)picolinate (0.100 g, 0.288 mmol) and isolated as a tan solid (0.083 g, 86%).

4-Amino-3-chloro-6-(4-chloro-3-fluoro-2-(hydroxymethyl)phenyl)picolinic acid (Compound 11)

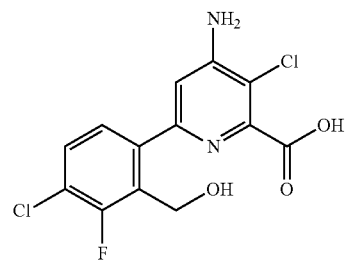

The title compound was prepared as described in Example 79 with methyl 4-amino-3-chloro-6-(4-chloro-3-fluoro-2-(hydroxymethyl)phenyl)picolinate (150 mg, 0.435 mmol) and isolated as a white solid (142 mg, 99%).

4-Amino-6-(2-carboxy-4-chloro-3-fluorophenyl)-3-chloropicolinic acid (Compound 56)

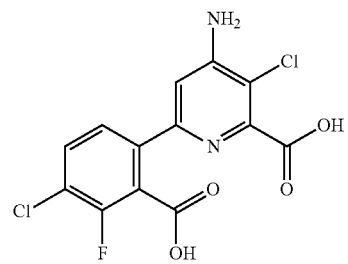 [SMILES: Nc1cc(-c2ccc(Cl)c(F)c2C(=O)O)nc(C(=O)O)c1Cl]

The title compound was prepared as described in Example 79 with 6-(4-amino-5-chloro-6-(methoxycarbonyl)pyridin-2-yl)-3-chloro-2-fluorobenzoic acid (150 mg, 0.418 mmol) and isolated as a light tan solid (78.0 mg, 54%).

4-Amino-3-chloro-6-(4-chloro-3-fluoro-2-vinylphenyl)picolinic acid (Compound 89)

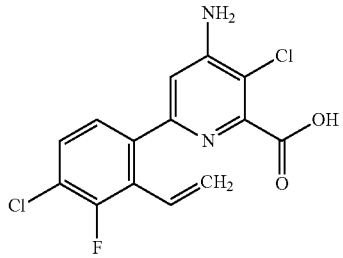

The title compound was prepared as described in Example 79 with methyl 4-amino-3-chloro-6-(4-chloro-3-fluoro-2-vinylphenyl)picolinate (36.0 mg, 0.106 mmol) and isolated as an off-white solid (33.0 mg, 96%).

4-Amino-3-chloro-6-(4-chloro-2-(difluoromethyl)-3-fluorophenyl)picolinic acid (Compound 13)

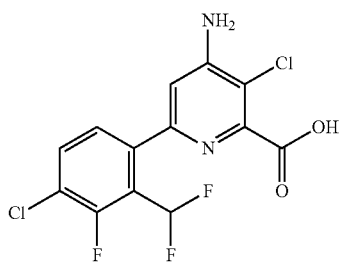

The title compound was prepared as described in Example 79 with methyl 4-amino-3-chloro-6-(4-chloro-2-(difluoromethyl)-3-fluorophenyl)picolinate (200 mg, 0.548 mmol) and isolated as an off-white solid (185 mg, 96%).

4-Amino-3-chloro-6-(2,4-dichloro-3-fluorophenyl)-5-fluoropicolinic acid (Compound 16)

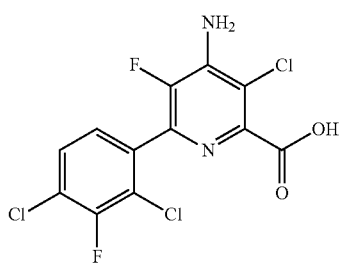 [SMILES: Nc1c(F)c(-c2ccc(Cl)c(F)c2Cl)nc(C(=O)O)c1Cl]

The title compound was prepared as described in Example 79 with methyl 4-amino-3-chloro-6-(2,4-dichloro-3-fluorophenyl)-5-fluoropicolinate (176 mg, 0.479 mmol) and isolated as an off-white solid (117 mg, 69%).

Example 80

Preparation of 4-amino-2',5,6'-trichloro-[2,3'-bipyridine]-6-carboxylic acid (Compound 1)

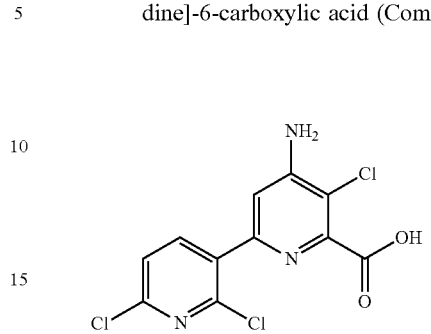

To a solution of methyl 4-amino-2',5,6'-trichloro-[2,3'-bipyridine]-6-carboxylate (130 mg, 0.39 mmol) in MeOH (2 mL) was added 2 N aq sodium hydroxide solution (NaOH; 2 mL, 6 mmol). The reaction mixture was stirred for 2 h while heating at 40° C. The solution was then concentrated and acidified with 2 N aq HCl solution. The desired product precipitated out of solution, was collected in a Büchner funnel, and allowed to dry overnight to afford a white solid (47 mg, 38%).

Example 81

Preparation of 4-amino-5-chloro-3-fluoro-6'-(trifluoromethyl)-[2,3'-bipyridine]-6-carboxylic acid (Compound 46)

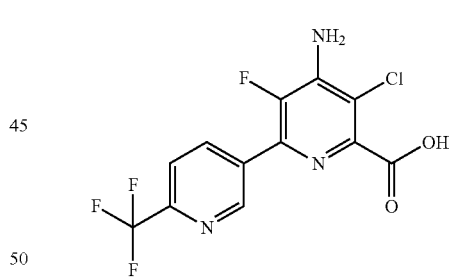

To a solution of methyl 4-amino-5-chloro-3-fluoro-6'-(trifluoromethyl)-2,3'-bipyridine-6-carboxylate (2 g, 5.72 mmol) in MeOH (11.44 mL) was added 2 N aq lithium hydroxide solution (LiOH; 2.9 mL, 5.72 mmol). The reaction mixture was stirred at 25° C. for 15 h. Then the reaction mixture was concentrated, and acidified with 2 N aq HCl solution. The product precipitated out of solution, and then was extracted from the solution with dichloromethane three times. The organics were dried (Na$_2$SO$_4$), filtered, concentrated in vacuo, and purified by reverse phase chromatography eluting with 60% water with 0.1% trifluoroacetic acid (TFA) and 40% acetonitrile to afford a white solid (1.3 g, 68%).

Example 82

Preparation of 6-amino-5-methoxy-2-(6-(trifluoromethyl)pyridin-3-yl)pyrimidine-4-carboxylic acid (Compound 5)

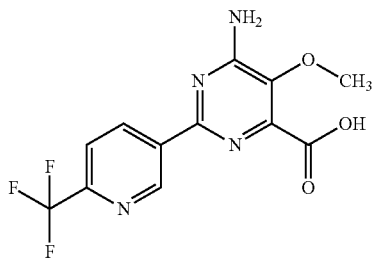 [SMILES: COc1c(N)nc(-c2ccc(C(F)(F)F)nc2)nc1C(=O)O]

To a solution of methyl 6-amino-5-methoxy-2-(6-(trifluoromethyl)pyridin-3-yl)pyrimidine-4-carboxylate (124 mg, 0.38 mmol) in MeOH (2 mL) was added 2 N aq LiOH solution (2 mL, 6 mmol). The reaction mixture was stirred overnight at ambient temperature. The mixture was then concentrated and acidified with 2 N aq HCl solution. The desired product precipitated out of solution, was collected in a Büchner funnel, and allowed to dry overnight to afford a tan solid (71 mg, 60%).

Example 83

Preparation of 4-amino-5-chloro-3-fluoro-2'-methoxy-6'-(trifluoromethyl)-[2,3'-bipyridine]-6-carboxylic acid (Compound 2)

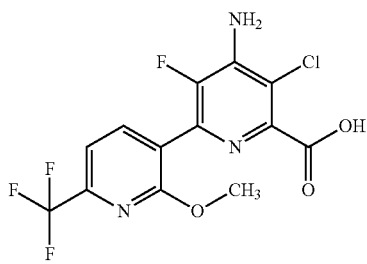 [SMILES: COc1nc(C(F)(F)F)ccc1-c1nc(C(=O)O)c(Cl)c(N)c1F]

To a solution of methyl 4-amino-5-chloro-2',3-difluoro-6'-(trifluoromethyl)-2,3'-bipyridine-6-carboxylate (120 mg, 0.33 mmol) in methanol (1.1 mL) was added 25% by weight solution of sodium methoxide in methanol solution (0.097 mL, 0.42 mmol). The reaction solution was stirred for 18 h at ambient temperature. The reaction mixture was acidified with 1N aq HCl solution and then concentrated. The residue was dissolved in dichloromethane, filtered and then concentrated to afford a white solid (122 mg, 100%).

Example 84

Preparation of 4-amino-3-chloro-6-(4-chloro-3,6-difluoro-2-methylphenyl)picolinic acid (Compound 92)

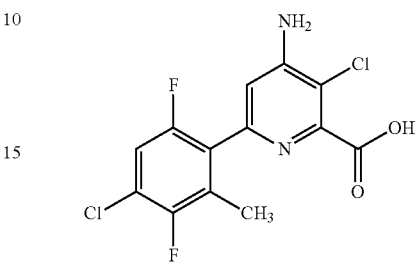

To a reaction vessel containing methyl 4-amino-3-chloro-6-(4-chloro-3,6-difluoro-2-methylphenyl)picolinate (0.143 g, 0.412 mmol) was added methanol (4.12 mL) and sodium hydroxide (0.824 mL, 1.648 mmol). The reaction mixture was stirred overnight at rt then acidified by adding a slight excess of 2N HCl. The mixture was concentrated and the precipitate that formed was washed with water and dried under vacuum to provide the title compound as a white solid (0.115 g, 81%).

Example 85

Preparation of 4-amino-3-chloro-6-(3-fluoro-2-methyl-4-(trifluoromethyl)phenyl)picolinic acid (Compound 61)

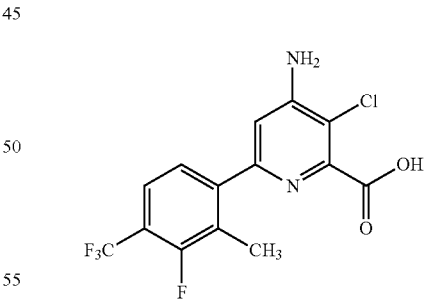

To a solution of methyl 4-amino-3-chloro-6-(3-fluoro-2-methyl-4-(trifluoromethyl)phenyl)picolinate (231 mg, 0.637 mmol) in MeOH (1 mL) was added 2M sodium hydroxide (0.318 mL, 0.637 mmol) solution. The reaction solution was stirred at 25° C. for 15 hr. The reaction mixture was then concentrated in vacuo, and the crude residue was acidified with 2M HCl solution. The product precipitated out of solution and then was collected via filtration to yield the title compound as a white solid (195 mg, 88%).

Example 86

Preparation of 4-amino-5-chloro-6'-(difluoromethyl)-3-fluoro-[2,3'-bipyridine]-6-carboxylic acid (Compound 27)

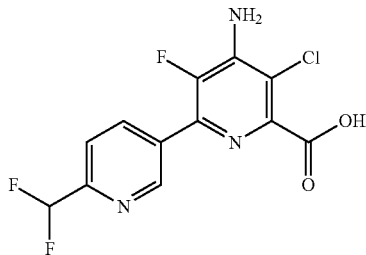 [SMILES: Nc1c(F)c(-c2ccc(C(F)F)nc2)nc(C(=O)O)c1Cl]

A 2M solution of sodium hydroxide (300 µL, 0.60 mmol, 2.0 equiv) was added to a stirred suspension of methyl 4-amino-5-chloro-6'-(difluoromethyl)-3-fluoro-2,3'-bipyridine-6-carboxylate (100 mg, 0.30 mmol, 1.0 equiv) in methanol (2.0 mL) at 23° C. The resulting pale yellow solution was stirred at 23° C. for 20 h. The reaction mixture was adjusted to pH 4, using concentrated hydrochloric acid and concentrated by rotary evaporation. The residue was slurried in water and vacuum filtered to afford the title compound as a white powder (68 mg, 71%).

Example 87

Preparation of 4-amino-5-chloro-6'-cyclopropyl-3-fluoro-[2,3'-bipyridine]-6-carboxylic acid (Compound 36)

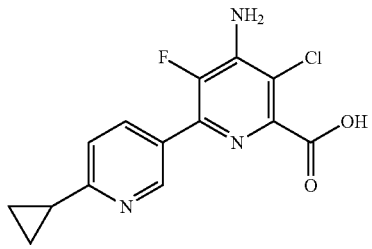 [SMILES: Nc1c(F)c(-c2ccc(C3CC3)nc2)nc(C(=O)O)c1Cl]

A 2M solution of aqueous sodium hydroxide (470 µL, 0.93 mmol, 2.0 equiv) was added to a stirred suspension of methyl 4-amino-5-chloro-6'-cyclopropyl-3-fluoro-[2,3'-bipyridine]-6-carboxylate (150 mg, 0.47 mmol, 1.0 equiv) in methanol (4.7 mL) at 23° C. The colorless solution was stirred at 23° C. for 18 h. The reaction mixture was adjusted to approximately pH 4 via dropwise addition of concentrated hydrochloric acid and concentrated via rotary evaporation. The residue was dissolved in dichloromethane (250 mL), passed through a hydrophobic membrane phase separator, dried (MgSO₄), gravity filtered, and concentrated by rotary evaporation to afford the title compound as a white powder (150 mg, 99%).

Example 88

Preparation of 4-amino-6'-bromo-5-chloro-3-fluoro-[2,3'-bipyridine]-6-carboxylic acid (Compound 8)

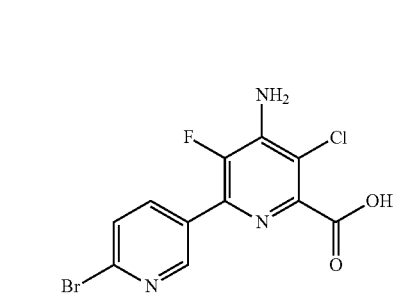 [SMILES: Nc1c(F)c(-c2ccc(Br)nc2)nc(C(=O)O)c1Cl]

To a solution of methyl 4-amino-6'-bromo-5-chloro-3-fluoro-[2,3'-bipyridine]-6-carboxylate (85 mg, 0.236 mmol) in THF (1.18 mL) and MeOH (1.18 mL) was added a 2N aqueous solution of sodium hydroxide (354 µL, 0.707 mmol). The reaction mixture was stirred at 20° C. overnight. The reaction mixture was acidified with a 2N aqueous solution of HCl (1 mL), diluted with water and extracted with EtOAc (2×). The combined organic layers were dried over MgSO₄, filtered, concentrated and dried in vacuo to afford the title compound as a light yellow solid (28 mg, 34.3%).

Example 89

Preparation of 4-amino-5-chloro-3-methyl-6'-(trifluoromethyl)-[2,3'-bipyridine]-6-carboxylic acid (Compound 51)

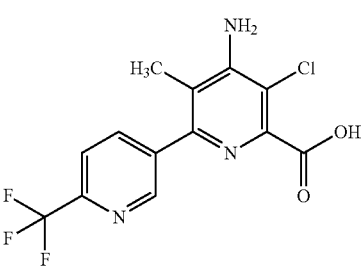 [SMILES: Cc1c(-c2ccc(C(F)(F)F)nc2)nc(C(=O)O)c(Cl)c1N]

To methyl 4-amino-5-chloro-3-methyl-6'-(trifluoromethyl)-[2,3'-bipyridine]-6-carboxylate (75 mg, 0.22 mmol) in methanol (1 mL) was added 2 N NaOH (0.44 mL, 0.88 mmol). The reaction mixture was stirred at room temperature for 20 h, then acidified with 2 N HCl and extracted with EtOAc (3×). The organic layers were dried over anhydrous sodium sulfate, filtered, and concentrated to afford the title compound as a white powder (55 mg, 76%).

Example 90

Preparation of methyl 4-amino-3-chloro-6-(2,3,4-trichlorophenyl)picolinic acid (Compound 40)

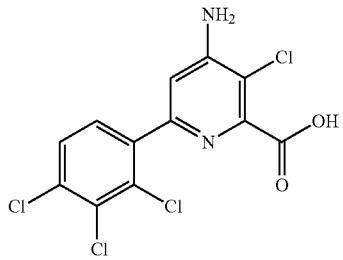 [SMILES: Nc1cc(-c2ccc(Cl)c(Cl)c2Cl)nc(C(=O)O)c1Cl]

To a flask charged with MeOH (2 mL) were added 4-amino-3-chloro-6-(2,3,4-trichlorophenyl)picolinate (60 mg, 0.164 mmol) and 1 M sodium hydroxide solution (0.5 mL, 0.5 mmol). Following 12 h of mechanical stirring, the reaction mixture was concentrated using a rotary evaporator with a water bath temperature of 40° C. Water was added to the resulting oil and the solution was slowly acidified by the addition of concentrated HCl until a tan precipitate formed. Filtration using filter paper and a Büchner funnel afforded 4-amino-3-chloro-6-(2,3,4-trichlorophenyl)picolinic acid as a white solid (50 mg; 86%).

Example 91

Preparation of (3,6-difluoro-2-methoxyphenyl)trimethylsilane

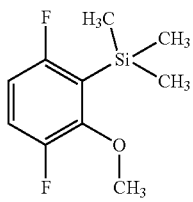

n-Butyllithium (7.63 mL, 19.08 mmol) was added dropwise to a reaction vessel containing THF (58 mL) at −78° C. To this reaction mixture was added 1,4-difluoro-2-methoxybenzene (2.500 g, 17.35 mmol) dropwise. The reaction mixture was stirred for 1 h at −78° C. This solution was transferred by cannulation into a solution of bromotrimethylsilane (3.19 g, 20.82 mmol) in THF (12 mL) cooled to −78° C. The resulting reaction mixture was allowed to warm to rt then diluted with ethyl acetate and water in a separatory funnel. Sodium sulfothioate (2.74 g, 17.35 mmol) was added to the biphasic solution and the resulting mixture was shaken until the dark color was gone (a clear, biphasic solution was obtained). The organic phase was concentrated and the resulting mixture was purified by flash chromatography (SiO$_2$; eluting with hexanes) to provide the title compound as a clear oil (2.82 g, 71.4%): $^1$H NMR (400 MHz, CDCl$_3$) δ 7.01 (ddd, J=11.2, 8.9, 5.3 Hz, 1H), 6.63 (ddd, J=8.9, 7.8, 3.2 Hz, 1H), 3.91 (d, J=2.6 Hz, 3H), 0.34 (d, J=1.9 Hz, 9H); $^{19}$F NMR (376 MHz, CDCl$_3$) δ −104.00, −104.05, −135.70, −135.74; EIMS m/z 216.

Example 92

Preparation of (4-chloro-3,6-difluoro-2-methoxyphenyl)trimethylsilane

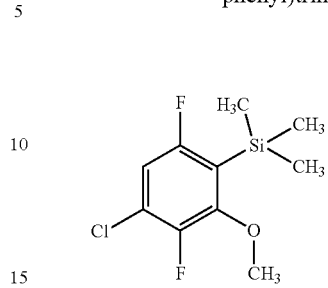

(3,6-Difluoro-2-methoxyphenyl)trimethylsilane (4.00 g, 18.49 mmol) was added dropwise to tetrahydrofuran (45 mL) cooled to −78° C. and the resulting solution was subsequently cooled to −78° C. again. A THF solution of (3,6-difluoro-2-methoxyphenyl)trimethylsilane (4.00 g, 18.49 mmol) was added dropwise and the reaction mixture was stirred at −78° C. for 2 h. A separate solution of 1,1,2-trichloro-1,2,2-trifluoroethane (10.40 g, 55.5 mmol) in THF (46.2 mL) was cooled to −78° C. The first solution was transferred by cannula into the second solution, and the resulting reaction mixture was allowed to warm to rt and concentrated under vacuum. The residue was partitioned between diethyl ether and water. The organic phase was concentrated and the product was purified by flash chromatography (SiO$_2$, eluting with hexanes) to provide the title compound as a clear oil (3.9 g; 80%): $^1$H NMR (400 MHz, CDCl$_3$) δ 6.77 (dd, J=7.9, 4.8 Hz, 1H), 3.93 (d, J=2.8 Hz, 3H), 0.32 (d, J=1.8 Hz, 9H); $^{19}$F NMR (376 MHz, CDCl$_3$) δ −102.88, −102.92, −138.18, −138.22; EIMS m/z 250.

Example 93

Preparation of 1-chloro-2,5-difluoro-4-iodo-3-methoxybenzene

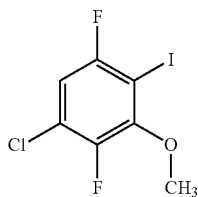

Iodine chloride (1.415 g, 8.71 mmol) was dissolved in dichloroethane (18.94 mL) and added dropwise to a solution of (4-chloro-3,6-difluoro-2-methoxyphenyl)trimethylsilane (1.9 g, 7.58 mmol) in dichloroethane (20 mL). The reaction mixture was stirred for 1 h at rt, diluted with dichloromethane, and washed with an aqueous solution of sodium hydrogensulfite (1.577 g, 15.15 mmol) in water. The organic phase was concentrated under vacuum and the product was purified by flash chromatography (SiO$_2$, eluting with hexanes) to provide the title compound as a clear oil (2.0 g, 87%): $^1$H NMR (400 MHz, CDCl$_3$) δ 6.94 (dd, J=7.0, 5.6 Hz, 1H), 4.00 (d, J=2.1 Hz, 3H); $^{19}$F NMR (376 MHz, CDCl$_3$) δ −96.00, −96.04, −134.12, −134.15; EIMS m/z 304.

Example 94

Preparation of (4-chloro-3,6-difluoro-2-methoxyphenyl)trimethylstannane

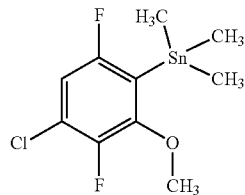

1-Chloro-2,5-difluoro-4-iodo-3-methoxybenzene (0.900 g, 2.96 mmol), 1,1,1,2,2,2-hexamethyldistannane (1.937 g, 5.91 mmol), and bis(triphenylphosphine)palladium(II)chloride (0.207 g, 0.296 mmol) were combined in 1,4-dioxane (6 mL) and heated at 90° C. for 2 h. The cooled reaction mixture was concentrated under vacuum and the product was purified by flash chromatography (SiO$_2$, eluting with hexanes) to provide the title compound as a clear oil (0.92 g, 87%): $^1$H NMR (400 MHz, CDCl$_3$) δ 6.58 (dd, J=5.6, 4.4 Hz, 1H), 3.72 (d, J=2.8 Hz, 3H), 0.16 (d, J=0.8 Hz, 7H); $^{19}$F NMR (376 MHz, CDCl$_3$) δ −99.33, −99.37, −138.50, −138.55; EIMS m/z 327 (M-CH$_3$).

Example 95

Preparation of (6-bromo-3-chloro-2-fluorophenyl)methanol

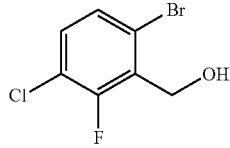 [SMILES: OCc1c(Br)ccc(Cl)c1F]

To a 100 mL flask charged with MeOH (50 mL) was added 6-bromo-3-chloro-2-fluorobenzaldehyde (2 g, 8.42 mmol). The reaction flask was placed in an ice water bath at 0° C. and solid sodium borohydride (0.351 g, 9.26 mmol) was added in two portions. Upon addition of the sodium borohydride, the ice water bath was removed. The reaction mixture was allowed to stir for 18 h whereupon it was placed in an ice water bath and a saturated NH$_4$Cl solution (50 mL) was added to the reaction mixture. The ice water bath was removed and the reaction was allowed to stir for 2 h. The reaction mixture was diluted with EtOAc (100 mL) and transferred to a separatory funnel. After vigorous shaking of the funnel, the organic layer was collected and two additional extractions with EtOAc (100 mL) were performed. The combined organic layers were dried over MgSO$_4$, filtered through a cotton plug, and concentrated to afford the title compound as a white powder (1.55 g): $^1$H NMR (400 MHz, CDCl$_3$) δ 7.32 (dd, J=8.7, 1.6 Hz, 1H), 7.23 (dd, J=8.7, 7.5 Hz, 1H), 4.82 (d, J=2.5 Hz, 2H); ESIMS m/z 240 ([M+H]+1).

TABLE 1

| Compound Number, Structure, Preparation and Appearance | | | |
|---|---|---|---|
| Compound No. | Structure | Appearance | Prepared as in Example: |
| 1 | | White Solid | 80 |
| 2 | | White Solid | 83 |

TABLE 1-continued

Compound Number, Structure, Preparation and Appearance

| Compound No. | Structure | Appearance | Prepared as in Example: |
|---|---|---|---|
| 3 | (structure) | Tan Solid | 63 |
| 4 | (structure) | Off-White Powder | 57 |
| 5 | (structure) | Tan Solid | 82 |
| 6 | (structure) | White Solid | 62 |
| 7 | (structure) | White Solid | 90 |
| 8 | (structure) | Light Yellow Solid | 88 |

TABLE 1-continued

Compound Number, Structure, Preparation and Appearance

| Compound No. | Structure | Appearance | Prepared as in Example: |
|---|---|---|---|
| 9 | (structure) | White Solid | 56 |
| 10 | (structure) | Off-White Solid | 90 |
| 11 | (structure) | White Solid | 79 |
| 12 | (structure) | Light Yellow Solid | 63 |
| 13 | (structure) | Off-White Solid | 79 |

TABLE 1-continued

Compound Number, Structure, Preparation and Appearance

| Compound No. | Structure | Appearance | Prepared as in Example: |
|---|---|---|---|
| 14 | (structure) | White Solid | 61 |
| 15 | (structure) | White Solid | 74 |
| 16 | (structure) | Off-White Solid | 79 |
| 17 | (structure) | White Powder | 58 |
| 18 | (structure) | White Solid | 63 |
| 19 | (structure) | White Solid | 48 |

TABLE 1-continued

Compound Number, Structure, Preparation and Appearance

| Compound No. | Structure | Appearance | Prepared as in Example: |
|---|---|---|---|
| 20 | | Off-White Solid | 63 |
| 21 | | Yellow Solid | 63 |
| 22 | | White Solid | 75 |
| 23 | | White Solid | 51 |
| 24 | | White Solid | 51 |
| 25 | | Brown Oil | 78 |

TABLE 1-continued

Compound Number, Structure, Preparation and Appearance

| Compound No. | Structure | Appearance | Prepared as in Example: |
|---|---|---|---|
| 26 | 4-amino-3-chloro-5-fluoro-6-[2-fluoro-6-(trifluoromethyl)pyridin-3-yl]pyridine-2-carboxylic acid | Tan Glass | 82 |
| 27 | 4-amino-3-chloro-6-[6-(difluoromethyl)pyridin-3-yl]-5-fluoropyridine-2-carboxylic acid | White Powder | 86 |
| 28 | 4-amino-3-chloro-6-(3,4-dichloro-2-methylphenyl)pyridine-2-carboxylic acid | Tan Solid | 90 |
| 29 | methyl 4-amino-3-chloro-6-[4-chloro-3-fluoro-2-(hydroxymethyl)phenyl]pyridine-2-carboxylate | White Solid | 70 |
| 30 | 4-amino-3-chloro-5-fluoro-6-(6-methoxypyridin-3-yl)pyridine-2-carboxylic acid | White Solid | 82 |
| 31 | methyl 6-amino-5-chloro-2-(4-chloro-3-fluoro-2-methylphenyl)pyrimidine-4-carboxylate | Tan Solid | 63 |

TABLE 1-continued

Compound Number, Structure, Preparation and Appearance

| Compound No. | Structure | Appearance | Prepared as in Example: |
|---|---|---|---|
| 32 | | White Solid | 51 |
| 33 | | Off-White Solid | 88 |
| 34 | | Off-White Powder | 59 |
| 35 | | White Solid | 51 |
| 36 | | White Powder | 87 |

TABLE 1-continued

Compound Number, Structure, Preparation and Appearance

| Compound No. | Structure | Appearance | Prepared as in Example: |
|---|---|---|---|
| 37 | | Tan Solid | 63 |
| 38 | | White Solid | 55 |
| 39 | | Light Tan Solid | 48 |
| 40 | | White Solid | 90 |
| 41 | | White Solid | 56 |

TABLE 1-continued

Compound Number, Structure, Preparation and Appearance

| Compound No. | Structure | Appearance | Prepared as in Example: |
|---|---|---|---|
| 42 | (structure) | White Solid | 48 |
| 43 | (structure) | Tan Solid | 54 |
| 44 | (structure) | Tan Solid | 63 |
| 45 | (structure) | White Solid | 53 |
| 46 | (structure) | White Solid | 81 |
| 47 | (structure) | Tan Powder | 57 |

TABLE 1-continued

Compound Number, Structure, Preparation and Appearance

| Compound No. | Structure | Appearance | Prepared as in Example: |
|---|---|---|---|
| 48 | | Yellow Solid | 63 |
| 49 | | White Powder | 59 |
| 50 | | Yellow Solid | 51 |
| 51 | | White Powder | 89 |
| 52 | | Off-White Solid | 88 |
| 53 | | Tan Solid | 73 |

TABLE 1-continued

Compound Number, Structure, Preparation and Appearance

| Compound No. | Structure | Appearance | Prepared as in Example: |
|---|---|---|---|
| 54 | | White Solid | 76 |
| 55 | | White Solid | 85 |
| 56 | | Light Tan Solid | 79 |
| 57 | | Yellow Solid | 90 |
| 58 | | Light Yellow Oil | 63 |
| 59 | | White Solid | 51 |

TABLE 1-continued

Compound Number, Structure, Preparation and Appearance

| Compound No. | Structure | Appearance | Prepared as in Example: |
|---|---|---|---|
| 60 | | Gum | 65 |
| 61 | | White Solid | 85 |
| 62 | | White Solid | 51 |
| 63 | | White Solid | 63 |
| 64 | | Tan Solid | 90 |

TABLE 1-continued

Compound Number, Structure, Preparation and Appearance

| Compound No. | Structure | Appearance | Prepared as in Example: |
|---|---|---|---|
| 65 | 4-amino-3-chloro-6-[2-methoxy-6-(trifluoromethyl)pyridin-3-yl]pyridine-2-carboxylic acid | Tan Solid | 90 |
| 66 | 4-amino-3-chloro-6-[6-(difluoromethoxy)pyridin-3-yl]-5-fluoropyridine-2-carboxylic acid | White Solid | 88 |
| 67 | 4-amino-3-chloro-6-(4-chloro-3-fluoro-2-methylphenyl)-5-fluoropyridine-2-carboxylic acid | White Solid | 90 |
| 68 | methyl 4-amino-3-chloro-6-(4-chloro-3-fluoro-2-methylphenyl)-5-fluoropyridine-2-carboxylate | Off-White Solid | 63 |
| 69 | methyl 4-amino-3-chloro-6-(3,4-difluoro-2-methylphenyl)pyridine-2-carboxylate | White Solid | 63 |
| 70 | methyl 6-amino-2-(4-chloro-3-fluoro-2-methoxyphenyl)-5-methoxypyrimidine-4-carboxylate | Off-White Solid | 48 |

TABLE 1-continued

Compound Number, Structure, Preparation and Appearance

| Compound No. | Structure | Appearance | Prepared as in Example: |
|---|---|---|---|
| 71 | | White Solid | 62 |
| 72 | | Tan Solid | 63 |
| 73 | | Clear Yellow Solid | 63 |
| 74 | | White Powder | 58 |
| 75 | | Tan Solid | 68 |
| 76 | | White Solid | 52 |

TABLE 1-continued

Compound Number, Structure, Preparation and Appearance

| Compound No. | Structure | Appearance | Prepared as in Example: |
|---|---|---|---|
| 77 | | White Solid | 63 |
| 78 | | White Solid | 70 |
| 79 | | Light Brown Solid | 72 |
| 80 | | Tan Solid | 79 |
| 81 | | White Solid | 88 |
| 82 | | White Powder | 57 |

TABLE 1-continued
Compound Number, Structure, Preparation and Appearance
| Compound No. | Structure | Appearance | Prepared as in Example: |
|---|---|---|---|
| 83 | 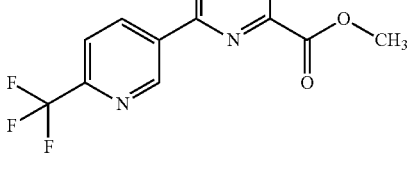 | White Solid | 62 |
| 84 | 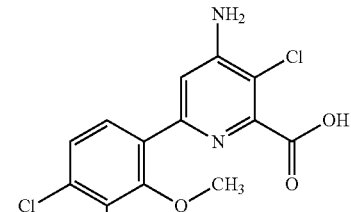 | Dull Yellow Solid | 79 |
| 85 | 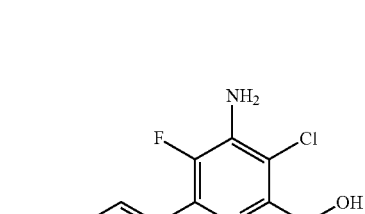 | Tan Solid | 82 |
| 86 | 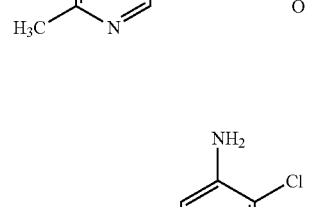 | Tan Solid | 90 |
| 87 | 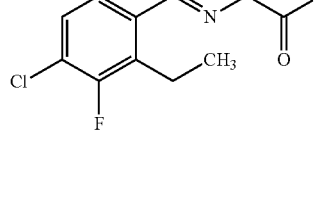 | Tan Solid | 90 |

TABLE 1-continued

| Compound No. | Structure | Appearance | Prepared as in Example: |
|---|---|---|---|
| 88 | | White Solid | 53 |
| 89 | | Off-White Solid | 79 |
| 90 | | White Solid | 51 |
| 91 | | Off-White Solid | 71 |
| 92 | | White Solid | 84 |

TABLE 1-continued

Compound Number, Structure, Preparation and Appearance

| Compound No. | Structure | Appearance | Prepared as in Example: |
|---|---|---|---|
| 93 | (structure) | White Solid | 63 |
| 94 | (structure) | Yellow Powder | 57 |
| 101 | (structure) | White Solid | 88 |
| 102 | (structure) | White Solid | 88 |

TABLE 2

Analytical Data for Compounds in Table 1

| Compound No. | mp (° C.) | IR (cm$^{-1}$) | Mass$^a$ | $^1$H NMR$^b$ | $^{13}$C or $^{19}$F NMR |
|---|---|---|---|---|---|
| 1 | 184 dec | | ESIMS m/z 318 ([M + H]$^+$) | $^1$H NMR (400 MHz, DMSO-d$_6$) δ 8.07 (d, J = 8.1 Hz, 1H), 7.67 (d, J = 8.1 Hz, 1H), 7.09 (s, 1H), 6.86 (s, 2H) | |
| 2 | 133-134 | | ESIMS m/z 366 ([M + H]$^+$) | $^1$H NMR (400 MHz, acetone-d$_6$) δ 8.15 (d, J = 7.4 Hz, 1H), 7.57 (d, J = 7.4 Hz, 1H), 6.42 (s, 2H), 4.00 (s, 3H) | |
| 3 | 122-136 | IR (thin film) 732.08, 819.20, 869.53, 915.88, | ESIMS m/z 363 ([M + H]$^+$) | $^1$H NMR (400 MHz, CDCl$_3$) δ 7.33-7.28 (m, 1H), 6.99 (dd, J = 8.3, 1.4 Hz, 1H), 5.34 (s, 2H), 3.96 (s, 3H), 2.11 (d, J = 2.6 Hz, 3H) | |

TABLE 2-continued

Analytical Data for Compounds in Table 1

| Compound No. | mp (° C.) | IR (cm$^{-1}$) | Mass$^a$ | $^1$H NMR$^b$ | $^{13}$C or $^{19}$F NMR |
|---|---|---|---|---|---|
| | | 960.40, 1017.10, 1092.36, 1064.98, 1177.85, 1224.02, 1277.56, 1363.06, 1410.14, 1444.68, 1484.08, 1550.13, 1605.88, 1734.92, 2952.91, 3211.51, 3366.10, 3474.82 | | | |
| 4 | 174-177 | | ESIMS m/z 332 ([M + H]$^+$) | $^1$H NMR (300 MHz, CDCl$_3$) δ 9.15 (d, J = 1.5 Hz, 1H), 8.48 (dd, J = 8, 1.5 Hz, 1H), 7.77 (d, J = 8 Hz, 1H), 7.17 (s, 1H), 4.96 (br s, 2H), 4.02 (s, 3H) | |
| 5 | 188 | | ESIMS m/z 315 ([M + H]$^+$) | $^1$H NMR (400 MHz, DMSO-d$_6$) δ 13.68 (s, 1H), 9.48 (d, J = 1.7 Hz, 1H), 8.76 (dd, J = 8.2, 1.6 Hz, 1H), 8.03 (d, J = 8.2 Hz, 1H), 7.56 (s, 2H), 3.79 (s, 3H) | |
| 6 | | | ESIMS m/z 325 ([M + H]$^+$) | $^1$H NMR (400 MHz, CDCl$_3$) δ 9.66 (d, J = 1.8 Hz, 1H), 8.82 (ddd, J = 8.2, 2.1, 0.9 Hz, 1H), 7.75 (dd, J = 8.2, 0.8 Hz, 1H), 6.80 (dd, J = 17.9, 11.6 Hz, 1H), 5.72-5.64 (m, 2H), 5.61-5.54 (m, 2H), 3.97 (s, 3H) | $^{19}$F NMR (376 MHz, CDCl$_3$) δ −67.83 |
| 7 | | | ESIMS m/z 336 ([M + H]$^+$) | $^1$H NMR (400 MHz, CDCl$_3$) δ 7.43 (d, J = 1.8 Hz, 1H), 7.30 (d, J = 1.8 Hz, 1H), 7.10 (s, 1H), 5.15 (s, 2H) | $^{19}$F NMR (376 MHz, CDCl$_3$) δ −111.95 |
| 8 | | | ESIMS m/z 346 ([M − H]$^-$) | $^1$H NMR (400 MHz, DMSO-d$_6$) δ 13.64 (s, 1H), 8.81 (s, 1H), 8.16 (dd, J = 8.4, 1.9 Hz, 1H), 7.81 (d, J = 8.3 Hz, 1H), 7.04 (s, 2H) | $^{19}$F NMR (376 MHz, DMSO-d$_6$) δ −140.70 |
| 9 | | | ESIMS m/z 363 ([M + H]$^+$) | $^1$H NMR (400 MHz, DMSO-d$_6$) δ 7.83 (t, J = 7.9 Hz, 1H), 7.64 (d, J = 8.3 Hz, 1H), 7.34-7.19 (m, 1H), 6.93 (s, 2H), 3.89 (s, 3H), 2.41 (s, 3H) | $^{19}$F NMR (376 MHz, DMSO-d$_6$) −59.7, −117.3 |
| 10 | | | ESIMS m/z 371 ([M + H]$^+$) | $^1$H NMR (400 MHz, CDCl$_3$) δ 11.09 (s, 1H), 7.58-7.44 (m, 1H), 7.31-7.27 (m, 1H), 5.20 (s, 2H) | $^{19}$F NMR (376 MHz, CDCl$_3$) δ −134.21 |
| 11 | | | ESIMS m/z 331 ([M + H]$^+$) | $^1$H NMR (400 MHz, DMSO-d$_6$) δ 13.62 (s, 1H), 7.55-7.68 (m, 1H), 7.32 (dd, J = 8.5, 1.2 Hz, 1H), 7.04 (s, 1H), 6.87 (s, 2H), 5.36 (dd, J = 6.0, 2.2 Hz, 1H), 4.44 (d, J = 2.5 Hz, 2H) | $^{19}$F NMR (376 MHz, DMSO-d$_6$) δ −119.69 |

TABLE 2-continued

Analytical Data for Compounds in Table 1

| Compound No. | mp (° C.) | IR (cm$^{-1}$) | Mass$^a$ | $^1$H NMR$^b$ | $^{13}$C or $^{19}$F NMR |
|---|---|---|---|---|---|
| 12 | 195-196 | | ESIMS m/z 385 ([M + H]$^+$) | $^1$H NMR (400 MHz, CDCl$_3$) δ 7.49 (d, J = 8.4 Hz, 1H), 7.31 (d, J = 8.3 Hz, 1H), 4.98 (s, 2H), 3.97 (s, 3H) | |
| 13 | | | ESIMS m/z 351 ([M + H]$^+$) | $^1$H NMR (400 MHz, DMSO-d$_6$) δ 7.91 (t, J = 7.9 Hz, 1H), 7.43 (dd, J = 8.3, 1.4 Hz, 1H), 7.04-7.36 (m, 1H), 6.77-7.02 (m, 3H) | $^{19}$F NMR (376 MHz, DMSO-d$_6$) δ −106.07 (d, J = 17.5 Hz), −112.07 (t, J = 17.2 Hz) |
| 14 | | | ESIMS m/z 342 ([M + H]$^+$) | $^1$H NMR (400 MHz, CDCl$_3$) d 9.28 (s, 1H), 8.47 (ddt, J = 8.3, 2.2, 0.8 Hz, 1H), 7.79 (dd, J = 8.2, 0.9 Hz, 1H), 6.90 (ddd, J = 18.1, 11.6, 0.5 Hz, 1H), 5.75 (dd, J = 11.6, 1.3 Hz, 1H), 5.61 (dd, J = 18.1, 1.3 Hz, 1H), 4.82 (s, 2H), 3.94 (s, 3H) | $^{19}$F NMR (376 MHz, CDCl$_3$) δ −67.96, −143.83 |
| 15 | 231 | | ESIMS m/z 332 ([M + H]$^+$) | $^1$H NMR (400 MHz, DMSO-d$_6$) δ 8.05 (d, J = 8.0 Hz, 1H), 7.66 (d, J = 8.0 Hz, 1H), 7.12 (s, H), 6.93 (s, 2H), 3.87 (s, 3H) | |
| 16 | | | ESIMS m/z 355 ([M + H]$^+$) | $^1$H NMR (400 MHz, DMSO-d$_6$) δ 13.68 (s, 1H), 7.75 (dd, J = 8.5, 7.1 Hz, 1H), 7.41 (dd, J = 8.5, 1.7 Hz, 1H), 7.07 (s, 2H) | $^{19}$F NMR (376 MHz, DMSO-d$_6$) δ −115.02, −138.21. |
| 17 | 164-167 | | ESIMS m/z 316 ([M + H]$^+$) | $^1$H NMR (300 MHz, CDCl$_3$) δ 8.58 (dd, J = 10, 8 Hz, 1H), 7.31-7.37 (m, 2H), 4.91 (br s, 2H), 4.01 (s, 3H) | |
| 18 | | | ESIMS m/z 380 ([M + H]$^+$) | $^1$H NMR (400 MHz, CDCl$_3$) δ 7.43 (dd, J = 8.3, 7.0 Hz, 1H), 7.18 (dd, J = 8.3, 1.4 Hz, 1H), 4.95 (s, 2H), 3.96 (s, 3H), 2.36 (d, J = 0.8 Hz, 3H) | |
| 19 | | | ESIMS m/z 369 ([M + H]$^+$) | $^1$H NMR (400 MHz, DMSO-d$_6$) δ 7.75 (dd, J = 8.5, 7.2 Hz, 1H), 7.41 (dd, J = 8.5, 1.7 Hz, 1H), 7.16 (s, 2H), 3.86 (s, 3H) | $^{19}$F NMR (376 MHz, DMSO-d$_6$) δ −115.00, −137.34 |
| 20 | | IR (thin film) 893.67, 913.20, 1037.63, 1128.04, 1280.63, 1242.05, 1367.64, 1307.21, 1436.04, 1507.37, 1600.60, 1633.91, 1749.56, 2538.33, 3097.23, 3287.02 | ESIMS m/z 346 ([M + H]$^+$) | $^1$H NMR (400 MHz, DMSO-d$_6$) δ 7.52 (dd, J = 8.7, 1.8 Hz, 1H), 7.38 (dd, J = 8.7, 6.9 Hz, 1H), 7.28 (s, 1H), 6.83 (s, 2H), 3.86 (s, 3H), 3.82 (d, J = 1.4 Hz, 3H) | |
| 21 | 140-143 | | ESIMS m/z 344 ([M + H]$^+$) | $^1$H NMR (400 MHz, DMSO-d$_6$) δ 7.52 (dd, J = 8.4, 7.5 Hz, 1H), 7.20 (dd, J = 8.3, 1.3 Hz, 1H), 6.97 (s, 1H), 3.88 (s, 3H), 2.61 (qd, J = 7.5, 2.0 Hz, 2H), 1.07 (t, J = 7.4 Hz, 3H) | |

TABLE 2-continued

Analytical Data for Compounds in Table 1

| Compound No. | mp (° C.) | IR (cm$^{-1}$) | Mass[a] | $^1$H NMR[b] | $^{13}$C or $^{19}$F NMR |
|---|---|---|---|---|---|
| 22 | | | ESIMS m/z 360 ([M − H]$^−$) | $^1$H NMR (400 MHz, DMSO-d$_6$) δ 8.78 (s, 1H), 8.14 (ddd, J = 8.4, 2.5, 0.9 Hz, 1H), 7.81 (dd, J = 8.3, 0.7 Hz, 1H), 7.13 (s, 2H), 3.89 (s, 3H) | $^{19}$F NMR (376 MHz, DMSO-d$_6$) δ −139.78 |
| 23 | 167-168 | | EIMS m/z 299 | $^1$H NMR (400 MHz, acetone-d$_6$) δ 8.75 (d, J = 0.9 Hz, 1H), 8.47 (tdd, J = 7.9, 2.5, 1.1 Hz, 1H), 7.24 (ddd, J = 8.6, 3.0, 0.6 Hz, 1H), 6.48 (s, 2H), 3.93 (s, 3H) | |
| 24 | 128 | | ESIMS m/z 368 ([M + H]$^+$) | $^1$H NMR (400 MHz, DMSO-d$_6$) δ 8.47 (t, J = 8.1 Hz, 1H), 8.07 (dd, J = 7.7, 1.5 Hz, 1H), 7.21 (s, 2H), 3.88 (s, 3H) | |
| 25 | | | ESIMS m/z 421 ([M + H]$^+$) | $^1$H NMR (400 MHz, CD$_3$OD) δ 7.91 (ddd, J = 8.1, 6.2, 0.8 Hz, 1H), 7.12 (dd, J = 8.1, 1.0 Hz, 1H), 7.09 (s, 1H), 4.13 (s, 3H), 2.33 (d, J = 2.6 Hz, 3H) | $^{19}$F NMR (376 MHz, CD$_3$OD) δ −95.34 |
| 26 | 74-80 | | ESIMS m/z 350 ([M + H]$^+$) | $^1$H NMR (400 MHz, DMSO-d$_6$) δ 13.64 (s, 1H), 8.07 (d, J = 7.9 Hz, 1H), 7.87 (d, J = 7.9 Hz, 1H), 7.06 (s, 2H), 2.47 (s, 3H) | |
| 27 | 167-169 | IR (thin film) 3451 (m), 3312 (s), 3168 (s), 1722 (m), 1632 (m) | ESIMS m/z 318 ([M + H]$^+$) | $^1$H NMR (400 MHz, DMSO-d$_6$) δ 13.65 (br s, 1H), 9.10 (s, 1H), 8.43 (d, J = 8 Hz, 1H), 7.87 (d, J = 8 Hz, 1H), 7.05 (t, J = 56 Hz, 1H), 7.01 (br s, 2H) | |
| 28 | 174-175 | IR (thin film) 545.76, 600.46, 687.18, 730.50, 760.10, 822.66, 855.05, 902.24, 990.09, 963.95, 1044.91, 1019.99, 1101.69, 1185.85, 1246.44, 1287.66, 1324.81, 1378.45, 1393.58, 1484.72, 1463.39, 1516.39, 1594.54, 1627.85, 2128.60, 2255.59, 2773.27, 2922.30, 3248.59 | ESIMS m/z 332 ([M + H]$^+$) | $^1$H NMR (400 MHz, DMSO-d$_6$) δ 7.56 (d, J = 8.3 Hz, 1H), 7.30 (d, J = 8.3 Hz, 1H), 6.79 (s, 2H), 6.78 (s, 1H), 2.33 (s, 3H) | |
| 29 | | | ESIMS m/z 345 ([M + H]$^+$) | $^1$H NMR (400 MHz, DMSO-d$_6$) δ 7.61 (dd, J = 8.4, 7.5 Hz, 1H), 7.30 (dd, J = 8.4, 1.3 Hz, 1H), 7.06 (s, 1H), 6.92 (s, 2H), 5.27 (t, J = 6.1 Hz, 1H), | $^{19}$F NMR (376 MHz, DMSO-d$_6$) δ −119.65. |

TABLE 2-continued

Analytical Data for Compounds in Table 1

| Compound No. | mp (° C.) | IR (cm$^{-1}$) | Mass$^a$ | $^1$H NMR$^b$ | $^{13}$C or $^{19}$F NMR |
|---|---|---|---|---|---|
| 30 | 166-167 | | ESIMS m/z 298 ([M + H]$^+$) | 4.45 (dd, J = 6.2, 2.4 Hz, 2H), 3.85 (s, 3H) $^1$H NMR (400 MHz, DMSO-d$_6$) δ 13.58 (s, 1H), 8.68-8.53 (m, 1H), 8.15 (ddd, J = 8.7, 2.4, 1.0 Hz, 1H), 6.96 (dd, J = 8.7, 0.7 Hz, 1H), 6.93 (s, 2H), 3.92 (s, 3H) | |
| 31 | | IR (thin film) 734.06, 777.49, 841.09, 823.68, 963.27, 1036.38, 1079.72, 1177.80, 1253.19, 1233.32, 1382.64, 1439.79, 1532.69, 1469.58, 1554.43, 1640.08, 1734.65, 3144.94, 3294.88, 3477.74 | ESIMS m/z 331 ([M + H]$^+$) | $^1$H NMR (400 MHz, CDCl$_3$) δ 7.49 (dd, J = 8.4, 1.4 Hz, 1H), 7.33-7.27 (m, 1H), 5.62 (s, 2H), 4.00 (s, 3H), 2.45 (d, J = 2.8 Hz, 3H) | |
| 32 | 145 | | ESIMS m/z 346 ([M + H]$^+$) | $^1$H NMR (400 MHz, acetone-d$_6$) δ 8.89 (s, 1H), 8.21 (d, J = 8.0 Hz, 1H), 7.97 (d, J = 8.1 Hz, 1H), 6.18 (s, 2H), 3.91 (s, 3H), 2.28 (s, 3H) | |
| 33 | 155-158 | | ESIMS m/z 350 ([M − H]$^-$) | $^1$H NMR (400 MHz, DMSO-d$_6$) δ 13.82 (br s, 1H), 8.99 (d, J = 1.9 Hz, 1H), 8.33 (dd, J = 8.1, 1.7 Hz, 1H), 8.12-8.00 (m, 1H), 7.16 (s, 2H) | $^{19}$F NMR (376 MHz, DMSO-d$_6$) δ −66.47 |
| 34 | 144-146 | IR (thin film) 3465 (s), 3302 (s), 3164 (s), 2965 (w), 1740 (s), 1636 (s) | ESIMS m/z 332 ([M + H]$^+$) | $^1$H NMR (300 MHz, CDCl$_3$) δ 9.21 (s, 1H), 8.43 (d, J = 8 Hz, 1H), 7.75 (d, J = 8 Hz, 1H), 6.70 (t, J = 56 Hz, 1H), 4.98 (br s, 2H), 3.99 (s, 3H) | |
| 35 | 160 | | ESIMS m/z 362 ([M − H]$^-$) | $^1$H NMR (400 MHz, DMSO-d$_6$) δ 8.07 (d, J = 7.9 Hz, 1H), 7.87 (d, J = 7.9 Hz, 1H), 7.15 (s, 2H), 3.87 (s, 3H), 2.46 (s, 3H) | |
| 36 | 260-265 (dec) | IR (thin film) 3320 (s), 3192 (s), 1620 (s) | ESIMS m/z 308 ([M + H]$^+$) | $^1$H NMR (400 MHz, DMSO-d$_6$) δ 8.80 (s, 1H), 8.02 (d, J = 8 Hz, 1H), 7.42 (d, J = 8 Hz, 1H), 6.51 (br s, 2H), 2.14 (m, 1H), 0.92-1.02 (m, 4H) | |
| 37 | | IR (thin film) 647.92, 730.71, 787.67, 765.74, 841.66, 908.98, 939.83, 1006.58, 1028.77, 1114.19, | ESIMS m/z 362 ([M + H]$^+$) | $^1$H NMR (400 MHz, CDCl$_3$) δ 8.42 (dt, J = 7.5, 0.8 Hz, 1H), 7.50 (s, 1H), 7.36 (d, J = 7.7 Hz, 1H), 4.86 (s, 2H), 4.07 (s, 3H), 4.00 (s, 3H) | |

TABLE 2-continued

Analytical Data for Compounds in Table 1

| Compound No. | mp (° C.) | IR (cm$^{-1}$) | Mass$^a$ | $^1$H NMR$^b$ | $^{13}$C or $^{19}$F NMR |
|---|---|---|---|---|---|
| | | 1128.33, 1177.15, 1225.32, 1344.72, 1363.79, 1383.76, 1575.50, 1454.16, 1594.67, 1618.23, 1729.54, 2955.46, 3374.91, 3486.37 | | | |
| 38 | 144-146 | | ESIMS m/z 345 ([M − H]$^-$) | $^1$H NMR (400 MHz, CDCl$_3$) δ 7.06 (dd, J = 8.7, 6.0 Hz, 1H), 6.75 (d, J = 1.5 Hz, 1H), 4.88 (br s, 2H), 3.97 (s, 3H), 2.18 (d, J = 2.7 Hz, 3H) | $^{19}$F NMR (376 MHz, CDCl$_3$) δ −119.50, −119.54, −122.31, −122.35 |
| 39 | | | ESIMS m/z 363 ([M + H]$^+$) | $^1$H NMR (400 MHz, DMSO-d$_6$) δ 7.40 (dd, J = 8.5, 6.8 Hz, 1H), 7.22 (dd, J = 8.5, 1.8 Hz, 1H), 7.02 (s, 2H), 3.84 (s, 3H), 3.81 (d, J = 1.8 Hz, 3H) | $^{19}$F NMR (376 MHz, DMSO-d$_6$) δ −131.99, −137.27 |
| 40 | 139-147 | | ESIMS m/z 367 ([M + H]$^+$) | $^1$H NMR (400 MHz, CD$_3$OD) δ 7.75 (d, J = 8.4 Hz, 1H), 7.54 (d, J = 8.4 Hz, 1H), 7.09 (s, 1H), 4.06 (s, 3H) | |
| 41 | | | ESIMS m/z 381 ([M + H]$^+$) | $^1$H NMR (400 MHz, DMSO-d$_6$) δ 7.67 (t, J = 9.0 Hz, 1H), 7.59 (t, J = 7.5 Hz, 1H), 7.18 (d, J = 29.6 Hz, 2H), 3.87 (d, J = 3.0 Hz, 3H), 2.41 (s, 3H) | $^{19}$F NMR (376 MHz, DMSO-d$_6$) δ −59.9, −114.7, −117.2, −137.6 |
| 42 | | | ESIMS m/z 346 ([M + H]$^+$) | $^1$H NMR (400 MHz, DMSO-d$_6$) δ 7.41-7.71 (m, 4H), 3.88 (s, 3H), 3.77 (s, 3H) | $^{19}$F NMR (376 MHz, DMSO-d$_6$) δ −115.25 |
| 43 | 148-149 | | EIMS m/z 328 | $^1$H NMR (400 MHz, DMSO-d$_6$) δ 9.44 (d, J = 1.5 Hz, 1H), 8.72 (dd, J = 8.0, 1.7 Hz, 1H), 8.02 (d, J = 8.2 Hz, 1H), 7.62 (m, 2H), 3.92 (s, 3H), 3.77 (s, 3H) | |
| 44 | | IR (thin film) 646.54, 728.88, 799.54, 841.69, 908.13, 895.69, 943.94, 1015.37, 1114.00, 1102.77, 1138.53, 1178.89, 1201.95, 1232.34, 1272.53, 1347.26, 1384.79, 1423.48, 1445.53, 1464.36, 1491.85, 1619.39, 1733.49, 2956.21, | ESIMS m/z 380 ([M + H]$^+$) | $^1$H NMR (400 MHz, CDCl$_3$) δ 7.95-7.81 (m, 1H), 7.37 (d, J = 7.5 Hz, 1H), 5.06-4.72 (m, 2H), 3.99 (s, 3H), 3.97 (s, 3H) | |

TABLE 2-continued

Analytical Data for Compounds in Table 1

| Compound No. | mp (° C.) | IR (cm$^{-1}$) | Mass$^a$ | $^1$H NMR$^b$ | $^{13}$C or $^{19}$F NMR |
|---|---|---|---|---|---|
| 45 | 190-191 | 3369.11, 3486.94 | ESIMS m/z 334 ([M + H]$^+$) | $^1$H NMR (400 MHz, DMSO-d$_6$) δ 8.22 (dd, J = 9.3, 7.9 Hz, 1H), 7.69 (dd, J = 7.9, 1.1 Hz, 1H), 7.19 (s, 2H), 3.87 (s, 3H) | |
| 46 | 164 | | ESIMS m/z 336 ([M + H]$^+$) | $^1$H NMR (400 MHz, acetone-d$_6$) δ 9.29 (s, 1H), 8.62 (dd, J = 8.3, 0.8 Hz, 1H), 8.01 (dd, J = 8.3, 0.6 Hz, 1H), 6.61 (s, 2H) | |
| 47 | 150-153 | | ESIMS m/z 351 ([M + H]$^+$) | $^1$H NMR (300 MHz, CDCl$_3$) δ 8.67 (t, J = 8 Hz, 1H), 7.67 (dd, J = 8, 1 Hz, 1H), 5.73 (br s, 2H), 4.03 (s, 3H) | |
| 48 | 109-111 | | ESIMS m/z 329 ([M + H]$^+$) | $^1$H NMR (400 MHz, CD$_3$OD) δ 8.06 (d, J = 7.9 Hz, 1H), 7.34 (s, 1H), 7.28 (d, J = 7.8 Hz, 1H), 4.12 (s, 3H), 4.08 (s, 3H) | |
| 49 | 124-126 | IR (thin film) 3470 (m), 3370 (s), 3192 (m), 3008 (w), 2954 (w), 1738 (s), 1625 (s) | ESIMS m/z 322 ([M + H]$^+$) | $^1$H NMR (400 MHz, CDCl$_3$) δ 8.97 (t, J = 2 Hz, 1H), 8.11 (ddd, J = 9, 2, 1 Hz, 1H), 7.23 (dd, J = 9, 1 Hz, 1H), 4.91 (br s, 2H), 3.97 (s, 3H), 2.06 (m, 1H), 0.98-1.08 (m, 4H) | |
| 50 | 163-164 | | ESIMS m/z 281 ([M − H]$^−$) | $^1$H NMR (400 MHz, acetone-d$_6$) δ 9.15-9.08 (m, 1H), 8.67 (dd, J = 4.8, 1.7 Hz, 1H), 8.28 (ddt, J = 8.0, 2.2, 1.6 Hz, 1H), 7.53 (ddd, J = 8.0, 4.8, 0.9 Hz, 1H), 6.47 (s, 1H), 3.95 (s, 3H) | |
| 51 | 140-160 | | ESIMS m/z 332 ([M + H]$^+$) | $^1$H NMR (400 MHz, DMSO-d$_6$) δ 8.86 (s, 1H), 8.19 (d, J = 8.1 Hz, 1H), 8.01 (d, J = 8.1 Hz, 1H), 6.69 (s, 2H), 2.11 (s, 3H) | $^{19}$F NMR (376 MHz, DMSO-d$_6$) δ −66.33. |
| 52 | 160-162 | | ESIMS m/z 316 ([M + H] + 1) | $^1$H NMR (400 MHz, DMSO-d$_6$) δ 13.51 (s, 1H), 7.48 (t, J = 7.9 Hz, 1H), 7.20 (dd, J = 8.4, 1.3 Hz, 1H), 6.83 (s, 1H), 6.77 (s, 2H), 2.23 (d, J = 2.7 Hz, 3H) | |
| 53 | | | ESIMS m/z 365 ([M + H]$^+$) | $^1$H NMR (400 MHz, DMSO-d$_6$) δ 7.90 (t, J = 7.9 Hz, 1H), 7.41 (dd, J = 8.3, 1.5 Hz, 1H), 6.88-7.30 (m, 4H), 3.88 (s, 3H) | $^{19}$F NMR (376 MHz, DMSO-d$_6$) δ −110.69 (d, J = 17.1 Hz), −116.90 (t, J = 17.1 Hz) |
| 54 | | | ESIMS m/z 406 ([M − H]$^−$) | $^1$H NMR (400 MHz, DMSO-d$_6$) δ 8.75 (s, 1H), 8.00 (dd, J = 8.3, 0.6 Hz, 1H), 7.89 (ddd, J = 8.2, 2.5, 0.8 Hz, 1H), 7.12 (s, 2H), 3.88 (s, 3H) | $^{19}$F NMR (376 MHz, DMSO-d$_6$) δ −139.76. |
| 55 | | IR (thin film) 3381, 1716, 1604 | ESIMS m/z 367 ([M + H]$^+$) | $^1$H NMR (400 MHz, DMSO-d$_6$) δ 13.68 (s, 1H), 7.69 (d, J = 8.4 Hz, 1H), 7.60 (t, J = 7.5 Hz, 1H), 7.05 (s, 2H), 2.41 (t, J = 2.1 Hz, 3H) | |
| 56 | | | ESIMS m/z 345 ([M + H]$^+$) | $^1$H NMR (400 MHz, DMSO-d$_6$) δ 13.44 (s, 1H), 7.74 (t, J = 8.0 Hz, 1H), 7.44 (d, J = 8.4 Hz, | $^{19}$F NMR (376 MHz, DMSO-d$_6$) δ −118.86. |

TABLE 2-continued

Analytical Data for Compounds in Table 1

| Compound No. | mp (° C.) | IR (cm$^{-1}$) | Mass$^a$ | $^1$H NMR$^b$ | $^{13}$C or $^{19}$F NMR |
|---|---|---|---|---|---|
| | | | | 1H), 6.99 (s, 1H), 6.80 (s, 2H) | |
| 57 | 170-171 | | ESIMS m/z 315 ([M + H]$^+$) | $^1$H NMR (400 MHz, CD$_3$OD) δ 8.01 (d, J = 7.9 Hz, 1H), 7.19 (d, J = 7.9 Hz, 1H), 7.13 (s, 1H), 4.04 (s, 3H) | |
| 58 | | | ESIMS m/z 362 ([M + H]$^+$) | $^1$H NMR (400 MHz, DMSO-d$_6$) δ 7.61 (dd, J = 8.4, 7.3 Hz, 1H), 7.27 (dd, J = 8.4, 1.3 Hz, 1H), 6.90 (s, 1H), 6.85 (s, 2H), 3.85 (s, 3H), 2.33 (d, J = 1.3 Hz, 3H) | |
| 59 | 137 | | ESIMS m/z 350 ([M + H]$^+$) | $^1$H NMR (400 MHz, DMSO-d$_6$) δ 9.16 (s, 1H), 8.48 (d, J = 8.4 Hz, 1H), 8.07 (d, J = 8.3 Hz, 1H), 7.21 (s, 2H), 3.91 (s, 3H) | |
| 60 | | | ESIMS m/z 377 ([M + H]$^+$) | $^1$H NMR (400 MHz, CDCl$_3$) δ 7.52 (d, J = 8.5 Hz, 1H), 7.17 (d, J = 8.4 Hz, 1H), 6.83 (s, 1H), 6.90 (t, J = 53.8 Hz, 1H), 4.99 (s, 2H), 3.97 (s, 3H), 3.96 (s, 3H) | |
| 61 | | | ESIMS m/z 349 ([M + H]$^+$) | $^1$H NMR (400 MHz, DMSO-d$_6$) δ 7.85 (d, J = 7.8 Hz, 1H), 7.64 (d, J = 8.4 Hz, 1H), 7.27 (t, J = 5.8 Hz, 1H), 6.89 (s, 2H), 3.13 (s, 1H), 2.41 (s, 3H) | $^{19}$F NMR (376 MHz, DMSO-d$_6$) δ −59.7, −117.3. |
| 62 | 168-169 | | ESIMS m/z 312 ([M + H]$^+$) | $^1$H NMR (400 MHz, DMSO-d$_6$) δ 8.61 (t, J = 1.7 Hz, 1H), 8.11 (ddd, J = 8.7, 2.4, 1.1 Hz, 1H), 7.00 (s, 2H), 6.96 (dd, J = 8.7, 0.7 Hz, 1H), 3.92 (s, 3H), 3.88 (s, 3H) | |
| 63 | 182-183 | IR (thin film) 780.64, 833.42, 955.77, 1020.55, 1195.75, 1218.17, 1255.66, 1361.84, 1427.61, 1396.69, 1443.51, 1480.80, 1602.94, 1731.91, 2853.47, 2947.69, 3366.93, 3487.82 | ESIMS m/z 226 ([M + H]$^+$) | $^1$H NMR (400 MHz, CDCl$_3$) δ 7.43 (dd, J = 8.4, 1.4 Hz, 1H), 7.27 (dd, J = 8.4, 1.4 Hz, 1H), 5.39 (s, 2H), 3.99 (s, 3H), 3.96 (s, 3H), 2.43 (d, J = 2.8 Hz, 3H) | |
| 64 | 140-143 | | ESIMS m/z 312 ([M + H]$^+$) | $^1$H NMR (400 MHz, DMSO-d$_6$) δ 7.55-7.44 (m, 2H), 3.77 (s, 3H), 2.41 (d, J = 2.8 Hz, 3H) | |
| 65 | 169-171 | IR (thin film) 852.00, 1009.24, 1121.37, 1095.27, 1171.62, 1221.83, 1269.82, 1294.65, 1328.12, | ESIMS m/z 348 ([M + H]$^+$) | $^1$H NMR (400 MHz, DMSO-d$_6$) δ 8.43 (d, J = 7.7 Hz, 1H), 7.61 (d, J = 7.7 Hz, 1H), 7.50 (s, 1H), 6.81 (s, 2H), 4.01 (s, 3H) | |

TABLE 2-continued

Analytical Data for Compounds in Table 1

| Compound No. | mp (° C.) | IR (cm$^{-1}$) | Mass$^a$ | $^1$H NMR$^b$ | $^{13}$C or $^{19}$F NMR |
|---|---|---|---|---|---|
| | | 1363.91, 1455.82, 1396.19, 1572.44, 1599.11, 1670.54, 1639.55, 2958.28, 3046.96, 3168.20, 3467.34 | | | |
| 66 | 134-136 | | ESIMS m/z 334 ([M + H]$^+$) | $^1$H NMR (400 MHz, DMSO-d$_6$) δ 13.63 (s, 1H), 8.68 (t, J = 1.9 Hz, 1H), 8.33 (ddd, J = 8.7, 2.5, 1.0 Hz, 1H), 7.78 (t, J = 72.6 Hz, 1H), 7.23 (dd, J = 8.6, 0.7 Hz, 1H), 6.99 (s, 2H) | |
| 67 | | | ESIMS m/z 334 ([M + H]$^+$) | $^1$H NMR (400 MHz, CDCl$_3$) δ 7.37 (t, J = 7.7 Hz, 1H), 7.09 (d, J = 8.3 Hz, 1H), 5.19 (s, 2H), 2.21 (dd, J = 2.8, 1.6 Hz, 3H) | |
| 68 | 154-156 | | ESIMS m/z 348 ([M + H]$^+$) | $^1$H NMR (400 MHz, CDCl$_3$) δ 7.34-7.28 (m, 1H), 7.13-7.08 (m, 1H), 4.95 (s, 2H), 3.97 (s, 3H), 2.25-2.14 (m, 3H) | |
| 69 | 120-126 | IR (thin film) 731.84, 822.95, 894.06, 993.99, 1129.99, 1070.16, 1180.91, 1283.17, 1245.15, 1311.48, 1383.44, 1441.14, 1508.32, 1604.64, 1643.41, 1737.23, 2239.53, 2656.08, 2878.09, 2956.35, 3096.90, 3269.43 | ESIMS m/z 314 ([M + H]$^+$) | $^1$H NMR (400 MHz, DMSO-d$_6$) δ 7.34 (dt, J = 10.0, 8.3 Hz, 1H), 7.20 (ddd, J = 8.7, 5.2, 1.7 Hz, 1H), 6.86 (d, J = 1.1 Hz, 1H), 3.87 (s, 3H), 2.22 (d, J = 2.6 Hz, 3H) | |
| 70 | | | ESIMS m/z 342 ([M + H]$^+$) | $^1$H NMR (400 MHz, DMSO-d$_6$) δ 7.27-7.58 (m, 4H), 3.88 (s, 3H), 3.87 (s, 3H), 3.75 (s, 3H) | $^{19}$F NMR (376 MHz, DMSO-d$_6$) δ −132.79 |
| 71 | 134-136 | | ESIMS m/z 348 ([M + H]$^+$) | $^1$H NMR (400 MHz, CDCl$_3$) δ 8.76 (ddd, J = 2.5, 1.6, 0.8 Hz, 1H), 8.34 (ddd, J = 8.7, 2.4, 1.0 Hz, 1H), 7.53 (t, J = 72.8 Hz, 1H), 7.01 (dd, J = 8.6, 0.8 Hz, 1H), 4.97 (s, 2H), 4.00 (s, 3H) | |
| 72 | 183-189 | | ESIMS m/z 350 ([M + H]$^+$) | $^1$H NMR (400 MHz, DMSO-d$_6$) δ 7.68 (dd, J = 8.5, 7.2 Hz, 1H), 7.41 (dd, J = 8.5, 1.8 Hz, 1H), 7.03 (s, 1H), 3.86 (s, 3H) | |

TABLE 2-continued

Analytical Data for Compounds in Table 1

| Compound No. | mp (° C.) | IR (cm$^{-1}$) | Mass$^a$ | $^1$H NMR$^b$ | $^{13}$C or $^{19}$F NMR |
|---|---|---|---|---|---|
| 73 | 128-134 | | ESIMS m/z 330 ([M + H]$^+$) | $^1$H NMR (400 MHz, CDCl$_3$) δ 7.29-7.24 (m, 1H), 7.09 (dd, J = 8.3, 1.4 Hz, 1H), 6.75 (s, 1H), 4.85 (s, 2H), 3.97 (s, 3H), 2.28 (dd, J = 2.7, 0.6 Hz, 3H) | |
| 74 | 138-141 | | ESIMS m/z 350 ([M + H]$^+$) | $^1$H NMR (300 MHz, CDCl$_3$) δ 8.79 (t, J = 8 Hz, 1H), 7.70 (br d, J = 8 Hz, 1H), 7.38 (s, 1H), 4.97 (br s, 2H), 4.02 (s, 3H) | |
| 75 | | | ESIMS m/z 339 ([M + H]$^+$) | $^1$H NMR (400 MHz, DMSO-d$_6$) δ 7.72 (dd, J = 8.5, 7.5 Hz, 1H), 7.46 (dd, J = 8.5, 1.3 Hz, 1H), 7.27 (s, 1H), 6.91 (s, 2H), 4.75 (d, J = 0.8 Hz, 1H), 3.87 (s, 3H) | $^{19}$F NMR (376 MHz, DMSO-d$_6$) δ −111.71 |
| 76 | 165-166 | | EIMS m/z 313 | $^1$H NMR (400 MHz, DMSO-d$_6$) δ 8.01 (dd, J = 9.8, 7.6 Hz, 1H), 7.38 (dd, J = 7.6, 1.7 Hz, 1H), 7.11 (s, 2H), 3.87 (s, 3H), 3.33 (s, 3H) | |
| 77 | 136-142 | IR (thin film) 729.88, 810.97, 855.21, 894.53, 941.22, 1049.34, 1110.78, 1189.42, 1236.21, 1305.46, 1365.43, 1381.44, 1439.51, 1491.68, 1525.52, 1632.37, 1602.37, 1753.98, 2591.62, 2875.22, 2952.56, 3103.09, 3293.61 | ESIMS m/z 347 ([M + H]$^+$) | $^1$H NMR (400 MHz, DMSO-d$_6$) δ 7.57 (d, J = 8.3 Hz, 1H), 7.31 (d, J = 8.3 Hz, 1H), 6.84 (d, J = 1.5 Hz, 1H), 3.86 (s, 3H), 2.31 (s, 3H) | |
| 78 | | | ESIMS m/z 347 ([M + H]$^+$) | $^1$H NMR (400 MHz, DMSO-d$_6$) δ 7.76 (td, J = 8.0, 2.2 Hz, 1H), 7.36 (dt, J = 8.5, 1.2 Hz, 1H), 6.92 (s, 3H), 5.58 (d, J = 2.1 Hz, 1H), 5.47 (d, J = 2.1 Hz, 1H), 3.86 (s, 3H) | $^{19}$F NMR (376 MHz, DMSO-d$_6$) δ −118.18 (d, J = 5.3 Hz), −203.98 (d, J = 4.2 Hz) |
| 79 | | | ESIMS m/z 341 ([M + H]$^+$) | $^1$H NMR (400 MHz, DMSO-d$_6$) δ 7.58 (dd, J = 8.3, 7.3 Hz, 1H), 7.26 (dd, J = 8.3, 1.3 Hz, 1H), 6.86 (s, 2H), 6.82 (s, 1H), 6.52 (dd, J = 17.9, 11.8 Hz, 1H), 5.72 (dt, J = 18.0, 1.8 Hz, 1H), 5.58 (dt, J = 11.8, 1.7 Hz, 1H), 3.86 (s, 3H) | $^{19}$F NMR (376 MHz, DMSO-d$_6$) δ −117.58 |
| 80 | | | ESIMS m/z 333 ([M + H]$^+$) | $^1$H NMR (400 MHz, DMSO-d$_6$) δ 13.54 (s, 1H), 7.74 (td, J = 8.1, 2.2 Hz, 1H), 7.35 (d, J = 8.4 Hz, 1H), 6.88 (s, 1H), 6.83 (s, 2H), 5.53 (dd, J = 47.4, 2.0 Hz, 2H) | $^{19}$F NMR (376 MHz, DMSO-d$_6$) δ −118.17, −203.98 (d, J = 4.4 Hz) |

TABLE 2-continued

Analytical Data for Compounds in Table 1

| Compound No. | mp (° C.) | IR (cm$^{-1}$) | Mass$^a$ | $^1$H NMR$^b$ | $^{13}$C or $^{19}$F NMR |
|---|---|---|---|---|---|
| 81 | | | ESIMS m/z 394 ([M + H]$^+$) | $^1$H NMR (400 MHz, DMSO-d$_6$) δ 8.77 (s, 1H), 8.04-7.96 (m, 1H), 7.91 (dd, J = 8.2, 1.9 Hz, 1H), 7.00 (s, 2H) | $^{19}$F NMR (376 MHz, DMSO-d$_6$) δ −140.91 |
| 82 | 179-181 | | ESIMS m/z 333 ([M + H]$^+$) | $^1$H NMR (300 MHz, CDCl$_3$) δ 9.63 (br s, 1H), 8.81 (br d, J = 8 Hz, 1H), 7.76 (d, J = 8 Hz, 1H), 5.78 (br s, 2H), 4.04 (s, 3H) | |
| 83 | 148-150 | | ESIMS m/z 364.61 ([M − H]$^−$) | $^1$H NMR (400 MHz, CDCl$_3$) δ 9.04 (d, J = 2.0 Hz, 1H), 8.19 (dd, J = 8.1, 1.6 Hz, 1H), 7.80 (d, J = 0.6 Hz, 1H), 5.43 (br s, 2H), 3.99 (s, 3H) | $^{19}$F NMR (376 MHz, CDCl$_3$) δ −67.99 |
| 84 | | | ESIMS m/z 331 ([M + H]$^+$) | $^1$H NMR (400 MHz, DMSO-d$_6$) δ 13.57 (s, 1H), 7.56 (d, J = 8.7 Hz, 1H), 7.39 (t, J = 7.9 Hz, 1H), 7.25 (s, 1H), 6.73 (s, 2H), 3.83 (s, 3H) | $^{19}$F NMR (376 MHz, DMSO-d$_6$) δ −132.32 |
| 85 | 186-187 | | ESIMS m/z 282 ([M + H]$^+$) | $^1$H NMR (400 MHz, CD3OD) δ 9.21 (s, 1H), 9.00 (d, J = 8.3 Hz, 1H), 8.02 (d, J = 8.4 Hz, 1H), 3.35 (s, 3H) | |
| 86 | 144-146 | | ESIMS m/z 330 ([M + H]$^+$) | $^1$H NMR (400 MHz, DMSO-d$_6$) δ 7.49 (dd, J = 8.3, 7.5 Hz, 1H), 7.16 (dd, J = 8.3, 1.3 Hz, 1H), 6.81 (s, 1H), 6.77 (s, 2H), 2.71-2.58 (m, 2H), 1.08 (t, J = 7.4 Hz, 3H) | $^{19}$F NMR (376 MHz, CDCl$_3$) δ −115.78 |
| 87 | 163-165 | IR (thin film) 978.07, 1024.98, 1051.26, 1281.75, 1329.37, 1378.70, 1439.18, 1456.29, 1501.48, 1581.85, 1637.67, 2757.14, 3100.49 | ESIMS m/z 299 ([M + H]$^+$) | $^1$H NMR (400 MHz, DMSO-d$_6$) δ 7.33 (dt, J = 10.0, 8.3 Hz, 1H), 7.20 (ddd, J = 8.7, 5.2, 1.7 Hz, 1H), 6.80 (s, 1H), 6.75 (s, 2H), 2.23 (d, J = 2.6 Hz, 3H) | |
| 88 | 164-165 | | ESIMS m/z 346 ([M + H]$^+$) | $^1$H NMR (400 MHz, DMSO-d$_6$) δ 7.86 (d, J = 8.3 Hz, 1H), 7.08 (s, 2H), 6.98 (d, J = 8.3 Hz, 1H), 3.92 (s, 3H), 3.86 (s, 3H) | |
| 89 | | | ESIMS m/z 327 ([M + H]$^+$) | $^1$H NMR (400 MHz, DMSO-d$_6$) δ 13.53 (s, 1H), 7.57 (dd, J = 8.4, 7.3 Hz, 1H), 7.27 (dd, J = 8.4, 1.2 Hz, 1H), 6.78 (s, 3H), 6.54 (dd, J = 17.9, 11.8 Hz, 1H), 5.73 (dt, J = 17.9, 1.8 Hz, 1H), 5.57 (dt, J = 11.8, 1.7 Hz, 1H) | $^{19}$F NMR (376 MHz, DMSO-d$_6$) δ −117.59 |
| 90 | 191 | | EIMS m/z 295 | $^1$H NMR (400 MHz, DMSO-d$_6$) δ 8.85 (s, 1H), 8.07 (ddd, J = 8.1, 2.2, 1.2 Hz, 1H), 7.40 (d, J = 8.1 Hz, 1H), 7.04 (s, 2H), 3.89 (s, 3H), 2.54 (s, 3H) | |
| 91 | | | ESIMS m/z 359 ([M + H]$^+$) | $^1$H NMR (400 MHz, DMSO-d$_6$) δ 13.60 (s, 1H), 7.75 (t, J = 8.0 Hz, | $^{19}$F NMR (376 MHz, DMSO-d$_6$) δ −118.74 |

TABLE 2-continued

Analytical Data for Compounds in Table 1

| Compound No. | mp (° C.) | IR (cm$^{-1}$) | Mass$^a$ | $^1$H NMR$^b$ | $^{13}$C or $^{19}$F NMR |
|---|---|---|---|---|---|
| 92 | 160-162 | | ESIMS m/z 334 ([M + H]$^+$) | 1H), 7.43 (dd, J = 8.3, 1.1 Hz, 1H), 7.01 (s, 1H), 6.86 (s, 2H), 3.85 (s, 3H) $^1$H NMR (400 MHz, DMSO-d$_6$) δ 13.24 (br s, 1H), 7.59 (dd, J = 8.8, 6.2 Hz, 1H), 6.82 (br s, 2H), 6.76 (s, 1H), 2.09 (d, J = 2.6 Hz, 3H) | $^{19}$F NMR (376 MHz, DMSO-d$_6$) δ −118.87, −118.91, −122.70, −122.74 |
| 93 | | | ESIMS m/z 353 ([M + H]$^+$) | $^1$H NMR (400 MHz, CDCl$_3$) δ 8.28 (d, J = 2.6 Hz, 1H), 7.57 (d, J = 7.3 Hz, 1H), 4.43 (s, 2H), 3.97 (s, 3H) | $^{19}$F NMR (376 MHz, CDCl$_3$) δ −147.11 |
| 94 | 192-195 | | ESIMS m/z 317 ([M + H]$^+$) | $^1$H NMR (300 MHz, CDCl$_3$) δ 8.49 (dd, J = 9, 8 Hz, 1H), 7.32 (dd, J = 8, 1 Hz, 1H), 5.68 (br s, 2H), 4.02 (s, 3H) | |
| 101 | | | ESIMS m/z 326 [(M − H)$^-$] | $^1$H NMR (400 MHz, DMSO-d$_6$) δ 13.23 (s, 1H), 9.20 (s, 1H), 8.51 (dd, J = 8.2, 2.0 Hz, 1H), 8.05 (dd, J = 8.3, 0.8 Hz, 1H), 6.78 (dd, J = 17.7, 11.6 Hz, 1H), 6.58 (s, 2H), 5.64-5.52 (m, 2H) | $^{19}$F NMR (376 MHz, DMSO-d$_6$) δ −66.44, −145.29 |
| 102 | | | ESIMS m/z 309 [(M− H)$^-$] | $^1$H NMR (400 MHz, DMSO-d$_6$) δ 9.51 (d, J = 2.0 Hz, 1H), 8.85-8.73 (m, 1H), 8.04 (dd, J = 8.3, 0.9 Hz, 1H), 7.42 (s, 2H), 6.68 (dd, J = 17.7, 11.5 Hz, 1H), 5.63 (dd, J = 17.7, 1.2 Hz, 1H), 5.55 (dd, J = 11.4, 1.2 Hz, 1H) | $^{19}$F NMR (376 MHz, DMSO-d$_6$) δ −66.36 |

$^a$Mass spectrometry data are electrospray ionization mass spectrometry (ESIMS) unless otherwise noted.
$^b$All $^1$H NMR data measured in CDCl$_3$ at 400 MHz unless otherwise noted

TABLE A

Percent Control Rating Conversion Table

| Rating | % Control |
|---|---|
| A | 95-100 |
| B | 85-94 |
| C | 75-84 |
| D | 60-74 |
| E | 45-59 |
| F | 30-44 |
| G | 0-29 |

Example A

Evaluation of Postemergent Herbicidal Activity

Post-Emergent Test I Seeds test species were obtained from commercial suppliers and planted into a 13 centimeter (cm) diameter-round pot containing soil-less media mix (Metro-Mix 360®, Sun Gro Horticulture). Postemergence treatments were planted 8-12 days prior to application and cultured in a greenhouse equipped with supplemental light sources to provide a 16 hour (h) photoperiod at 24-29° C. All pots were surface irrigated.

A weighted amount, determined by the highest rate to be tested, of each compound was dissolved in 1.3 mL acetone-dimethyl sulfoxide (DMSO; 97:3, volume per volume (v/v)) and diluted with 4.1 mL water-isopropanol-crop oil concentrate (78:20:2, v/v/v) containing 0.02% Triton X-155 to obtain concentrated stock solutions. Additional application rates were obtained by serial dilution of the high rate solution into a solution containing appropriate volume of 97:3 v/v mixture of acetone and DMSO and appropriate volume of an aqueous mixture of water, isopropyl alcohol, crop oil concentrate (78:20:2, v/v/v) containing 0.02% Triton X-155.

Formulated compounds were applied using a DeVilbiss® compressed air sprayer at 2-4 pounds per square inch (psi). Following treatment, pots were returned to the greenhouse for the duration of the experiment. All pots were sub-irrigated as need to provide optimum growing conditions. All pots were fertilized one time per week by subirrigating with Peters Peat-Lite Special® fertilizer (20-10-20).

Phytotoxicity ratings were obtained 10 days after treatment postemergence applications. All evaluations were made visually on a scale of 0 to 100 where 0 represents no activity and 100 represents complete plant death and presented as indicated in Table A. Visual assessments of plant injury were made based on growth reduction, discoloration, leaf deformity and necrosis Some of the compounds tested, application rates employed, plant species tested, and results are given in Table 3

TABLE 3

Post-Emergent Test I Herbicidal Activity on Key
Broadleaf and Grass Weed as well as Crop Species

| Compound # | Application Rate (kg ai/ha) | Visual Growth Reduction (%) 14 Days After Application | | | | | |
|---|---|---|---|---|---|---|---|
| | | AMARE | AVEFA | ECHSS | HELAN | IPOSS | SETFA |
| 4 | 4 | A | B | C | A | A | A |
| 17 | 3.8 | C | F | F | A | A | B |

AMARE: redroot pigwseed (*Amaranthus retroflexus*)
AVEFA: wild oats (*Avena fatua*)
ECHCG: barnyardgrass (*Echinochloa crus-galli*)
HELAN: sunflower (*Helianthus annuus*)
IPOHE: ivyleaf morningglory (*Ipomoea hederecea*)
SETFA: giant foxtail (*Setaria faberi*)
kg ai/ha: kilograms active ingredient per hectare Example B Evaluation of Preemergent Herbicidal Activity Pre-Emergent Test I Seeds of test species were planted into round plastic pots (5-inch diameter) containing sandy loam soil. After planting, all pots were sub-irrigated 16 h prior to compound application.

Compounds were dissolved in a 97:3 v/v mixture of acetone and DMSO and diluted to the appropriate concentration in a final application solution containing water, acetone, isopropanol, DMSO and Agri-dex (crop oil concentrate) in a 59:23:15:1.0:1.5 v/v ratio and 0.02% w/v (weight/volume) of Triton X-155 to obtain the spray solution containing the highest application rate. Additional application rates were obtained by serial dilution of the high rate solution with the above application solution Formulated compound (2.7 mL) was pipetted evenly over the soil surface followed by incorporation with water (15 mL). Following treatment, pots were returned to the greenhouse for the duration of the experiment. The greenhouse was programmed for an approximate 15 h photoperiod which was maintained at about 23-29° C. during the day and 22-28° C. during the night. Nutrients and water were added on a regular basis through surface irrigation and supplemental lighting was provided with overhead metal halide 1000-Watt lamps as necessary.

Herbicidal effect ratings were obtained 14 days after treatment. All evaluations were made relative to appropriate controls on a scale of 0 to 100 where 0 represents no herbicidal effect and 100 represents plant death or lack of emergence from the soil and presented in Table A. Some of the compounds tested, application rates employed, plant species tested, and results are given in Table 4.

TABLE 4

Pre-Emergent Test I Herbicidal Activity on Key
Broadleaf and Grass Weed as well as Crop Species

| Compound # | Application Rate (kg ai/ha) | Visual Growth Reduction (%) 14 Days After Application | | | | | |
|---|---|---|---|---|---|---|---|
| | | AMARE | AVEFA | ECHSS | HELAN | IPOSS | SETFA |
| 4 | 4 | D | G | F | G | G | F |
| 17 | 3.8 | A | G | F | A | A | G |

AMARE: redroot pigwseed (*Amaranthus retroflexus*)
AVEFA: wild oats (*Avena fatua*)
ECHCG: barnyardgrass (*Echinochloa crus-galli*)
HELAN: sunflower (*Helianthus annuus*)
IPOHE: ivyleaf morningglory (*Ipomoea hederecea*)
SETFA: giant foxtail (*Setaria faberi*)
kg ai/ha: kilograms active ingredient per hectare Example C Evaluation of Postemergent Herbicidal Activity Post-Emergent Test II:

Seeds or nutlets of the desired test plant species were planted in Sun Gro Metro-Mix® 360 planting mixture, which typically has a pH of 6.0 to 6.8 and an organic matter content of about 30 percent, in plastic pots with a surface area of 64 square centimeters. When required to ensure good germination and healthy plants, a fungicide treatment and/or other chemical or physical treatment was applied. The plants were grown for 7-21 days in a greenhouse with an approximate 15 h photoperiod which was maintained at about 23-29° C. during the day and 22-28° C. during the night. Nutrients and water were added on a regular basis and supplemental lighting was provided with overhead metal halide 1000-Watt lamps as necessary. The plants were employed for testing when they reached the first or second true leaf stage.

A weighed amount, determined by the highest rate to be tested, of each test compound was placed in a 25 mL glass vial and was dissolved in 4 mL of a 97:3 v/v mixture of acetone and DMSO to obtain concentrated stock solutions. If the test compound did not dissolve readily, the mixture was warmed and/or sonicated. The concentrated stock solutions obtained were diluted with 20 mL of an aqueous mixture containing acetone, water, isopropyl alcohol, DMSO, Atplus 411F crop oil concentrate, and Triton® X-155 surfactant in a 48.5:39:10:1.5:1.0:0.02 v/v ratio to obtain spray solutions containing the highest application rates. Additional application rates were obtained by serial dilution of 12 mL of the high rate solution into a solution containing 2 mL of 97:3 v/v mixture of acetone and DMSO and 10 mL of an aqueous mixture containing acetone, water, isopropyl alcohol, DMSO, Atplus 411F crop oil concentrate, and Triton X-155 surfactant in a 48.5:39:10:1.5:1.0:0.02 v/v ratio to obtain ½×, ¼×, ⅛× and ¹⁄₁₆× rates of the high rate. Compound requirements are based upon a 12 mL application volume at a rate of 187 liters per hectare (L/ha). Formulated compounds were applied to the plant material with an overhead Mandel track sprayer equipped with 8002E nozzles calibrated to deliver 187 L/ha over an application area of 0.503 square meters at a spray height of 18 inches (43 cm) above the average plant canopy height. Control plants were sprayed in the same manner with the solvent blank.

The treated plants and control plants were placed in a greenhouse as described above and watered by subirrigation to prevent wash-off of the test compounds. After 14 days, the condition of the test plants as compared with that of the untreated plants was determined visually and scored on a scale of 0 to 100 percent where 0 corresponds to no injury and 100 corresponds to complete kill and presented as indicated in Table A. Some of the compounds tested, application rates employed, plant species tested, and results are given in Table 5.

TABLE 5

Post-Emergent Test II Herbicidal Activity on Key Broadleaf Weed and Crop Species

| Compound # | Application Rate (kg ai/ha) | Visual Growth Reduction (%) 14 Days After Application | | | | | | |
|---|---|---|---|---|---|---|---|---|
| | | ABUTH | AMARE | BRSSS | CHEAL | EPHHL | HELAN | VIOTR |
| 60 | 70 | A | A | D | A | D | B | F |
| 60 | 140 | A | A | C | A | D | B | F |
| 15 | 70 | C | A | D | B | G | B | F |
| 15 | 140 | B | A | C | B | G | A | F |
| 1 | 70 | F | A | B | B | G | C | G |
| 1 | 140 | C | A | A | A | G | B | F |
| 82 | 70 | G | G | G | F | G | G | G |
| 82 | 140 | G | F | G | E | G | G | G |
| 4 | 70 | C | B | F | C | C | D | G |
| 4 | 140 | C | A | D | B | B | C | G |
| 94 | 70 | G | n/t | G | D | G | F | G |
| 94 | 140 | F | n/t | G | C | G | F | G |
| 17 | 70 | A | A | G | A | G | D | D |
| 17 | 140 | A | A | F | A | E | C | D |
| 47 | 70 | G | G | G | G | G | G | G |
| 47 | 140 | G | G | G | E | G | G | G |
| 74 | 70 | B | n/t | F | C | G | E | G |
| 74 | 140 | A | n/t | E | B | G | D | G |
| 59 | 70 | B | B | D | A | A | A | D |
| 59 | 140 | A | A | D | A | A | A | C |
| 46 | 70 | B | A | A | A | A | A | B |
| 46 | 140 | A | A | A | A | A | A | A |
| 43 | 70 | G | F | F | G | F | G | G |
| 43 | 140 | G | D | E | G | D | F | G |
| 5 | 70 | G | C | B | G | B | D | G |
| 5 | 140 | G | B | B | E | A | C | F |
| 52 | 70 | A | A | A | A | C | A | B |
| 52 | 140 | A | A | A | A | B | A | B |
| 73 | 70 | A | A | A | A | C | A | B |
| 73 | 140 | A | A | A | A | C | A | A |
| 67 | 70 | B | A | A | A | G | A | G |
| 67 | 140 | B | A | A | A | G | A | G |
| 68 | 70 | A | A | B | A | G | A | F |
| 68 | 140 | A | A | A | A | G | A | F |
| 34 | 70 | n/t | n/t | n/t | n/t | n/t | n/t | n/t |
| 34 | 140 | n/t | n/t | n/t | n/t | n/t | n/t | n/t |
| 27 | 70 | B | A | B | A | A | A | D |
| 27 | 140 | A | A | B | A | A | A | D |
| 76 | 70 | B | A | B | A | A | B | G |
| 76 | 140 | B | A | A | A | n/t | A | G |
| 90 | 70 | B | A | D | A | B | A | G |
| 90 | 140 | A | A | C | A | A | A | E |
| 62 | 70 | A | A | D | A | A | A | G |
| 62 | 140 | A | A | D | A | A | A | G |
| 49 | 70 | A | A | C | A | A | A | F |
| 49 | 140 | A | A | C | A | A | A | E |
| 85 | 70 | G | A | D | G | G | F | G |
| 85 | 140 | G | A | C | E | G | E | G |

TABLE 5-continued

Post-Emergent Test II Herbicidal Activity on Key Broadleaf Weed and Crop Species

| Compound # | Application Rate (kg ai/ha) | Visual Growth Reduction (%) 14 Days After Application | | | | | | |
|---|---|---|---|---|---|---|---|---|
| | | ABUTH | AMARE | BRSSS | CHEAL | EPHHL | HELAN | VIOTR |
| 30 | 70 | A | A | A | A | A | A | G |
| 30 | 140 | A | A | A | A | A | A | G |
| 36 | 70 | B | A | B | A | A | A | G |
| 36 | 140 | A | A | A | A | A | A | G |
| 24 | 70 | C | C | D | A | B | A | G |
| 24 | 140 | C | A | C | A | B | A | G |
| 63 | 70 | G | B | F | B | G | C | G |
| 63 | 140 | G | B | E | B | G | C | G |
| 35 | 70 | G | G | G | G | G | G | G |
| 35 | 140 | G | G | G | G | G | G | G |
| 26 | 140 | G | G | G | G | G | E | G |
| 18 | 54.5 | D | C | G | B | G | C | G |
| 18 | 109 | D | A | G | B | G | C | G |
| 20 | 70 | A | A | A | A | G | B | A |
| 20 | 140 | A | A | A | A | G | A | A |
| 2 | 70 | G | G | F | G | G | D | G |
| 2 | 140 | G | G | E | G | G | D | G |
| 88 | 70 | C | B | B | A | G | C | G |
| 88 | 140 | A | n/t | B | A | G | B | G |
| 45 | 70 | B | A | G | A | F | A | C |
| 45 | 140 | A | A | F | A | E | A | A |
| 23 | 70 | C | A | E | A | C | B | F |
| 23 | 140 | B | A | C | A | B | B | E |
| 69 | 70 | A | A | B | A | G | B | G |
| 69 | 140 | A | A | A | A | G | B | G |
| 77 | 70 | A | A | A | A | G | E | G |
| 77 | 140 | A | A | A | A | G | D | G |
| 64 | 70 | G | D | G | A | G | E | G |
| 64 | 140 | G | C | G | A | G | B | G |
| 58 | 70 | B | B | F | A | G | G | G |
| 58 | 140 | B | A | D | A | G | C | G |
| 9 | 70 | B | G | G | B | A | G | G |
| 9 | 140 | B | G | G | A | n/t | B | G |
| 61 | 70 | B | G | E | B | A | B | G |
| 61 | 140 | B | G | D | B | A | B | G |
| 31 | 70 | B | A | F | A | G | B | G |
| 31 | 140 | B | A | E | A | G | B | G |
| 41 | 70 | C | G | G | E | G | A | G |
| 41 | 140 | D | G | G | B | E | A | G |
| 55 | 70 | E | G | F | D | G | B | G |
| 55 | 140 | E | G | E | B | E | A | G |
| 72 | 70 | A | A | B | A | B | C | A |
| 72 | 140 | A | A | A | A | B | B | A |
| 3 | 70 | D | A | G | D | G | C | G |
| 3 | 140 | D | A | G | C | G | C | G |
| 44 | 70 | E | G | E | B | G | B | G |
| 44 | 140 | C | A | D | B | G | B | G |
| 37 | 70 | C | D | G | B | G | G | G |
| 37 | 140 | C | C | F | B | G | D | G |
| 32 | 70 | E | G | D | B | G | A | E |
| 32 | 140 | B | G | C | B | G | A | C |
| 50 | 70 | G | G | G | C | G | B | G |
| 50 | 140 | G | A | F | B | G | B | G |
| 28 | 70 | A | A | D | A | G | B | G |
| 28 | 140 | A | A | C | A | G | B | G |
| 87 | 70 | A | A | B | A | G | B | G |
| 87 | 140 | A | A | B | A | G | A | G |
| 65 | 70 | G | B | G | G | G | E | G |
| 65 | 140 | G | B | G | G | G | E | G |
| 83 | 70 | D | G | E | D | G | B | G |
| 83 | 140 | D | G | E | C | F | B | G |
| 33 | 70 | G | D | G | B | C | B | G |
| 33 | 140 | G | A | F | B | C | A | G |
| 51 | 70 | G | G | D | G | G | B | G |
| 51 | 140 | G | G | B | B | G | B | G |
| 25 | 70 | A | A | D | B | G | D | G |
| 25 | 140 | A | A | C | B | G | C | G |
| 40 | 70 | B | A | B | B | A | C | E |
| 40 | 140 | A | A | B | B | A | C | E |
| 93 | 70 | B | A | A | B | A | D | D |

TABLE 5-continued

Post-Emergent Test II Herbicidal Activity on Key Broadleaf Weed and Crop Species

| Compound # | Application Rate (kg ai/ha) | Visual Growth Reduction (%) 14 Days After Application | | | | | | |
|---|---|---|---|---|---|---|---|---|
| | | ABUTH | AMARE | BRSSS | CHEAL | EPHHL | HELAN | VIOTR |
| 93 | 140 | B | A | A | A | A | C | G |
| 12 | 70 | B | A | C | B | C | B | G |
| 12 | 140 | B | A | C | B | C | B | G |
| 48 | 70 | B | A | G | A | G | B | E |
| 48 | 140 | B | A | E | A | G | B | D |
| 57 | 70 | B | A | C | B | G | B | G |
| 57 | 140 | B | A | C | B | G | B | G |
| 10 | 70 | G | A | A | C | D | G | G |
| 10 | 140 | G | A | A | C | C | G | G |
| 7 | | n/t | n/t | n/t | n/t | n/t | n/t | n/t |
| 82 | 70 | D | D | D | B | G | D | G |
| 82 | 140 | D | B | D | B | G | C | G |
| 38 | 70 | A | A | A | B | F | C | C |
| 38 | 140 | A | A | A | A | E | A | B |
| 86 | 70 | E | B | C | B | G | C | G |
| 86 | 140 | G | B | B | B | G | C | G |
| 92 | 70 | A | A | A | A | G | A | D |
| 92 | 140 | A | A | A | A | F | A | C |
| 54 | 70 | B | B | B | A | C | B | C |
| 54 | 140 | B | B | A | A | B | A | B |
| 22 | 70 | A | A | A | A | A | B | A |
| 22 | 140 | A | A | A | A | A | A | A |
| 8 | 70 | B | A | A | A | C | A | A |
| 8 | 140 | A | A | A | A | A | A | A |
| 81 | 70 | B | A | B | A | A | C | A |
| 81 | 140 | B | A | B | A | A | B | A |
| 70 | 70 | B | A | A | A | G | A | G |
| 70 | 140 | D | A | A | A | G | A | G |
| 39 | 70 | A | A | A | G | E | A | A |
| 39 | 140 | A | A | A | G | E | A | A |
| 84 | 70 | A | A | A | A | G | B | A |
| 84 | 140 | A | A | A | A | G | B | A |
| 71 | 70 | B | G | F | B | A | B | G |
| 71 | 140 | B | G | E | B | A | B | G |
| 66 | 70 | C | G | G | B | A | B | D |
| 66 | 140 | B | G | G | A | A | B | D |
| 78 | 70 | A | A | A | A | G | B | G |
| 78 | 140 | A | A | A | A | G | B | G |
| 80 | 70 | C | A | A | A | G | B | G |
| 80 | 140 | C | A | A | A | G | B | G |
| 29 | 70 | G | G | G | B | G | G | G |
| 29 | 140 | G | G | G | B | G | G | G |
| 91 | 70 | G | G | G | G | G | G | G |
| 91 | 140 | G | G | G | G | G | G | G |
| 11 | 70 | G | G | G | G | G | G | G |
| 11 | 140 | G | G | G | C | G | G | G |
| 56 | 70 | G | G | G | E | G | G | G |
| 56 | 140 | G | G | G | C | G | G | G |
| 75 | 70 | G | G | G | C | G | G | G |
| 75 | 140 | G | G | G | C | G | G | G |
| 79 | 70 | A | A | A | A | G | B | G |
| 79 | 140 | G | A | A | A | G | B | G |
| 89 | 70 | B | A | A | A | F | A | E |
| 89 | 140 | A | A | A | A | E | A | D |
| 53 | 70 | B | A | E | A | G | D | G |
| 53 | 140 | G | A | E | A | G | C | G |
| 13 | 70 | C | A | B | A | G | B | G |
| 13 | 140 | G | A | B | A | G | B | G |
| 19 | 70 | A | A | A | B | B | A | B |
| 19 | 140 | A | A | A | A | A | A | A |
| 16 | 70 | B | A | A | A | B | A | A |
| 16 | 140 | A | A | A | A | A | A | A |
| 42 | 70 | A | A | A | A | F | B | D |
| 42 | 140 | A | A | A | A | D | B | D |
| 14 | | n/t | n/t | n/t | n/t | n/t | n/t | n/t |
| 6 | | n/t | n/t | n/t | n/t | n/t | n/t | n/t |
| 101 | 70 | 85 | 100 | 70 | 100 | 98 | 80 | 75 |
| 101 | 140 | 85 | 100 | 80 | 98 | 100 | 85 | 80 |

TABLE 5-continued

Post-Emergent Test II Herbicidal Activity on Key Broadleaf Weed and Crop Species

| Compound # | Application Rate (kg ai/ha) | Visual Growth Reduction (%) 14 Days After Application | | | | | | |
|---|---|---|---|---|---|---|---|---|
| | | ABUTH | AMARE | BRSSS | CHEAL | EPHHL | HELAN | VIOTR |
| 102 | 70 | 15 | 85 | 20 | 80 | 85 | 65 | 35 |
| 102 | 140 | 15 | 100 | 35 | 75 | 100 | 75 | 80 |

ABUTH: velvetleaf (*Abutilon theophrasti*)
AMARE: redroot pigweed (*Amaranthus retroflexus*)
BRSSS: oilseed rape, canola including winter and spring(*Brassica napus*)
CHEAL: lambsquarters (*Chenopodium album*)
EPHHL: wild poinsettia (*Euphorbia heterophylla*)
HELAN: sunflower (*Helianthus annuus*)
VIOTR: wild pansy (*Viola tricolor*)
n/t: not tested
g ai/ha: grams active ingredient per hectare

TABLE 6

Post-Emergent Test II Herbicidal Activity on Key Grass and Sedge Weeds as well as Grass Crops

| Compound # | Application Rate (g ai/ha) | Visual Growth Reduction (%) 14 Days After Application | | | | | | | |
|---|---|---|---|---|---|---|---|---|---|
| | | CYPSS | DIGSA | ECHSS | SETFA | SORVU | ORYSS | TRZSS | ZEAMX |
| 60 | 70 | F | G | G | G | G | G | G | G |
| 60 | 140 | F | F | F | G | E | G | G | G |
| 15 | 70 | G | G | G | G | G | G | G | G |
| 15 | 140 | G | G | G | G | G | G | G | G |
| 1 | 70 | G | G | G | G | G | G | G | G |
| 1 | 140 | G | G | G | G | G | G | G | G |
| 82 | 70 | G | G | G | G | G | G | G | G |
| 82 | 140 | G | G | G | G | G | G | G | G |
| 4 | 70 | D | G | F | G | E | G | G | G |
| 4 | 140 | D | G | C | G | D | G | G | G |
| 94 | 70 | G | G | G | G | G | G | G | G |
| 94 | 140 | G | G | G | G | G | G | G | G |
| 17 | 70 | D | G | D | G | G | G | G | G |
| 17 | 140 | C | G | B | G | F | G | G | F |
| 47 | 70 | G | G | G | G | G | G | G | G |
| 47 | 140 | G | G | G | G | G | G | G | G |
| 74 | 70 | G | G | G | G | G | G | G | G |
| 74 | 140 | G | G | E | G | E | G | G | F |
| 59 | 70 | A | C | B | D | C | G | E | C |
| 59 | 140 | A | B | B | C | B | G | E | C |
| 46 | 70 | A | A | A | A | B | C | C | B |
| 46 | 140 | A | A | A | A | B | A | B | B |
| 43 | 70 | G | F | G | G | G | G | G | G |
| 43 | 140 | D | D | G | G | G | G | G | G |
| 5 | 70 | G | D | B | G | G | G | G | G |
| 5 | 140 | G | C | B | F | G | G | F | G |
| 52 | 70 | B | G | F | G | G | G | E | E |
| 52 | 140 | A | F | E | E | F | G | D | D |
| 73 | 70 | A | G | F | F | E | G | E | D |
| 73 | 140 | A | G | E | E | D | G | D | C |
| 67 | 70 | G | G | G | G | G | G | G | G |
| 67 | 140 | G | G | G | G | G | G | G | G |
| 68 | 70 | G | G | G | G | G | G | G | G |
| 68 | 140 | G | G | G | G | G | G | G | G |
| 34 | 70 | n/t | n/t | n/t | n/t | n/t | n/t | n/t | n/t |
| 34 | 140 | n/t | n/t | n/t | n/t | n/t | n/t | n/t | n/t |
| 27 | 70 | A | C | B | C | C | G | E | D |
| 27 | 140 | A | B | B | B | B | G | D | C |
| 76 | 70 | G | C | C | E | E | G | F | G |
| 76 | 140 | G | B | B | D | E | G | E | A |
| 90 | 70 | G | G | C | E | E | G | F | A |
| 90 | 140 | G | E | C | D | E | G | F | A |
| 62 | 70 | G | C | A | D | D | G | E | A |
| 62 | 140 | F | D | A | B | C | G | E | A |
| 49 | 70 | A | C | A | B | B | F | E | A |
| 49 | 140 | A | C | A | B | B | F | E | A |

TABLE 6-continued

Post-Emergent Test II Herbicidal Activity on Key
Grass and Sedge Weeds as well as Grass Crops

| Compound # | Application Rate (g ai/ha) | CYPSS | DIGSA | ECHSS | SETFA | SORVU | ORYSS | TRZSS | ZEAMX |
|---|---|---|---|---|---|---|---|---|---|
| 85 | 70 | G | G | E | G | G | G | G | G |
| 85 | 140 | G | G | n/t | G | G | G | G | G |
| 30 | 70 | G | D | A | C | E | F | G | A |
| 30 | 140 | G | D | A | B | B | E | G | A |
| 36 | 70 | A | D | B | A | D | G | F | A |
| 36 | 140 | A | C | B | A | D | G | E | A |
| 24 | 70 | E | G | E | C | F | G | G | G |
| 24 | 140 | A | C | D | C | E | G | G | A |
| 63 | 70 | G | G | G | G | G | G | G | G |
| 63 | 140 | G | G | G | G | G | G | G | G |
| 35 | 70 | G | G | G | G | G | G | G | G |
| 35 | 140 | G | G | G | G | G | G | G | G |
| 26 | 140 | G | G | G | G | G | G | G | G |
| 18 | 54.5 | A | G | G | G | G | G | G | G |
| 18 | 109 | n/t | G | G | G | G | G | G | G |
| 20 | 70 | F | G | D | F | G | G | G | B |
| 20 | 140 | E | E | C | D | F | G | F | B |
| 2 | 70 | G | G | G | G | G | G | G | G |
| 2 | 140 | G | G | G | G | G | G | G | G |
| 88 | 70 | G | G | G | G | G | G | G | G |
| 88 | 140 | G | G | G | E | G | G | G | G |
| 45 | 70 | A | D | C | E | F | G | G | G |
| 45 | 140 | A | C | B | E | E | G | G | G |
| 23 | 70 | G | F | D | n/t | G | G | G | G |
| 23 | 140 | G | E | C | n/t | G | G | G | E |
| 69 | 70 | E | G | G | G | G | G | G | G |
| 69 | 140 | A | G | G | G | G | G | G | G |
| 77 | 70 | G | G | G | G | G | G | G | G |
| 77 | 140 | G | G | G | G | G | G | G | G |
| 64 | 70 | G | G | G | G | G | G | G | G |
| 64 | 140 | G | G | G | G | G | G | G | G |
| 58 | 70 | n/t | G | G | G | G | G | G | G |
| 58 | 140 | n/t | G | G | G | G | G | G | G |
| 9 | 70 | A | G | G | n/t | G | G | G | G |
| 9 | 140 | A | G | G | n/t | F | G | G | F |
| 61 | 70 | n/t | G | B | E | G | G | G | G |
| 61 | 140 | n/t | G | B | D | G | G | F | G |
| 31 | 70 | G | G | G | n/t | G | G | G | G |
| 31 | 140 | G | G | G | n/t | G | G | G | G |
| 41 | 70 | G | G | G | n/t | G | G | G | G |
| 41 | 140 | A | G | G | n/t | G | G | G | E |
| 55 | 70 | G | G | G | n/t | G | G | G | E |
| 55 | 140 | G | G | G | n/t | G | G | G | E |
| 72 | 70 | A | C | n/t | C | D | G | E | D |
| 72 | 140 | A | C | n/t | C | A | G | E | C |
| 3 | 70 | G | G | n/t | G | G | G | G | G |
| 3 | 140 | G | G | n/t | G | G | G | G | G |
| 44 | 70 | G | G | n/t | G | G | G | G | G |
| 44 | 140 | G | G | n/t | G | G | G | G | G |
| 37 | 70 | G | G | n/t | G | G | G | G | G |
| 37 | 140 | G | G | n/t | G | G | G | G | G |
| 32 | 70 | A | C | B | B | D | G | D | D |
| 32 | 140 | A | C | B | B | C | G | D | D |
| 50 | 70 | G | G | G | n/t | G | G | G | G |
| 50 | 140 | G | G | G | D | G | G | G | G |
| 28 | 70 | G | G | G | G | G | G | G | F |
| 28 | 140 | G | G | G | G | G | G | G | D |
| 87 | 70 | G | G | G | G | G | G | G | G |
| 87 | 140 | G | G | G | G | G | G | G | G |
| 65 | 70 | G | G | G | G | G | G | G | G |
| 65 | 140 | G | G | G | G | G | G | G | G |
| 83 | 70 | F | D | D | C | C | G | E | C |
| 83 | 140 | E | C | C | C | C | G | D | C |
| 33 | 70 | A | E | D | C | C | G | F | D |
| 33 | 140 | A | D | D | C | C | G | E | D |
| 51 | 70 | A | D | n/t | n/t | C | G | F | D |
| 51 | 140 | A | D | n/t | n/t | C | G | E | D |
| 25 | 70 | G | G | G | G | G | G | G | G |
| 25 | 140 | G | G | G | G | G | G | G | G |
| 40 | 70 | G | D | C | B | C | G | E | C |
| 40 | 140 | E | C | B | B | C | G | E | C |

TABLE 6-continued

Post-Emergent Test II Herbicidal Activity on Key
Grass and Sedge Weeds as well as Grass Crops

| Compound # | Application Rate (g ai/ha) | Visual Growth Reduction (%) 14 Days After Application | | | | | | | |
|---|---|---|---|---|---|---|---|---|---|
| | | CYPSS | DIGSA | ECHSS | SETFA | SORVU | ORYSS | TRZSS | ZEAMX |
| 93 | 70 | G | D | F | G | G | G | E | F |
| 93 | 140 | G | D | F | G | G | G | D | F |
| 12 | 70 | G | F | G | E | G | G | G | C |
| 12 | 140 | E | E | G | E | F | G | G | n/t |
| 48 | 70 | G | G | G | G | G | G | G | G |
| 48 | 140 | G | G | G | G | G | G | G | E |
| 57 | 70 | G | G | G | G | G | G | G | G |
| 57 | 140 | G | G | G | G | G | G | G | G |
| 10 | 70 | G | G | G | G | G | G | C | D |
| 10 | 140 | G | E | G | G | G | G | B | D |
| 7 | | n/t | n/t | n/t | n/t | n/t | n/t | n/t | n/t |
| 82 | 70 | G | G | G | G | G | G | G | G |
| 82 | 140 | G | G | G | G | G | G | G | G |
| 38 | 70 | G | G | G | G | G | G | E | G |
| 38 | 140 | G | G | G | G | G | G | D | G |
| 86 | 70 | G | G | G | G | G | G | G | G |
| 86 | 140 | G | G | G | G | G | G | G | G |
| 92 | 70 | G | G | G | G | G | G | F | G |
| 92 | 140 | G | G | G | G | G | G | D | G |
| 54 | 70 | C | D | C | D | E | G | D | E |
| 54 | 140 | B | C | B | D | D | G | C | D |
| 22 | 70 | A | B | B | B | A | F | B | B |
| 22 | 140 | A | B | A | B | A | G | A | A |
| 8 | 70 | A | B | B | B | B | D | B | B |
| 8 | 140 | A | A | A | B | A | C | A | A |
| 81 | 70 | A | C | B | C | E | E | D | F |
| 81 | 140 | A | C | B | B | E | D | D | E |
| 70 | 70 | G | G | G | G | G | G | G | G |
| 70 | 140 | G | G | G | G | G | G | G | G |
| 39 | 70 | E | G | G | G | G | G | F | G |
| 39 | 140 | A | G | G | C | G | G | F | D |
| 84 | 70 | G | G | G | G | G | G | G | G |
| 84 | 140 | G | G | G | G | G | G | G | G |
| 71 | 70 | G | C | D | C | D | G | E | G |
| 71 | 140 | E | D | C | B | C | G | E | D |
| 66 | 70 | E | D | C | D | F | G | E | D |
| 66 | 140 | E | D | C | D | C | G | D | D |
| 78 | 70 | E | G | G | G | G | G | G | G |
| 78 | 140 | E | G | G | G | G | G | G | G |
| 80 | 70 | G | G | G | G | G | G | G | G |
| 80 | 140 | G | G | G | G | G | G | G | G |
| 29 | 70 | G | G | G | G | G | G | G | G |
| 29 | 140 | G | G | G | G | G | G | G | G |
| 91 | 70 | G | G | G | G | G | G | G | G |
| 91 | 140 | G | G | G | G | G | G | G | G |
| 11 | 70 | G | G | G | G | G | G | G | G |
| 11 | 140 | G | G | G | G | G | G | G | G |
| 56 | 70 | G | G | G | G | G | G | G | G |
| 56 | 140 | G | G | G | G | G | G | G | G |
| 75 | 70 | G | G | G | G | G | G | G | G |
| 75 | 140 | G | G | G | G | G | G | G | G |
| 79 | 70 | A | G | G | G | G | G | G | G |
| 79 | 140 | A | G | G | G | F | G | G | G |
| 89 | 70 | G | F | C | G | G | G | G | G |
| 89 | 140 | G | C | B | G | G | G | G | G |
| 53 | 70 | G | G | G | G | G | G | G | G |
| 53 | 140 | G | G | G | G | G | G | G | G |
| 13 | 70 | G | G | G | G | G | G | G | G |
| 13 | 140 | G | G | G | G | G | G | G | G |
| 19 | 70 | A | E | C | C | B | F | C | B |
| 19 | 140 | A | C | A | B | B | E | C | A |
| 16 | 70 | A | C | B | A | C | F | B | B |
| 16 | 140 | B | B | A | A | B | E | B | B |
| 42 | 70 | A | G | G | G | G | G | F | G |
| 42 | 140 | A | G | G | G | F | G | E | G |
| 14 | | n/t | n/t | n/t | n/t | n/t | n/t | n/t | n/t |
| 6 | | n/t | n/t | n/t | n/t | n/t | n/t | n/t | n/t |
| 101 | 70 | 80 | 0 | 80 | 20 | 45 | 40 | 10 | 0 |
| 101 | 140 | 80 | 10 | 60 | 40 | 75 | 95 | 40 | 25 |

TABLE 6-continued

Post-Emergent Test II Herbicidal Activity on Key
Grass and Sedge Weeds as well as Grass Crops

| Compound # | Application Rate (g ai/ha) | Visual Growth Reduction (%) 14 Days After Application ||||||| |
|---|---|---|---|---|---|---|---|---|---|
| | | CYPSS | DIGSA | ECHSS | SETFA | SORVU | ORYSS | TRZSS | ZEAMX |
| 102 | 70  | 10 | 0 | 30 | 0 | 0 | 0 | 0  | 0 |
| 102 | 140 | 35 | 0 | 70 | 0 | 0 | 0 | 10 | 0 |

ECHCG: barnyardgrass (*Echinochloa crus-galli*)
CYPES: yellow nutsedge (*Cyperus esculentus*)
DIGSA: crabgrass (*Digitaria sanguinalis*)
ORYSA: rice (*Oryza sativa*)
SETFA: giant foxtail (*Setaria faberi*)
SORVU: johnsongrass (*Sorghum vulgare*)
TRZAS: wheat, spring (*Triticum aestivum*)
ZEAMX: maize, corn (*Zea mays*)
g ai/ha: grams active ingredient per hectare
n/t: not tested Example D Evaluation of Postemergent Herbicidal Activity in Wheat and Barley Post-Emergent Test III.

Seeds of the desired test plant species were planted in Sun Gro MetroMix® 306 planting mixture, which typically has a pH of 6.0 to 6.8 and an organic matter content of about 30 percent, in plastic pots with a surface area of 103.2 square centimeters (cm²). When required to ensure good germination and healthy plants, a fungicide treatment and/or other chemical or physical treatment was applied. The plants were grown for 7-36 days in a greenhouse with an approximate 14 h photoperiod which was maintained at about 18° C. during the day and 17° C. during the night. Nutrients and water were added on a regular basis and supplemental lighting was provided with overhead metal halide 1000-Watt lamps as necessary. The plants were employed for testing when they reached the second or third true leaf stage.

A weighed amount, determined by the highest rate to be tested, of each test compound was placed in a 25 mL glass vial and was dissolved in 4 mL of a 97:3 v/v mixture of acetone and DMSO to obtain concentrated stock solutions. If the test compound did not dissolve readily, the mixture was warmed and/or sonicated. The concentrated stock solutions obtained were diluted with 20 mL of an aqueous mixture containing acetone, water, isopropyl alcohol, DMSO, Agri-Dex crop oil concentrate, and X-77 surfactant in a 48:39:10:1.5:1.5:0.02 v/v ratio to obtain spray solutions containing the highest application rates. Additional application rates were obtained by serial dilution of 12 mL of the high rate solution into a solution containing 2 mL of 97:3 v/v mixture of acetone and DMSO and 10 mL of an aqueous mixture containing acetone, water, isopropyl alcohol, DMSO, Agri-Dex crop oil concentrate, and X-77 surfactant in a 48:39:10:1.5:1.5:0.02 v/v ratio to obtain ½×, ¼×, ⅛× and ¹⁄₁₆× rates of the high rate. Compound requirements are based upon a 12 mL application volume at a rate of 187 liters per hectare (L/ha). Formulated compounds were applied to the plant material with an overhead Mandel track sprayer equipped with 8002E nozzles calibrated to deliver 187 L/ha over an application area of 0.503 square meters at a spray height of 18 inches (43 cm) above the average plant canopy height. Control plants were sprayed in the same manner with the solvent blank.

The treated plants and control plants were placed in a greenhouse as described above and watered by subirrigation to prevent wash-off of the test compounds. After 21 dAYS, the condition of the test plants as compared with that of the untreated plants was determined visually and scored on a scale of 0 to 100 percent where 0 corresponds to no injury and 100 corresponds to complete kill and presented as indicated in Table A.

By applying the well-accepted probit analysis as described by J. Berkson in *Journal of the American Statistical Society*, 48, 565 (1953) and by D. Finney in "*Probit Analysis*" Cambridge University Press (1952), herbicidal injury of a specific compound at various rates can be used to calculate $GR_{10}$, $GR_{20}$, $GR_{50}$, $GR_{80}$ and $GR_{90}$ values, which are defined as growth reduction factors that correspond to the effective dose of herbicide required to provide plant growth reduction (GR) of 10 percent, 20 percent, 50 percent, 80 percent and 90 percent, respectively. Probit analysis was applied to data collected from multiple dose rates of individual compounds utilizing the procedures explained in the following examples. The analysis of those dose rates is captured in the following tables.

Some of the compounds tested, application rates employed, plant species tested, and results are given in Tables 7 through 9.

TABLE 7

Activity of Herbicidal Compounds in Wheat and Barley

| Compound # | Application Rate (g ai/ha) | Visual Growth Reduction (%) 21 Days After Application | | | | | | |
|---|---|---|---|---|---|---|---|---|
| | | ALOMY | APESV | KCHSC | LOLSS | SETVI | HORSS | TRZSS |
| 59 | 35 | F | F | D | G | E | C | D |
| | 70 | D | C | C | F | B | C | C |
| | GR20 | — | — | — | — | — | 4 | 4 |
| | GR50 | 48 | 42 | 27 | >140 | 34 | — | — |
| | GR80 | 80 | 72 | 57 | >140 | 61 | — | — |
| 49 | 35 | G | B | A | A | F | C | C |
| | 70 | F | C | A | B | A | B | B |
| | 140 | E | B | B | B | A | B | B |
| | GR20 | — | — | — | — | — | 1 | 1 |
| | GR50 | >140 | 1 | 9 | 15 | 28 | — | — |
| | GR80 | >140 | 24 | 17 | 31 | 57 | — | — |
| 36 | 35 | G | E | E | E | F | D | D |
| | 70 | F | B | D | E | E | C | C |
| | GR20 | — | — | — | — | — | 1 | 1 |
| | GR50 | 126 | 24 | 34 | 44 | 59 | — | — |
| | GR80 | >140 | 53 | 108 | 131 | >140 | — | — |
| 20 | 35 | E | G | B | G | G | E | B |
| | 70 | C | D | A | G | D | C | B |
| | 140 | B | C | A | F | D | B | B |
| | GR20 | — | — | — | — | — | 7 | 2 |
| | GR50 | 86 | 117 | 2 | >140 | 80 | — | — |
| | GR80 | >140 | >140 | 10 | >140 | >140 | — | — |
| 83 | 35 | D | F | G | G | G | C | D |
| | 70 | C | F | F | D | D | B | C |
| | GR20 | — | — | — | — | — | 3 | 4 |
| | GR50 | 25 | 89 | 113 | 59 | 63 | — | — |
| | GR80 | 58 | >140 | >140 | 99 | 139 | — | — |
| 33 | 35 | D | G | G | G | E | C | C |
| | 70 | C | D | E | G | D | B | C |
| | 140 | B | D | D | F | D | B | B |
| | GR20 | — | — | — | — | — | 1 | 1 |
| | GR50 | 37 | 70 | 95 | >140 | 48 | — | — |
| | GR80 | 72 | 134 | >140 | >140 | >140 | — | — |
| 51 | 35 | G | G | G | G | C | D | D |
| | 70 | G | D | G | G | B | C | C |
| | GR20 | — | — | — | — | — | 1 | 1 |
| | GR50 | >140 | 63 | 0 | 0 | 26 | — | — |
| | GR80 | >140 | 139 | 0 | 0 | 47 | — | — |
| 39 | 35 | G | F | B | G | G | F | B |
| | 70 | F | D | A | G | G | D | A |
| | 140 | F | D | A | G | E | C | A |
| | GR20 | — | — | — | — | — | 23 | 11 |
| | GR50 | >140 | 75 | 6 | 0 | >140 | — | — |
| | GR80 | >140 | >140 | 21 | 0 | >140 | — | — |
| 71 | 35 | G | G | G | G | F | F | D |
| | 70 | G | G | D | G | E | D | C |
| | 140 | F | F | D | F | C | C | B |
| | GR20 | — | — | — | — | — | 26 | 16 |
| | GR50 | >140 | >140 | 80 | >140 | 72 | — | — |
| | GR80 | >140 | >140 | >140 | >140 | >140 | — | — |
| 66 | 35 | G | G | G | G | F | D | C |
| | 70 | G | G | E | G | D | D | B |
| | 140 | E | D | D | F | C | B | A |
| | GR20 | — | — | — | — | — | 15 | 8 |
| | GR50 | 140 | 130 | 80 | >140 | 49 | — | — |
| | GR80 | >140 | >140 | >140 | >140 | 112 | — | — |

TABLE 8

Activity of Herbicidal Compounds in Wheat and Barley

| Compound # | Application Rate (g ai/ha) | Visual Growth Reduction (%) 21 Days After Application | | | | | | | | | | | |
|---|---|---|---|---|---|---|---|---|---|---|---|---|---|
| | | APESV | BROTE | BRSSS | KCHSC | LAMPU | PAPRH | PHAMI | POLCO | SASKR | SINAR | VERPE | HORSS | TRZSS |
| 46 | 35 | D | E | D | D | D | A | B | E | E | B | A | D | C |
| | 70 | C | D | D | D | D | A | B | D | D | B | A | C | C |
| | 140 | B | B | C | B | A | A | B | D | D | A | A | B | B |
| | GR10 | — | — | — | — | — | — | — | — | — | — | — | 1 | 1 |
| | GR20 | — | — | — | — | — | — | — | — | — | — | — | 3 | 1 |
| | GR50 | 37 | 42 | 11 | 29 | 14 | 2 | 15 | 27 | 23 | 2 | 1 | — | — |
| | GR80 | 78 | 93 | >140 | 104 | 47 | 8 | 24 | >140 | >140 | 19 | 2 | — | — |
| | GR90 | 115 | 140 | >140 | >140 | 89 | 16 | 31 | >140 | >140 | 62 | 8 | — | — |
| 52 | 35 | D | G | B | A | A | D | C | D | D | A | G | D | D |
| | 70 | C | F | B | A | A | D | B | C | D | A | G | C | C |
| | 140 | B | D | B | A | A | C | B | A | C | A | E | B | C |
| | GR10 | — | — | — | — | — | — | — | — | — | — | — | 1 | 1 |
| | GR20 | — | — | — | — | — | — | — | — | — | — | — | 2 | 1 |
| | GR50 | 23 | 98 | 1 | 1 | <17.5 | 4 | 18 | 10 | 1 | 1 | >140 | — | — |
| | GR80 | 63 | >140 | 11 | 3 | <17.5 | >140 | 38 | 41 | >140 | 1 | >140 | — | — |
| | GR90 | 107 | >140 | 41 | 9 | <17.5 | >140 | 56 | 84 | >140 | 5 | >140 | — | — |
| 73 | 35 | E | E | C | B | A | D | D | A | C | A | G | D | D |
| | 70 | D | D | B | A | A | D | D | A | C | A | G | D | D |
| | 140 | B | D | A | A | A | A | C | A | C | A | F | C | C |
| | GR10 | — | — | — | — | — | — | — | — | — | — | — | 2 | 3 |
| | GR20 | — | — | — | — | — | — | — | — | — | — | — | 5 | 6 |
| | GR50 | 32 | 59 | 5 | 8 | <17.5 | 15 | 40 | 7 | 1 | 1 | >140 | — | — |
| | GR80 | 90 | >140 | 29 | 21 | <17.5 | 48 | 107 | 10 | 84 | 1 | >140 | — | — |
| | GR90 | >140 | >140 | 73 | 35 | <17.5 | 90 | >140 | 12 | >140 | 3 | >140 | — | — |

TABLE 9

Activity of Herbicidal Compounds in Wheat and Barley

| Compound # | Application Rate (g ai/ha) | Visual Growth Reduction (%) 21 Days After Application | | | | | | | | | | | |
|---|---|---|---|---|---|---|---|---|---|---|---|---|---|
| | | BRSSS | CHEAL | GALAP | KCHSC | LAMPU | PAPRH | POLCO | SASKR | STEME | VERPE | VIOTR | HORSS | TRZSS |
| 28 | 17.5 | B | C | F | C | A | G | A | C | D | G | G | G | G |
| | 35 | B | C | E | C | A | G | A | B | C | F | G | F | F |
| | 70 | A | B | D | A | A | G | A | A | B | E | G | F | E |
| | GR10 | — | — | — | — | — | — | — | — | — | — | — | 3 | 16 |
| | GR20 | — | — | — | — | — | — | — | — | — | — | — | 13 | 25 |
| | GR50 | 1 | 1 | 29 | 3 | 1 | >140 | 1 | 2 | 11 | 63 | >140 | — | — |
| | GR80 | 5 | 30 | 120 | 21 | 1 | >140 | 1 | 17 | 31 | 111 | >140 | — | — |
| | GR90 | 18 | >140 | >140 | 54 | 1 | >140 | 4 | 47 | 53 | >140 | >140 | — | — |
| 93 | 17.5 | A | C | D | B | A | C | B | B | E | E | E | C | C |
| | 35 | A | B | C | B | A | C | B | B | D | D | E | B | B |
| | 70 | A | B | C | A | A | B | A | B | D | D | E | B | B |
| | GR10 | — | — | — | — | — | — | — | — | — | — | — | 1 | 1 |
| | GR20 | — | — | — | — | — | — | — | — | — | — | — | 1 | 1 |
| | GR50 | 0 | 1 | 1 | 2 | 1 | 1 | 2 | 1 | 11 | 24 | 41 | — | — |
| | GR80 | 3 | 16 | 88 | 10 | 2 | 27 | 7 | 10 | >140 | >140 | >140 | — | — |
| | GR90 | 11 | 80 | >140 | 27 | 8 | >140 | 13 | 34 | >140 | >140 | >140 | — | — |
| 22 | 17.5 | D | A | D | A | A | A | E | C | F | D | A | B | C |
| | 35 | B | A | B | A | A | A | E | C | E | C | A | B | B |
| | 70 | B | A | A | A | A | A | D | B | D | A | A | A | B |
| | GR10 | — | — | — | — | — | — | — | — | — | — | — | 1 | 1 |
| | GR20 | — | — | — | — | — | — | — | — | — | — | — | 1 | 1 |
| | GR50 | 4 | 2 | 11 | 3 | 1 | 1 | 26 | 5 | 28 | 9 | 4 | — | — |

TABLE 9-continued

Activity of Herbicidal Compounds in Wheat and Barley

| Com- pound # | Appli- cation Rate (g ai/ha) | Visual Growth Reduction (%) 21 Days After Application | | | | | | | | | | | | |
|---|---|---|---|---|---|---|---|---|---|---|---|---|---|---|
| | | BRSSS | CHEAL | GALAP | KCHSC | LAMPU | PAPRH | POLCO | SASKR | STEME | VERPE | VIOTR | HORSS | TRZSS |
| | GR80 | 20 | 6 | 24 | 8 | 6 | 1 | >140 | 36 | >140 | 28 | 7 | — | — |
| | GR90 | 46 | 11 | 36 | 14 | 11 | 1 | >140 | 95 | >140 | 50 | 9 | — | — |

ALOMY: black-grass (*Alopecurus myosuroides*)
APESV: bentgrass (*Apera spica-venti*)
BRSSS: oil seed rape, canola including winter and spring (*Brassica napus*)
BROTE: downy brome (*Bromus tectorum*)
CHEAL: lambsquarters (*Chenopodium album*)
HORSS: barley, including spring and winter (*Hordeum vulgare*)
TRZSS: wheat, including spring and winter (*Triticum aestivum*)
LOLSS: ryegrass including, Italian ryegrass (*Lolium multiflonmi*), rigid ryegrass (*Lolium rigidum*), annual ryegrass (*Lolium multiflorum* subsp. *Gaudini*)
PHAMI: lesser canary grass (*Phalaris minor*)
POLCO: wild buckwheat (*Polygonum convolvulus*)
SETVI: green foxtail (*Setaria viridis*)
KCHSC: kochia (*Kochia scoparia*)
LAMPU: purple deadnettle (*Lamium purpureum*)
GALAP: cleavers (*Galium aparine*)
SINAR: wild mustard (*Sinapis arvensis*)
VERPE: bird's-eye speedwell (*Veronica persica*)
PAPRH: common poppy (*Papaver rhoeas*)
SASKR: Russian thistle (*Salsola iberica*)
VIOTR: wild pansy (*Viola tricolor*)
STEME: common chickweed (*Stellaria media*).
g ai/ha: grams active ingredient per hectare
n/t: not tested
GR10: Growth reduction of 10% of plant growth
GR20: Growth reduction of 20% of plant growth
GR50: Growth reduction of 50% of plant growth
GR80: Growth reduction of 80% of plant growth
GR90: Growth reduction of 90% of plant growth Example E Evaluation of Postemergence Herbicidal Activity in Direct Seeded Rice Seeds or nutlets of the desired test plant species were planted in a soil matrix prepared by mixing a loam soil (43 percent silt, 19 percent clay, and 38 percent sand, with a pH of about 8.1 and an organic matter content of about 1.5 percent) and river sand in an 80 to 20 ratio. The soil matrix was contained in plastic pots with a surface area of 139.7 cm$^2$. When required to ensure good germination and healthy plants, a fungicide treatment and/or other chemical or physical treatment was applied. The plants were grown for 10-17 days in a greenhouse with an approximate 14-h photoperiod which was maintained at about 29° C. during the day and 26° C. during the night. Nutrients and water were added on a regular basis and supplemental lighting was provided with overhead metal halide 1000-Watt lamps as necessary. The plants were employed for testing when they reached the second or third true leaf stage.

A weighed amount, determined by the highest rate to be tested, of each test compound was placed in 25 mL glass vials and dissolved in a volume of 97:3 v/v acetone-DMSO to obtain 12× stock solutions. If the test compound did not dissolve readily, the mixture was warmed and/or sonicated. The concentrated stock solutions were added to the spray solutions so that the final acetone and DMSO concentrations were 16.2% and 0.5%, respectively. Spray solutions were diluted to the appropriate final concentrations with the addition of 10 mL of an aqueous mixture of 1.5% (v/v) Agri-dex crop oil concentrate. The final spray solutions contained 1.25% (v/v) Agri-dex crop oil concentrate. Compound requirements are based upon a 12 mL application volume at a rate of 187 L/ha. Formulated compounds were applied to the plant material with an overhead Mandel track sprayer equipped with 8002E nozzles calibrated to deliver 187 L/ha over an application area of 0.503 square meters (m$^2$) at a spray height of 18 inches (43 cm) above average plant canopy height. Control plants were sprayed in the same manner with the solvent blank.

The treated plants and control plants were placed in a greenhouse as described above and watered by sub-irrigation to prevent wash-off of the test compounds. After 20-22 days, the condition of the test plants, compared with that of the untreated plants, was determined visually and scored on a scale of 0 to 100 percent where 0 corresponds to no injury and 100 corresponds to complete kill and presented as indicated in Table A.

By applying the well-accepted probit analysis as described by J. Berkson in *Journal of the American Statistical Society*, 48, 565 (1953) and by D. Finney in "*Probit Analysis*" Cambridge University Press (1952), herbicidal injury of a specific compound at various rates can be used to calculate GR$_{20}$, GR$_{50}$, GR$_{80}$ and GR$_{90}$ values, which are defined as growth reduction factors that correspond to the effective dose of herbicide required to provide plant growth reduction (GR) of 20 percent, 50 percent, 80 percent and 90 percent, respectively. Probit analysis was applied to data collected from multiple dose rates of individual compounds utilizing the procedures explained in the following examples. The analysis of those dose rates is captured in the following tables Some of the application rates and ratios employed, plant species tested, and results are given in Table 10.

TABLE 10

Activity of Herbicidal Compounds in Direct Seeded Rice

| Compound # | Application Rate (g ai/ha) | Visual Growth Reduction (%) 21 Days After Application | | | | | | |
|---|---|---|---|---|---|---|---|---|
| | | BRAPP | CYPSS | ECHSS | LEFSS | SCPJU | SEBEX | ORYSS |
| 59 | 35 | B | A | B | D | A | A | E |
| | 70 | B | A | B | B | A | A | E |
| | GR20 | — | — | — | — | — | — | 18 |
| | GR50 | 3 | 2 | 3 | 27 | <17.5 | 1 | — |
| | GR80 | 16 | 3 | 15 | 48 | <17.5 | 1 | — |
| 45 | 35 | G | B | F | G | n/t | A | G |
| | 70 | G | A | B | D | n/t | A | G |
| | GR20 | — | — | — | — | — | — | >140 |
| | GR50 | >140 | 3 | 16 | >140 | 1 | 1 | — |
| | GR80 | >140 | 7 | >140 | >140 | 1 | 2 | — |
| 32 | 35 | B | A | B | F | A | A | G |
| | 70 | B | A | A | E | A | A | F |
| | GR20 | — | — | — | — | — | — | 36 |
| | GR50 | 14 | 1 | 21 | 59 | <17.5 | 3 | — |
| | GR80 | 35 | 2 | 35 | 133 | <17.5 | 9 | — |
| 83 | 35 | A | A | A | B | A | A | E |
| | 70 | A | A | A | D | A | A | F |
| | GR20 | — | — | — | — | — | — | 23 |
| | GR50 | 6 | 2 | 3 | 27 | <17.5 | 2 | — |
| | GR80 | 16 | 3 | 9 | 53 | <17.5 | 5 | — |
| 33 | 35 | A | A | C | E | A | A | D |
| | 70 | A | A | A | C | A | A | C |
| | GR20 | — | — | — | — | — | — | 8 |
| | GR50 | 3 | 4 | 1 | 30 | <17.5 | 1 | — |
| | GR80 | 11 | 7 | 1 | 77 | <17.5 | 1 | — |

BRAPP: broadleaf signalgrass, *Brachiaria platyphylla*
CYPSS: sedge including small-flower flatsedge (*Cyperus difformis*), yellow nutsedge (*Cyperus esculentus*), rice flatsedge (*Cyperus iria*)
ECHSS: including barnyardgrass, (*Echinochloa crus-galli*), junglerice, (*Echinochloa colonum*)
LEFSS: sprangletop including Chinese sprangletop (*Leptochloa chinensis*), green sprangletop (*Leptochloa dubia*)
SCPJU: Japanese bulrush, *Schoenoplectus juncoides*
SEBEX: hemp sesbania, *Sesbania exaltata*
ORYSS: *Oryza sativa*
g ai/ha: gram active ingredient per hectare
n/t: not tested
GR20: Growth reduction of 20% of plant growth
GR50: Growth reduction of 50% of plant growth
GR80: Growth reduction of 80% of plant growth

What is claimed is:

1. A compound of Formula (I):

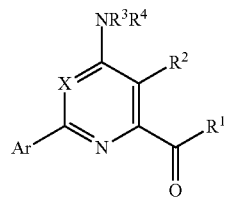

(I)

wherein

X is CY, wherein Y is hydrogen or halogen;
$R^1$ is $OR^{1'}$, wherein $R^{1'}$ is H, $C_1$-$C_8$ alkyl, or $C_7$-$C_{10}$ arylalkyl;
$R^2$ is halogen, $C_1$-$C_4$ alkyl, $C_2$-$C_4$ alkenyl, or $C_1$-$C_4$ alkoxy;
$R^3$ and $R^4$ are independently hydrogen, $C_1$-$C_6$ alkyl, $C_1$-$C_6$ haloalkyl, $C_3$-$C_6$ alkenyl, $C_3$-$C_6$ haloalkenyl, $C_3$-$C_6$ alkynyl, $C_3$-$C_6$ haloalkynyl, hydroxy, $C_1$-$C_6$ alkoxy, $C_1$-$C_6$ haloalkoxy, formyl, ($C_1$-$C_3$ alkyl)carbonyl, ($C_1$-$C_3$ haloalkyl)carbonyl, ($C_1$-$C_6$ alkoxy)carbonyl, ($C_1$-$C_6$ alkyl)carbamyl, ($C_1$-$C_6$ alkyl)sulfonyl, tri($C_1$-$C_6$ alkyl)silyl, di($C_1$-$C_6$ alkyl)phosphonyl, or $R^3$ and $R^4$ taken together with the nitrogen atom to which they are attached form a 5- or 6-membered saturated ring, or $R^3$ and $R^4$ taken together represent $=CR^{3'}R^{4'}$, wherein $R^{3'}$ and $R^{4'}$ are independently hydrogen, $C_1$-$C_6$ alkyl, $C_3$-$C_6$ alkenyl, $C_3$-$C_6$ alkynyl, $C_1$-$C_6$ alkoxy or $C_1$-$C_6$ alkylamino, or, $R^{3'}$ and $R^{4'}$ taken together with the carbon atom to which they are attached form a 5- or 6-membered saturated ring;

Ar is:

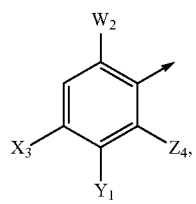

$X_2$ is F, Cl, Br, I, $C_1$-$C_4$ alkyl, $C_2$-$C_4$ alkenyl, $C_2$-$C_4$ alkynyl, $C_1$-$C_4$ alkoxy, CN, or $NO_2$;
$W_2$ is hydrogen or F; and
$Z_3$ is $C_1$-$C_4$ haloalkyl, $C_1$-$C_4$ alkyl, $C_2$-$C_4$ alkenyl, $C_2$-$C_4$ alkynyl, or $C_1$-$C_4$ alkoxy;

or an N-oxide or agriculturally acceptable salt thereof.

2. The compound according to claim 1, wherein $W_2$ is hydrogen.

3. The compound of claim 1, wherein $R^2$ is Cl.

4. The compound of claim 1, wherein $Z_3$ is $C_1$ haloalkyl, $C_1$ alkyl, $C_2$ alkenyl, $C_2$ alkynyl, or $C_1$ alkoxy.

5. The compound of claim 1, wherein Y is F.

6. The compound of claim 5, wherein $Z_3$ is $C_1$ haloalkyl, $C_1$ alkyl, $C_2$ alkenyl, $C_2$ alkynyl, or $C_1$ alkoxy.

7. The compound of claim 6, wherein $X_2$ is Cl.

8. The compound of claim 1, wherein $R^3$ and $R^4$ are each hydrogen.

9. The compound of claim 8, wherein $X_2$ and $R^2$ are each Cl.

10. The compound of claim 8, wherein $Z_3$ is $C_1$ haloalkyl, $C_1$ alkyl, $C_2$ alkenyl, $C_2$ alkynyl, or $C_1$ alkoxy.

11. A compound having the formula:

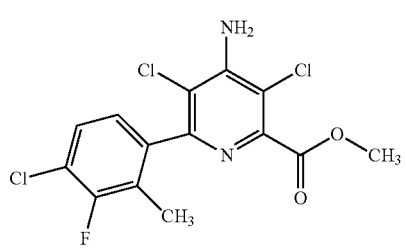

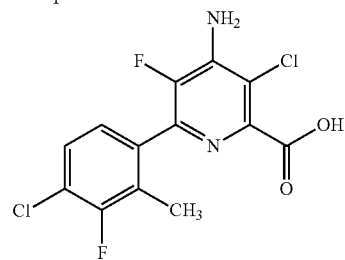

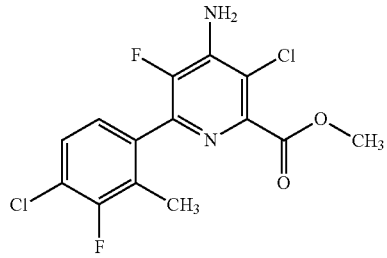

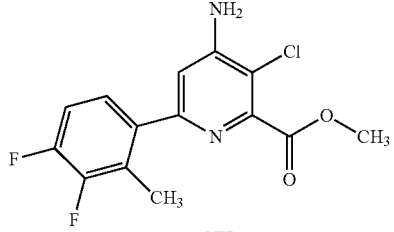

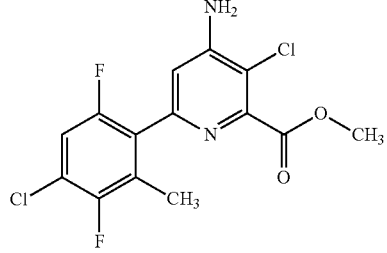

-continued

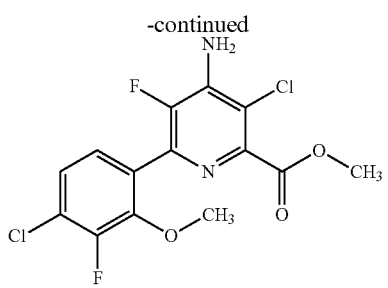

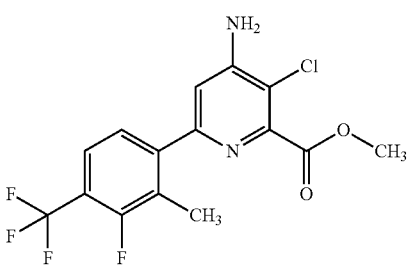 [SMILES: COC(=O)c1nc(-c2ccc(C(F)(F)F)c(F)c2C)cc(N)c1Cl]

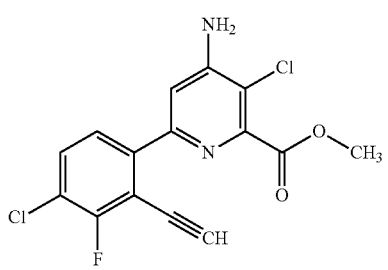

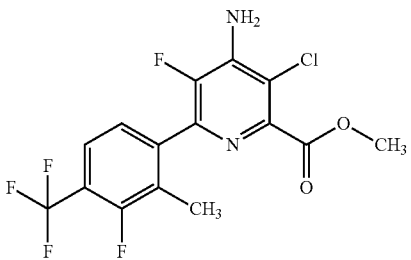 [SMILES: COC(=O)c1nc(-c2ccc(C(F)(F)F)c(F)c2C)c(F)c(N)c1Cl]

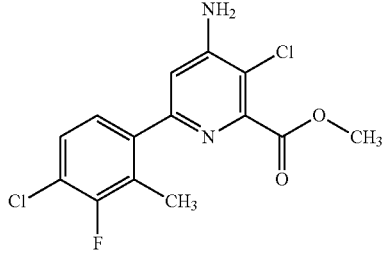 [SMILES: COC(=O)c1nc(-c2ccc(Cl)c(F)c2C)cc(N)c1Cl]

165
-continued
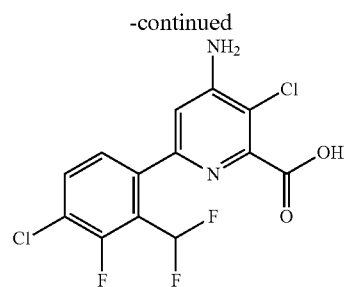
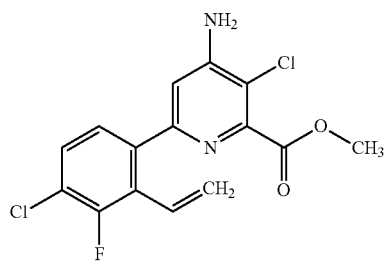
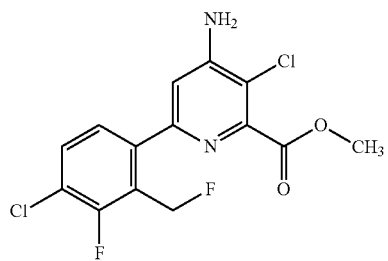 [SMILES: COC(=O)c1nc(-c2ccc(Cl)c(F)c2CF)cc(N)c1Cl]
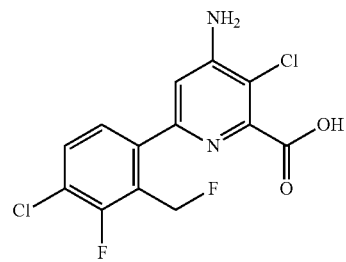 [SMILES: Nc1cc(-c2ccc(Cl)c(F)c2CF)nc(C(=O)O)c1Cl]
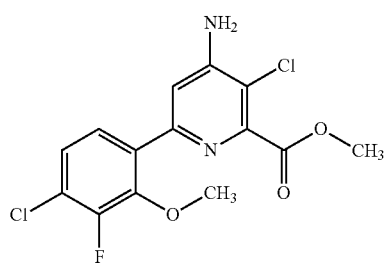
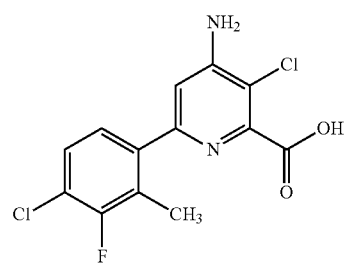
166
-continued
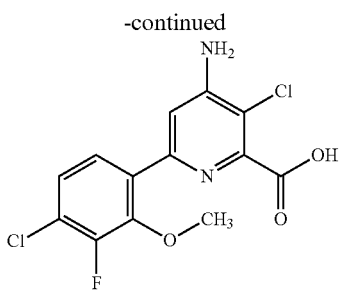
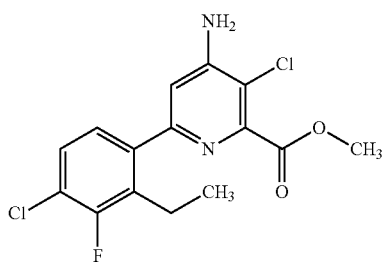
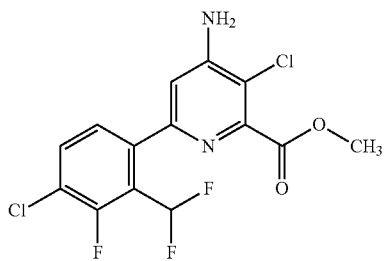
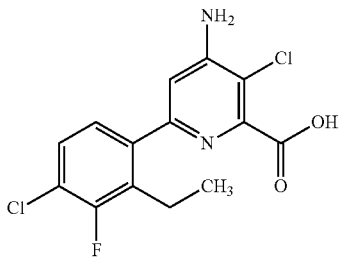 [SMILES: CCc1c(-c2cc(N)c(Cl)c(C(=O)O)n2)ccc(Cl)c1F]
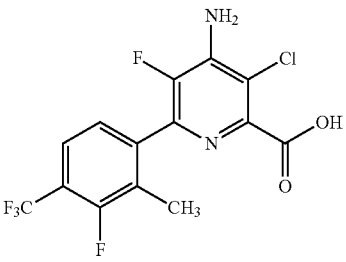
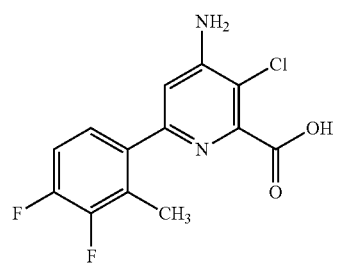 [SMILES: Cc1c(-c2cc(N)c(Cl)c(C(=O)O)n2)ccc(F)c1F]

-continued
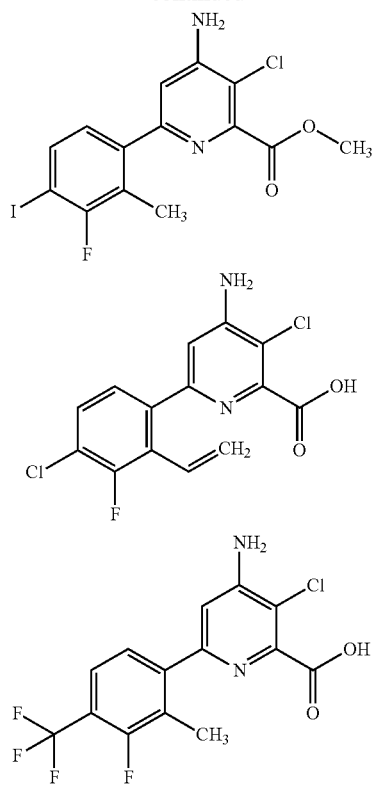
-continued
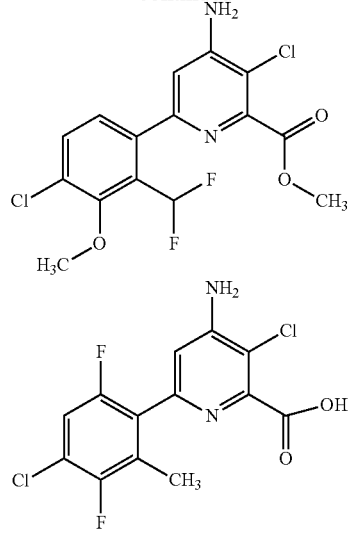
or an N-oxide or agriculturally acceptable salt thereof.
12. A herbicidal composition comprising the compound of claim 1 and an agriculturally acceptable adjuvant or carrier.
13. The composition of claim 12, further comprising at least one additional herbicidal compound.
14. The composition of claim 12, further comprising a safener.
* * * * *